US011049235B2

(12) United States Patent
Wheaton et al.

(10) Patent No.: US 11,049,235 B2
(45) Date of Patent: Jun. 29, 2021

(54) TECHNIQUES FOR EXTRACTING CONTEXTUALLY STRUCTURED DATA FROM DOCUMENT IMAGES

(71) Applicant: SAS Institute Inc., Cary, NC (US)

(72) Inventors: David James Wheaton, Pittsboro, NC (US); William Robert Nadolski, Raleigh, NC (US); Heather Michelle GoodyKoontz, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/083,568

(22) Filed: Oct. 29, 2020

(65) Prior Publication Data

US 2021/0110527 A1 Apr. 15, 2021

Related U.S. Application Data

(60) Provisional application No. 62/894,418, filed on Aug. 30, 2019, provisional application No. 62/991,259, (Continued)

(51) Int. Cl.
*G06K 9/00* (2006.01)
*G06T 7/00* (2017.01)
(Continued)

(52) U.S. Cl.
CPC ............ *G06T 7/0002* (2013.01); *G06F 16/81* (2019.01); *G06F 16/93* (2019.01); *G06F 40/169* (2020.01);
(Continued)

(58) Field of Classification Search
CPC .......... G06F 16/93; G06F 21/55; G06F 16/31; G06F 16/70; G06F 16/903;
(Continued)

(56) References Cited

U.S. PATENT DOCUMENTS

| 8,233,714 B2 | 7/2012 | Zuev et al. |
| 9,386,037 B1* | 7/2016 | Hunt ................... H04L 63/20 |

(Continued)

FOREIGN PATENT DOCUMENTS

EP 2144188 B1 4/2016

OTHER PUBLICATIONS

Smith, R., et al., "Adapting the Tesseract Open Source OCR Engine for Multilingual OCR", Proceedings of the International Workshop on Multilingual OCR Barcelona, SP (Jul. 2009) 8 pages.
(Continued)

*Primary Examiner* — Alex Kok S Liew
(74) *Attorney, Agent, or Firm* — Kacvinsky Daisak Bluni PLLC

(57) ABSTRACT

Embodiments are generally directed to techniques for extracting contextually structured data from document images, such as by automatically identifying document layout, document data, and/or document metadata in a document image, for instance. Many embodiments are particularly directed to generating and utilizing a document template database for automatically extracting document image contents into a contextually structured format. For example, the document template database may include a plurality of templates for identifying/explaining key data elements in various document image formats that can be used to extract contextually structured data from incoming document images with a matching document image format. Several embodiments are particularly directed to automatically identifying and associating document metadata with corresponding document data in a document image, such as for generating a machine-facilitated annotation of the document image. In some embodiments, the machine-facilitated annotation of a document may be used to generate a template for the template database.

30 Claims, 47 Drawing Sheets
(9 of 47 Drawing Sheet(s) Filed in Color)

Related U.S. Application Data filed on Mar. 18, 2020, provisional application No. 62/922,941, filed on Sep. 9, 2019.

(51) Int. Cl.

| | |
|---|---|
| G06F 16/81 | (2019.01) |
| G06F 16/93 | (2019.01) |
| G06F 40/284 | (2020.01) |
| G06F 40/186 | (2020.01) |
| G06F 40/169 | (2020.01) |
| G06K 9/68 | (2006.01) |
| G06K 9/62 | (2006.01) |

(52) U.S. Cl.
CPC .......... G06F 40/186 (2020.01); G06F 40/284 (2020.01); *G06K 9/00483* (2013.01); *G06K 9/6253* (2013.01); *G06K 9/6276* (2013.01); *G06K 9/685* (2013.01); *G06K 2209/01* (2013.01); *G06T 2207/30168* (2013.01); *G06T 2207/30176* (2013.01)

(58) Field of Classification Search
CPC .. G06F 16/1734; G06F 16/355; G06F 21/554; G06F 16/353; G06F 16/14; G06F 16/313; G06F 16/325; G06F 16/35; G06F 16/9014; G06F 16/904; G06F 16/907; G06F 16/285; G06F 16/288; G06F 16/906; G06F 16/957; G06F 17/16; G06F 3/04817; G06F 40/14; G06F 8/60; G06F 9/4843; H04L 63/1425; H04L 51/12; H04L 63/12; G10L 15/26

See application file for complete search history.

(56) References Cited

U.S. PATENT DOCUMENTS

| | | | |
|---|---|---|---|
| 2004/0220898 A1 | 11/2004 | Eguchi et al. | |
| 2010/0223671 A1* | 9/2010 | Tsuda | G06F 16/93 726/26 |
| 2011/0087668 A1* | 4/2011 | Thomas | G06F 16/355 707/738 |
| 2011/0091109 A1 | 4/2011 | Zuev et al. | |
| 2011/0229036 A1 | 9/2011 | Reffle et al. | |
| 2013/0223743 A1 | 8/2013 | Deryagin et al. | |
| 2017/0161375 A1* | 6/2017 | Stoica | G06F 16/353 |
| 2017/0351664 A1 | 12/2017 | Hahn | |

OTHER PUBLICATIONS

Vijayarani, S., and Sakila, A., "Template Matching Technique for Searching Words in Document Images", International Journal on Cybernetics and Informatics 4(6):25-35 (2015).

Ishitani, Y., "Model-Based Information Extraction Method Tolerant of OCR Errors for Document Images", R and D Center, Toshiba Corp (2001) 8 pages.

Grana, C., et al., "Layout analysis and content enrichment of digitized books", Multimed Tools Appl 75:3879-3900 (2016).

Holecek, M., et al., "Table understanding in structured documents", eprint arXiv:1904.12577v2 (Jul. 2019) 7 pages.

Author unknown, "How it Works", Document Workflow Automation with ABBYY FlexiCapture [online] 2019 [retrieved on Aug. 30, 2019]. Retrieved from Internet URL: https://www.abbyy.com/en-us/flexicapture/how-it-works/ 8 pages.

Seguin, P., "How invoice automation can help you create a paperless office", [online] 2020 Rossum blog [retrieved on Mar. 21, 2020]. Retrieved from Internet URL: https://rossum.ai/blog/how-invoice-automation-can-help-you-create-a-paperless-office/, 10 pages.

Author unknown, "Digitize documents, receipts and PDFs using OCR and Deep Learning", Nanonets: Data extraction from Documents and Images [online] 2018 [retrieved on Mar. 21, 2020]. Retrieved from Internet URL: https://nanonets.com/ocr-api/, 7 pages.

Author unknown, "Using Zonal OCR to Extract Data Fields From Scanned Documents", Docparser [online] 2017-2018 [date retrieval unknown]. Retrieved from Internet URL: https://docparser.com, 14 pages.

\* cited by examiner

1400

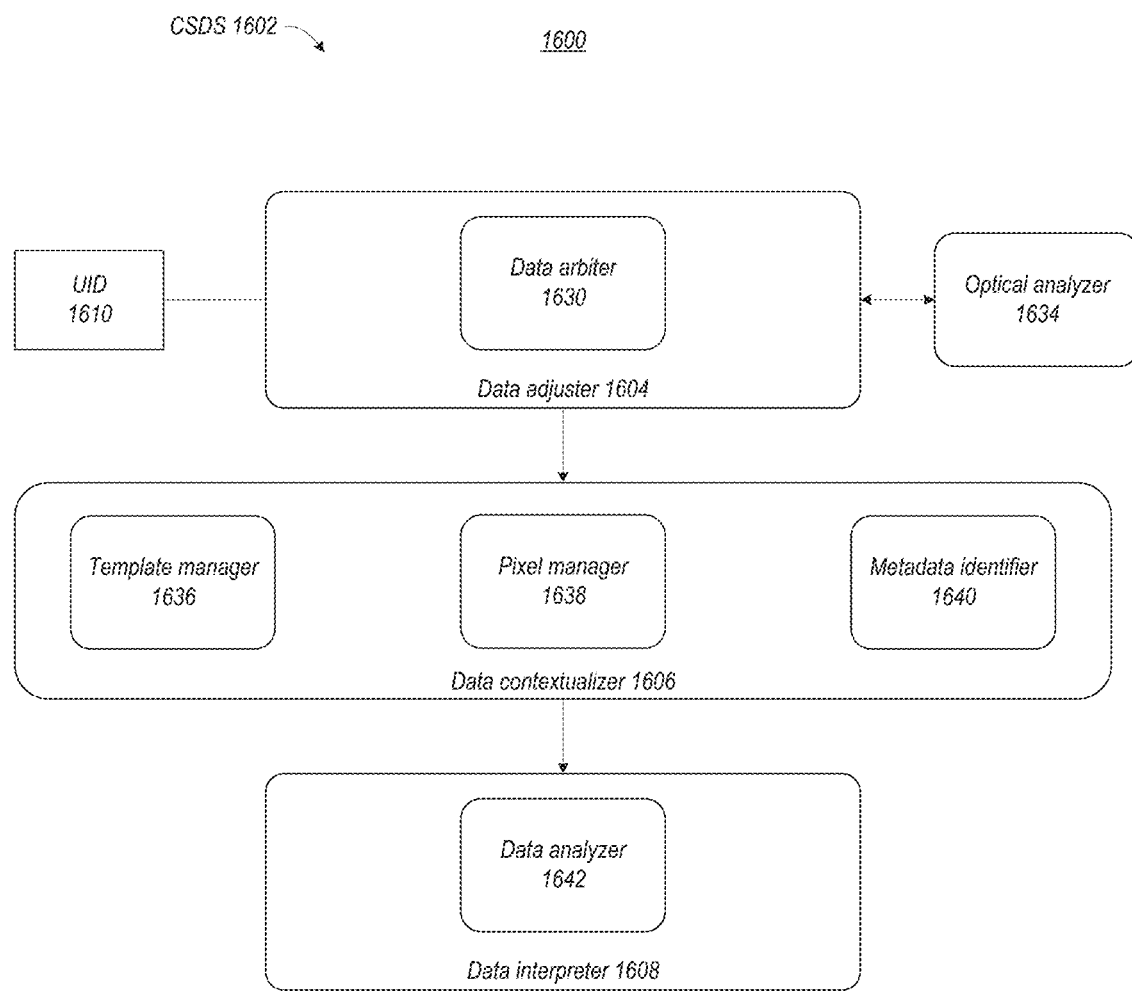

Review ranking interface 1900B

| IMAGE INSTANCE | REVIEW PRIORITY RANKING | NONCONFORMING IMAGE? | NONCONFORMANCE (QUALITY) SCORE | PREDICTED TEMPLATE | TEMPLATE CONFIDENCE | DOCUMENT STRUCTURE SCORE | MATCHING METADATA SCORE | OCR TEXT ACCURACY SCORE |
|---|---|---|---|---|---|---|---|---|
| Z.PNG | 1 | Y | 10 | N/A | N/A | N/A | N/A | N/A |
| Y.JPEG | 2 | Y | 20 | N/A | N/A | N/A | N/A | N/A |
| V.TIFF | 3 | N | 30 | B | 75% | 84 | 78 | 93 |
| W.PEG | 4 | N | 40 | B | 85% | 86 | 74 | 91 |
| Q.BMP | 5 | N | 50 | C | 60% | 91 | 85 | 89 |
| R.TIFF | 6 | N | 60 | C | 88% | 80 | 81 | 87 |
| T.JPG | 7 | N | 70 | C | 92% | 67 | 86 | 96 |
| U.BMP | 8 | N | 80 | D | 77% | 33 | 94 | 54 |
| P.PDF | 9 | N | 90 | E | 98% | 95 | 97 | 91 |

FIG. 19C
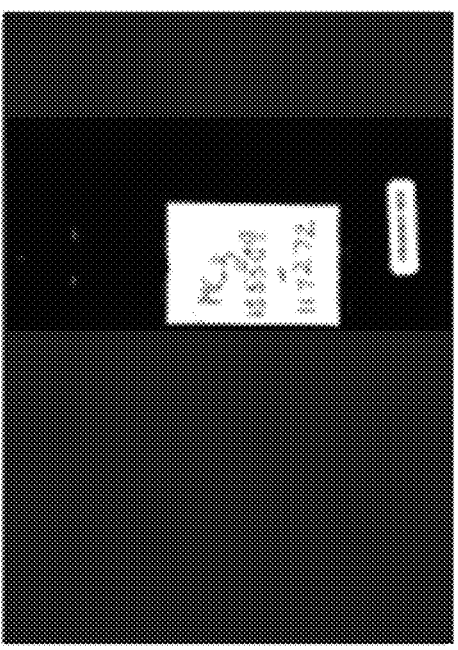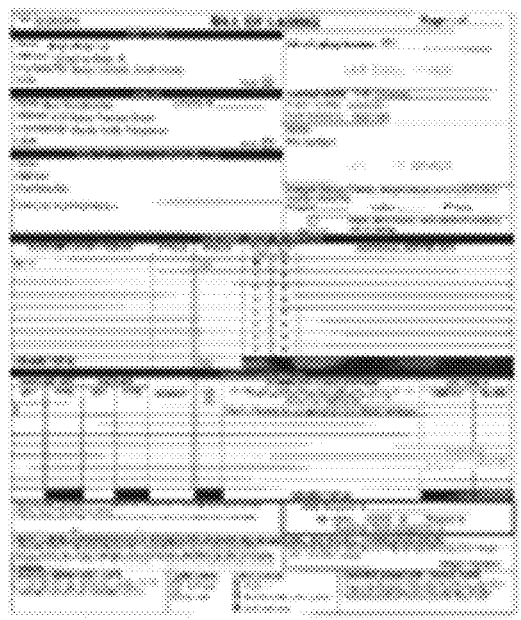
Nonconforming image interface 1900C

Template match interface 1900D

FIG. 19E

Metadata review interface 1900E

BILL OF LADING
[Shipping Company Name Here]

FIG. 19F

Data review interface 1900F

BILL OF LADING
[Shipping Company Name Here]

| Shipper/Exporter | Also Notify |
|---|---|
| ABC Technologies | |
| Consignee | |
| DEF Industries | |
| Notify Party | Many terms and conditions may apply. A lot of the time there will be text here that isn't really relevant for data extraction. I'm adding somewhat arbitrary text to try to mimic this for the purpose of demonstrating a dense pattern that appears in actual data. |

| Vessel | Pre-Carriage By |
|---|---|
| SS Raleigh | |
| Port of Loading | Place of Receipt |
| Shanghai, China | Miami, Florida |
| Port of Discharge | Place of Delivery |
| Miami, Florida | Miami, Florida |

Goods Description

| Item | Quantity | Weight |
|---|---|---|
| Desk Chairs | 120 | 335 KG |
| Desks | 15 | 180 KG |

| Freight & Charges | Date of Issuance |
|---|---|
| Freight Payable At | Prepaid Charges |

2000

2300

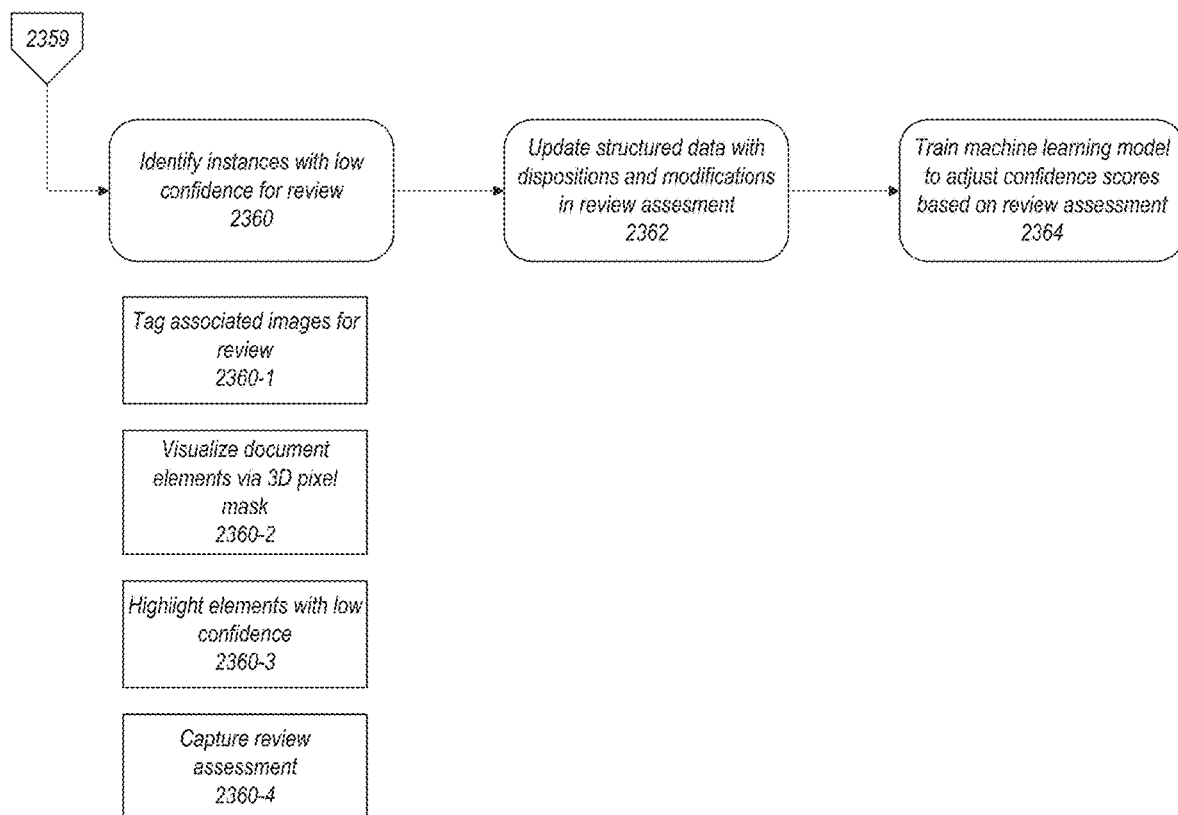

FIG. 24

*Blended image 2401*

BILL OF LADING
[Shipping Company Name Here]

*Pixel mask 2503*

FIG. 26

*Document template 2605*

BILL OF LADING
[Shipping Company Name Here]

| Shipper/Exporter: | Also Notify |
| --- | --- |
| Consignee | |
| Notify Party | Many terms and conditions may apply. A lot of the time there will be text here that isn't really relevant for data extraction. I'm adding somewhat arbitrary text to try to mimic this for the purpose of demonstrating a data pattern that appears in actual data. |

| Vessel | Pre-Carriage By |
| --- | --- |
| Port of Loading | Place of Receipt |
| Port of Discharge | Place of Delivery |

| Goods Description |
| --- |
| |

| Freight & Charges | Date of Issuance |
| --- | --- |
| Freight Payable At | Prepaid Charges |

FIG. 27A
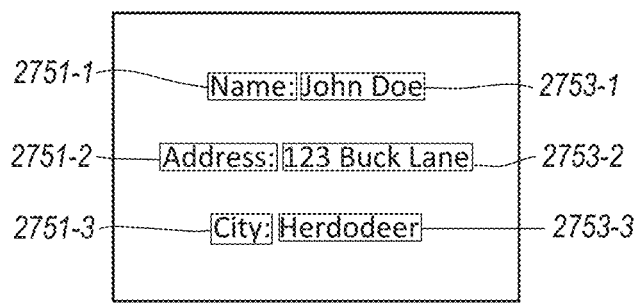
Template 2718
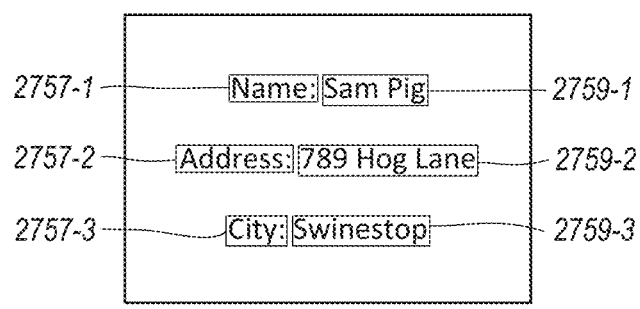
Document image 2749

FIG. 27B

*Table 2700B*

*Common words 2762*  *Locations 2764*

| Metadata | X1 | Y1 | X2 | Y2 |
|---|---|---|---|---|
| Name: | 15 | 8 | 17 | 9 |
| Address: | 12 | 67 | 14 | 74 |
| City: | 14 | 127 | 15 | 144 |

*Regression equation 2760-1*

$$X_2 = m_{x1} * X_1 + m_{y1} * Y_1 + b_x$$

*Regression equation 2760-2*

Identify semi-structured data generated by optical character recognition, the semi-structured data comprising a set of word tokens for each document image in a standardized-filtered collection of document images
2902

Remove the set of word tokens from each document image in the standardized-filtered collection of document images to produce a collection of document structures that corresponds to the standardized-filtered collection of document images
2904

Hash each document structure in the collection of document structures to produce a collection of image hashes
2906

Compute a hamming distance between each pair of image hashes in the collection of image hashes
2908

Cluster the document structures based on the hamming distances to determine a set of candidate templates from the collection of document structures, wherein each candidate template in the set of templates corresponds to a different cluster of document structures
2910

For each candidate template in the set of candidate templates:
2912

Identify one or more occurrences for each common word in a set of common words in each document image in the standardized-filtered collection that corresponds to a respective candidate template in the set of candidate templates based on corresponding word tokens
2912-A Create a table for the set of common words, the table comprising locations of the one or more occurrences for each common word in the set of common words for each document image in the standardized-filtered collection that corresponds to the respective candidate template in the set of candidate templates
2912-B Perform a first set of linear regressions based on locations of the set of common words in the table, wherein performance of the first set of linear regressions determines a residual for each of the locations in the table
2912-C

Identify semi-structured data generated by optical character recognition (OCR), the semi-structured data comprising a set of word tokens for a document image, wherein each word token comprises a word identified in the document image and a location of the word identified in the document image
3002

Perform a frequency analysis of each word token in the set of word tokens, each frequency analysis to determine a total frequency of a respective word and a count of document images in which the respective word appears based on one or more of a template database and a metadata database, wherein the template database comprises a set of annotated templates for converting an incoming document image into contextually structured data, and wherein the metadata database comprises metadata words and text analytic scoring weights generated based on the template database
3004

Identify a set of proximate words for each word token in the set of word tokens, wherein each proximate word in a respective set of proximate words includes words in the document image that are within a proximity threshold of a respective word token
3006

Provide the frequency analysis and metrics corresponding to the set of proximate words for each word token in the set of word tokens to a binary classification model to produce a set of metadata words for the document image
3008

Link words below a threshold distance in the document image together to produce a set of text blocks, each text block including at least one data word associable with at least one metadata word in the set of metadata words for the document image
3010

Divide a first text block in the set of text blocks into second and third text blocks based on the set of metadata words for the document image:
3012

Divide the third text block into fourth and fifth text blocks based on local minima and maxima of column wise pixel intensity:
3014

```
Determine the fifth text block fails to include any metadata word from the set of metadata words
3016
                                    │
                                    ▼
Combine the fifth text block with a sixth text block based on the determination the fifth text block fails to
include any metadata word from the set of metadata words
3018
                                    │
                                    ▼
Generate a machine-facilitated annotation of the document image based on remaining text blocks and the
set of metadata words, wherein each of the remaining text blocks having at least one metadata word and
at least one data word, the at least one metadata word is associated with the at least one data word
3020
```

TECHNIQUES FOR EXTRACTING CONTEXTUALLY STRUCTURED DATA FROM DOCUMENT IMAGES

CROSS-REFERENCE TO RELATED APPLICATIONS

This application claims the benefit of priority under 35 U.S.C. § 119(e) to U.S. Provisional Application Ser. No. 62/894,418, titled "Text Based Form Recognition for Improved OCR Classification", and filed Aug. 30, 2019, the entirety of which is incorporated herein by reference.

This application claims the benefit of priority under 35 U.S.C. § 119(e) to U.S. Provisional Application Ser. No. 62/991,259, titled "Extraction of Structured Information from Semi-Structured Document Images Using Automated Document Layout Identification and Optical Character Recognition Techniques", and filed Mar. 18, 2020, the entirety of which is incorporated herein by reference.

This application claims the benefit of priority under 35 U.S.C. § 119(e) to U.S. Provisional Application Ser. No. 62/992,941, titled "Extraction of Structured Information from Semi-Structured Document Images Using Automated Document Layout Identification and Optical Character Recognition Techniques and Automated Text Clustering and Metadata Assignment for Semi-Structured Forms", and filed Mar. 21, 2020, the entirety of which is incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising one or more of: identify semi-structured data generated by optical character recognition, the semi-structured data comprising a set of word tokens for each document image in a standardized-filtered collection of document images; remove the set of word tokens from each document image in the standardized-filtered collection of document images to produce a collection of document structures that corresponds to the standardized-filtered collection of document images; hash each document structure in the collection of document structures to produce a collection of image hashes; compute a hamming distance between each pair of image hashes in the collection of image hashes; cluster the document structures based on the hamming distances to determine a set of candidate templates from the collection of document structures, wherein each candidate template in the set of templates corresponds to a different cluster of document structures; for each candidate template in the set of candidate templates: identify one or more occurrences for each common word in a set of common words in each document image in the standardized-filtered collection that corresponds to a respective candidate template in the set of candidate templates based on corresponding word tokens, create a table for the set of common words, the table comprising locations of the one or more occurrences for each common word in the set of common words for each document image in the standardized-filtered collection that corresponds to the respective candidate template in the set of candidate templates, perform a first set of linear regressions based on locations of the set of common words in the table, wherein performance of the first set of linear regressions determines a residual for each of the locations in the table, remove locations from the table that exceed a threshold residual determined based on the first linear regression to produce an updated table, perform a second set of linear regressions based on locations of the respective common word in the updated table, identify a linear transformation between document images in the standardized-filtered collection that correspond to the respective candidate template in the set of candidate templates based on the second set of linear regressions, determine the respective candidate template is an actual template based, at least in part, on the linear transformation, generate a prompt for user input to annotate the actual template with one or more annotations to produce an annotated template in response to confirmation of the respective candidate template, produce the annotated template based on user input received in response to the prompt, and store a representative document image hash, a representative document structure, the annotated template, and a list of metadata words with locations for the annotated template in a template database; and utilize the template database to extract document image contents into a contextually structured format from each document image in the collection of document images that corresponds to one of the annotated templates.

In some embodiments, the table is created with at least two occurrences of each common word from each document image in the standardized-filtered collection that corresponds to a respective candidate template in the set of candidate templates. In some such embodiments, the two occurrences of the respective common word are the first occurrence and the last occurrence of the respective common word in each document image in the standardized-filtered collection that corresponds to a respective candidate template in the set of candidate templates.

In various embodiments, the processor is caused to perform operations comprising generate a blended image for the respective candidate template based on each document image that corresponds to the respective candidate template. In various such embodiments, the processor is caused to perform operations comprising generate a prompt for user input to determine the respective candidate template is an actual template. In many such embodiments, the processor is caused to perform operations comprising: utilize the blended image to confirm the respective candidate template; and generate a pixel mask based on the blended image. In further such embodiments, the pixel mask comprises a three-dimensional pixel mask with a first dimension that corresponds to data, a second dimension that corresponds to metadata, and a third dimension that corresponds to document structure.

In several embodiments, the processor is caused to perform operations to produce the standardized-filtered collection of document images comprising one or more of: remove one or more document images in a collection of document images based on a set of document image requirements to produce a filtered collection of document images, wherein the set of document image requirements includes a minimum image quality for each document image in the filtered collection; and standardize each document image in the filtered collection of document images based on a set of document image standards to produce the standardized-filtered collection of document images, wherein the set of document image standards includes a standard image size.

In multiple embodiments, the first set of linear regressions comprises a first x-axis linear regression and a first y-axis linear regression and the second set of linear regressions comprise a second x-axis linear regression and a second y-axis linear regression.

In some embodiments, the contextually structured format distinguishes data words in a document image from metadata words in the document image and correlates each data word in the document image with at least one annotation in the document.

Various embodiments described herein may include a computer-implemented method, comprising one or more of: identifying semi-structured data generated by optical character recognition, the semi-structured data comprising a set of word tokens for each document image in a standardized-filtered collection of document images; removing the set of word tokens from each document image in the standardized-filtered collection of document images to produce a collection of document structures that corresponds to the standardized-filtered collection of document images; hashing each document structure in the collection of document structures to produce a collection of image hashes; computing a hamming distance between each pair of image hashes in the collection of image hashes; clustering the document structures based on the hamming distances to determine a set of candidate templates from the collection of document structures, wherein each candidate template in the set of templates corresponds to a different cluster of document structures; for each candidate template in the set of candidate templates: identifying one or more occurrences for each common word in a set of common words in each document image in the standardized-filtered collection that corresponds to a respective candidate template in the set of candidate templates based on corresponding word tokens, creating a table for the set of common words, the table comprising locations of the one or more occurrences for each common word in the set of common words for each document image in the standardized-filtered collection that corresponds to the respective candidate template in the set of candidate templates, performing a first set of linear regressions based on locations of the set of common words in the table, wherein performance of the first set of linear regressions determines a residual for each of the locations in the table, removing locations from the table that exceed a threshold residual determined based on the first linear regression to produce an updated table, performing a second set of linear regressions based on locations of the respective common word in the updated table, identifying a linear transformation between document images in the standardized-filtered collection that correspond to the respective candidate template in the set of candidate templates based on the second set of linear regressions, determining the respective candidate template is an actual template based, at least in part, on the linear transformation, generating a prompt for user input to annotate the actual template with one or more annotations to produce an annotated template in response to confirmation of the respective candidate template, producing the annotated template based on user input received in response to the prompt, and storing a representative document image hash, a representative document structure, the annotated template, and a list of metadata words with locations for the annotated template in a template database; and utilizing the template database to extract document image contents into a contextually structured format from each document image in the collection of document images that corresponds to one of the annotated templates.

In some embodiments, the table is created with at least two occurrences of each common word from each document image in the standardized-filtered collection that corresponds to a respective candidate template in the set of candidate templates.

In many embodiments, the two occurrences of the respective common word are the first occurrence and the last occurrence of the respective common word in each document image in the standardized-filtered collection that corresponds to a respective candidate template in the set of candidate templates.

In several embodiments, the computer-implemented method comprises generating a blended image for the respective candidate template based on each document image that corresponds to the respective candidate template. In several such embodiments, the computer-implemented method comprises generating a prompt for user input to determine the respective candidate template is an actual template. In many such embodiments, the computer-implemented method comprises one or more of: utilizing the blended image to confirm the respective candidate template; and generating a pixel mask based on the blended image. In further such embodiments, the pixel mask comprises a three-dimensional pixel mask with a first dimension that corresponds to data, a second dimension that corresponds to metadata, and a third dimension that corresponds to document structure.

In multiple embodiments, producing the standardized-filtered collection of document images comprises one or more of: removing one or more document images in a collection of document images based on a set of document image requirements to produce a filtered collection of document images, wherein the set of document image requirements includes a minimum image quality for each document image in the filtered collection; and standardizing each document image in the filtered collection of document images based on a set of document image standards to produce the standardized-filtered collection of document images, wherein the set of document image standards includes a standard image size.

In some embodiments, the first set of linear regressions comprises a first x-axis linear regression and a first y-axis linear regression and the second set of linear regressions comprise a second x-axis linear regression and a second y-axis linear regression.

In various embodiments, the contextually structured format distinguishes data words in a document image from metadata words in the document image and correlates each data word in the document image with at least one annotation in the document.

Various embodiments described herein may include a computer-program product tangibly embodied in a non-transitory machine-readable storage medium, the computer-program product including instructions operable to cause a processor to perform operations comprising one or more of: identify semi-structured data generated by optical character recognition, the semi-structured data comprising a set of word tokens for each document image in a standardized-filtered collection of document images; remove the set of word tokens from each document image in the standardized-filtered collection of document images to produce a collection of document structures that corresponds to the standardized-filtered collection of document images; hash each document structure in the collection of document structures to produce a collection of image hashes; compute a hamming distance between each pair of image hashes in the collection of image hashes; cluster the document structures based on the hamming distances to determine a set of candidate templates from the collection of document structures, wherein each candidate template in the set of templates corresponds to a different cluster of document structures; for each candidate template in the set of candidate templates: identify one or more occurrences for each common word in a set of common words in each document image in the standardized-filtered collection that corresponds to a respective candidate template in the set of candidate templates based on corresponding word tokens, create a table for the set of common words, the table comprising locations of the one or more occurrences for each common word in the set of common words for each document image in the standardized-filtered collection that corresponds to the respective candidate template in the set of candidate templates, perform a first set of linear regressions based on locations of the set of common words in the table, wherein performance of the first set of linear regressions determines a residual for each of the locations in the table, remove locations from the table that exceed a threshold residual determined based on the first linear regression to produce an updated table, perform a second set of linear regressions based on locations of the respective common word in the updated table, identify a linear transformation between document images in the standardized-filtered collection that correspond to the respective candidate template in the set of candidate templates based on the second set of linear regressions, determine the respective candidate template is an actual template based, at least in part, on the linear transformation, generate a prompt for user input to annotate the actual template with one or more annotations to produce an annotated template in response to confirmation of the respective candidate template, produce the annotated template based on user input received in response to the prompt, and store a representative document image hash, a representative document structure, the annotated template, and a list of metadata words with locations for the annotated template in a template database; and utilize the template database to extract document image contents into a contextually structured format from each document image in the collection of document images that corresponds to one of the annotated templates.

In some embodiments, the table is created with at least two occurrences of each common word from each document image in the standardized-filtered collection that corresponds to a respective candidate template in the set of candidate templates. In some such embodiments, the two occurrences of the respective common word are the first occurrence and the last occurrence of the respective common word in each document image in the standardized-filtered collection that corresponds to a respective candidate template in the set of candidate templates.

In various embodiments, the computer-program product includes instructions operable to cause the processor to perform operations comprising generate a blended image for the respective candidate template based on each document image that corresponds to the respective candidate template. In various such embodiments, the computer-program product includes instructions operable to cause the processor to perform operations comprising generate a prompt for user input to determine the respective candidate template is an actual template. In many such embodiments, the computer-program product includes instructions operable to cause the processor to perform operations comprising: utilize the blended image to confirm the respective candidate template; and generate a pixel mask based on the blended image. In further such embodiments, the pixel mask comprises a three-dimensional pixel mask with a first dimension that corresponds to data, a second dimension that corresponds to metadata, and a third dimension that corresponds to document structure.

In several embodiments, the computer-program product includes instructions operable to cause the processor to perform operations to produce the standardized-filtered collection of document images comprising one or more of: remove one or more document images in a collection of document images based on a set of document image requirements to produce a filtered collection of document images, wherein the set of document image requirements includes a minimum image quality for each document image in the filtered collection; and standardize each document image in the filtered collection of document images based on a set of document image standards to produce the standardized-filtered collection of document images, wherein the set of document image standards includes a standard image size.

In multiple embodiments, the first set of linear regressions comprises a first x-axis linear regression and a first y-axis linear regression and the second set of linear regressions comprise a second x-axis linear regression and a second y-axis linear regression.

In some embodiments, the contextually structured format distinguishes data words in a document image from metadata words in the document image and correlates each data word in the document image with at least one annotation in the document.

Various embodiments described herein may include an apparatus comprising a processor and a storage to store instructions that, when executed by the processor, cause the processor to perform operations comprising one or more of: identify semi-structured data generated by optical character recognition (OCR), the semi-structured data comprising a set of word tokens for a document image, wherein each word token comprises a word identified in the document image and a location of the word identified in the document image; perform a frequency analysis of each word token in the set of word tokens, each frequency analysis to determine a total frequency of a respective word and a count of document images in which the respective word appears based on one or more of a template database and a metadata database, wherein the template database comprises a set of annotated templates for converting an incoming document image into contextually structured data, and wherein the metadata database comprises metadata words and text analytic scoring weights generated based on the template database; identify a set of proximate words for each word token in the set of word tokens, wherein each proximate word in a respective set of proximate words includes words in the document image that are within a proximity threshold of a respective word token; provide the frequency analysis and metrics corresponding to the set of proximate words for each word token in the set of word tokens to a binary classification model to produce a set of metadata words for the document image; link words below a threshold distance in the document image together to produce a set of text blocks, each text block including at least one data word associable with at least one metadata word in the set of metadata words for the document image; divide a first text block in the set of text blocks into second and third text blocks based on the set of metadata words for the document image; divide the third text block into fourth and fifth text blocks based on local minima and maxima of column wise pixel intensity; determine the fifth text block fails to include any metadata word from the set of metadata words; combine the fifth text block with a sixth text block based on the determination the fifth text block fails to include any metadata word from the set of metadata words; and generate a machine-facilitated annotation of the document image based on remaining text blocks and the set of metadata words, wherein each of the remaining text blocks having at least one metadata word and at least one data word, the at least one metadata word is associated with the at least one data word.

In some embodiments, the proximity threshold for identification of the set of proximate words for each word token in the set of word tokens comprises a left-direction threshold distance, a right-direction threshold distance, a top-direction threshold distance, and a bottom-direction threshold distance.

In many embodiments, the processor is caused to perform operations comprising one or more of: present the machine-facilitated annotation of the document image on a graphical user interface (GUI); and present a prompt on the GUI for user input to revise the machine-facilitated annotation of the document image. In many such embodiments, the processor is caused, in response to receipt of user input to revise the machine-facilitated annotation of the document image, to perform operations comprising one or more of: generate an updated machine-facilitated annotation of the document image; and store the updated machine-facilitated annotation of the document image in the metadata database.

In several embodiments, the processor is caused to perform operations comprising one or more of: generate at least a portion of an annotated template based on the machine-facilitated annotation of the document image; and store the annotated template in the template database.

In various embodiments, at least one of the threshold distance and the proximity threshold is based on historical analysis of document images within a single use case, the historical analysis to determine, based on historical document image data, a plurality of proximities of relevant words to the word comprised in the respective word token or a plurality of distances between words in a text block.

In some embodiments, the fifth and the sixth text blocks are recombined based on a determination the fifth text block is directly adjacent to the sixth text block in the document image.

In many embodiments, the frequency analysis of each word token in the set of word tokens is limited to a single use case.

In several embodiments, the metrics corresponding to the set of proximate words for each word token in the set of word tokens includes a measure of previous instances in which each proximate word in the set of proximate words was metadata.

In multiple embodiments, the processor is caused to perform operations comprising utilize the threshold distance to exclude data words that are unrelated from inclusion in a single text block.

Various embodiments described herein may include a computer-implemented method, comprising one or more of: identifying semi-structured data generated by optical character recognition (OCR), the semi-structured data comprising a set of word tokens for a document image, wherein each word token comprises a word identified in the document image and a location of the word identified in the document image; performing a frequency analysis of each word token in the set of word tokens, each frequency analysis to determine a total frequency of a respective word and a count of document images in which the respective word appears based on one or more of a template database and a metadata database, wherein the template database comprises a set of annotated templates for converting an incoming document image into contextually structured data, and wherein the metadata database comprises metadata words and text analytic scoring weights generated based on the template database; identifying a set of proximate words for each word token in the set of word tokens, wherein each proximate word in a respective set of proximate words includes words in the document image that are within a proximity threshold of a respective word token; providing the frequency analysis and metrics corresponding to the set of proximate words for each word token in the set of word tokens to a binary classification model to produce a set of metadata words for the document image; linking words below a threshold distance in the document image together to produce a set of text blocks, each text block including at least one data word associable with at least one metadata word in the set of metadata words for the document image; dividing a first text block in the set of text blocks into second and third text blocks based on the set of metadata words for the document image; dividing the third text block into fourth and fifth text blocks based on local minima and maxima of column wise pixel intensity; determining the fifth text block fails to include any metadata word from the set of metadata words; combining the fifth text block with a sixth text block based on the determination the fifth text block fails to include any metadata word from the set of metadata words; and generating a machine-facilitated annotation of the document image based on remaining text blocks and the set of metadata words, wherein each of the remaining text blocks having at least one metadata word and at least one data word, the at least one metadata word is associated with the at least one data word.

In some embodiments, the proximity threshold for identification of the set of proximate words for each word token in the set of word tokens comprises a left-direction threshold distance, a right-direction threshold distance, a top-direction threshold distance, and a bottom-direction threshold distance.

In many embodiments, the computer-implemented method comprises one or more of: presenting the machine-facilitated annotation of the document image on a graphical user interface (GUI); and presenting a prompt on the GUI for user input to revise the machine-facilitated annotation of the document image. In many such embodiments, the computer-implemented method, in response to receiving user input to revise the machine-facilitated annotation of the document image, comprises one of more of: generating an updated machine-facilitated annotation of the document image; and storing the updated machine-facilitated annotation of the document image in the metadata database.

In several embodiments, the computer-implemented method comprises one or more of: generating at least a portion of an annotated template based on the machine-facilitated annotation of the document image; and storing the annotated template in the template database.

In multiple embodiments, at least one of the threshold distance and the proximity threshold is based on historical analysis of document images within a single use case, the historical analysis to determine, based on historical document image data, a plurality of proximities of relevant words to the word comprised in the respective word token or a plurality of distances between words in a text block.

In various embodiments, the fifth and the sixth text blocks are recombined based on a determination the fifth text block is directly adjacent to the sixth text block in the document image.

In some embodiments, the frequency analysis of each word token in the set of word tokens is limited to a single use case.

In many embodiments, the metrics corresponding to the set of proximate words for each word token in the set of word tokens includes a measure of previous instances in which each proximate word in the set of proximate words was metadata.

In several embodiments, the computer-implemented method comprises utilizing the threshold distance to exclude data words that are unrelated from inclusion in a single text block.

Various embodiments described herein may include a computer-program product tangibly embodied in a non-transitory machine-readable storage medium, the computer-program product including instructions operable to cause a processor to perform operations comprising one or more of: identify semi-structured data generated by optical character recognition (OCR), the semi-structured data comprising a set of word tokens for a document image, wherein each word token comprises a word identified in the document image and a location of the word identified in the document image; perform a frequency analysis of each word token in the set of word tokens, each frequency analysis to determine a total frequency of a respective word and a count of document images in which the respective word appears based on one or more of a template database and a metadata database, wherein the template database comprises a set of annotated templates for converting an incoming document image into contextually structured data, and wherein the metadata database comprises metadata words and text analytic scoring weights generated based on the template database; identify a set of proximate words for each word token in the set of word tokens, wherein each proximate word in a respective set of proximate words includes words in the document image that are within a proximity threshold of a respective word token; provide the frequency analysis and metrics corresponding to the set of proximate words for each word token in the set of word tokens to a binary classification model to produce a set of metadata words for the document image; link words below a threshold distance in the document image together to produce a set of text blocks, each text block including at least one data word associable with at least one metadata word in the set of metadata words for the document image; divide a first text block in the set of text blocks into second and third text blocks based on the set of metadata words for the document image; divide the third text block into fourth and fifth text blocks based on local minima and maxima of column wise pixel intensity; determine the fifth text block fails to include any metadata word from the set of metadata words; combine the fifth text block with a sixth text block based on the determination the fifth text block fails to include any metadata word from the set of metadata words; and generate a machine-facilitated annotation of the document image based on remaining text blocks and the set of metadata words, wherein each of the remaining text blocks having at least one metadata word and at least one data word, the at least one metadata word is associated with the at least one data word.

In some embodiments, the proximity threshold for identification of the set of proximate words for each word token in the set of word tokens comprises a left-direction threshold distance, a right-direction threshold distance, a top-direction threshold distance, and a bottom-direction threshold distance.

In many embodiments, the computer-program product includes instructions operable to cause the processor to perform operations comprising one or more of: present the machine-facilitated annotation of the document image on a graphical user interface (GUI); and present a prompt on the GUI for user input to revise the machine-facilitated annotation of the document image. In many such embodiments, the computer-program product includes instructions operable to cause the processor to perform operations, in response to receipt of user input to revise the machine-facilitated annotation of the document image, comprising one or more of: generate an updated machine-facilitated annotation of the document image; and store the updated machine-facilitated annotation of the document image in the metadata database.

In several embodiments, the computer-program product includes instructions operable to cause the processor to perform operations comprising one or more of: generate at least a portion of an annotated template based on the machine-facilitated annotation of the document image; and store the annotated template in the template database.

In various embodiments, at least one of the threshold distance and the proximity threshold is based on historical analysis of document images within a single use case, the historical analysis to determine, based on historical document image data, a plurality of proximities of relevant words to the word comprised in the respective word token or a plurality of distances between words in a text block.

In some embodiments, the fifth and the sixth text blocks are recombined based on a determination the fifth text block is directly adjacent to the sixth text block in the document image.

In many embodiments, the frequency analysis of each word token in the set of word tokens is limited to a single use case.

In several embodiments, the metrics corresponding to the set of proximate words for each word token in the set of word tokens includes a measure of previous instances in which each proximate word in the set of proximate words was metadata.

In multiple embodiments, the computer-program product includes instructions operable to cause the processor to perform operations comprising utilize the threshold distance to exclude data words that are unrelated from inclusion in a single text block.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures:

FIG. 16 illustrates various features of an exemplary process flow for a CSDS, according to some embodiments of the present technology.

FIGS. 19A-19F illustrates various features of an exemplary process flow for a data interpreter and various corresponding user interfaces, according to some embodiments of the present technology.

FIGS. 23A-23D illustrate an exemplary logic flow for a batch process, according to some embodiments of the present technology.

FIG. 24 illustrates an exemplary blended image, according to some embodiments of the present technology.

FIG. 26 illustrates an exemplary document template, according to some embodiments of the present technology.

FIGS. 27A-27F illustrate an exemplary process flow for matching document images to templates with linear regressions, according to some embodiments of the present technology.

FIGS. 29A and 29B illustrate a first exemplary logic flow for a CSDS, according to some embodiments of the present technology.

FIGS. 30A and 30B illustrate a second exemplary logic flow for a CSDS, according to some embodiments of the present technology.

DETAILED DESCRIPTION

Figure 1:
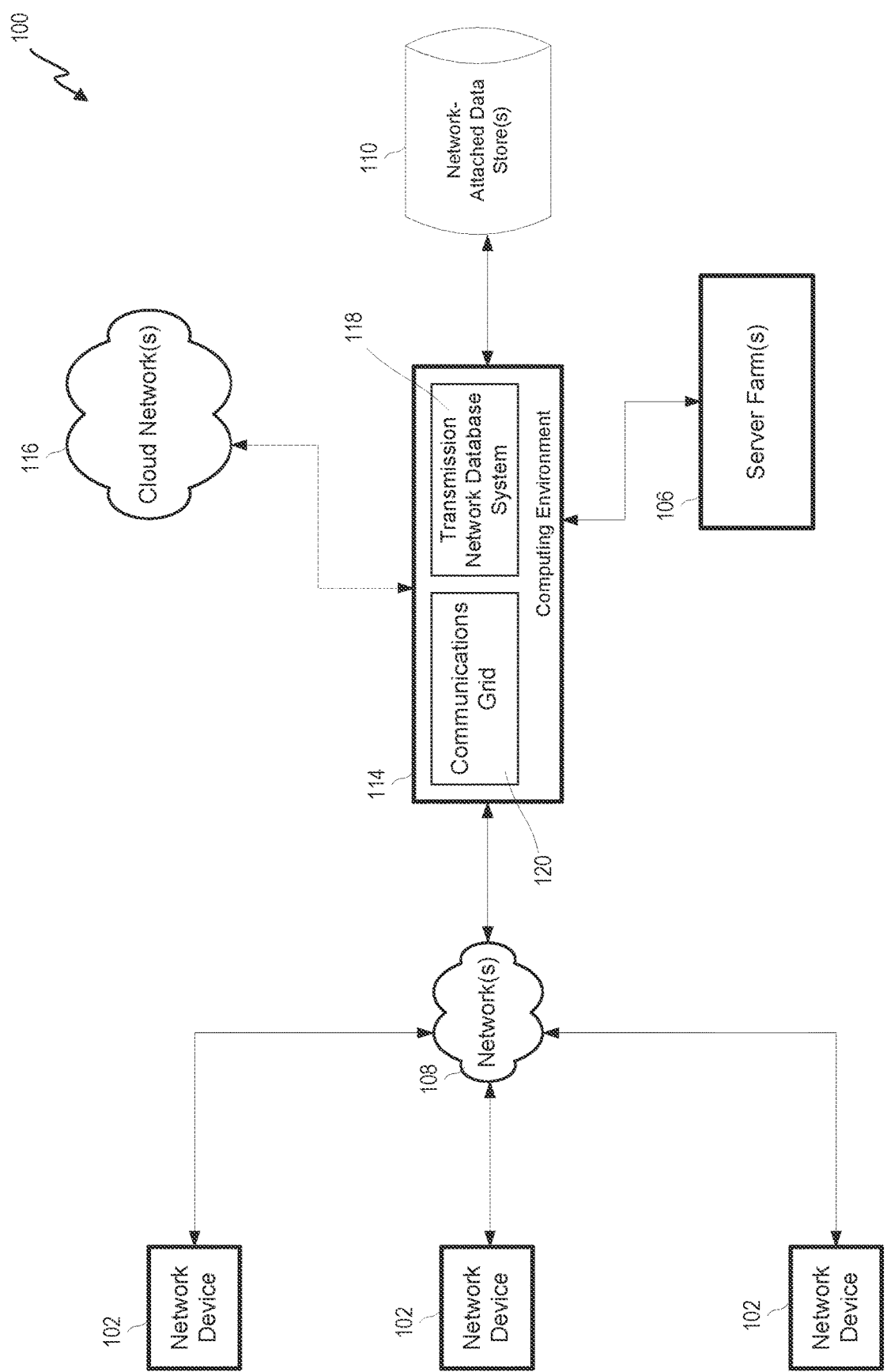
FIG. 1 illustrates a block diagram that provides an illustration of the hardware components of a computing system, according to some embodiments of the present technology.

Various embodiments are generally directed to techniques for extracting contextually structured data from document images, such as by automatically identifying document layout, document data, document metadata, and/or correlations therebetween in a document image, for instance. Many embodiments are particularly directed to generating and utilizing a document template database for automatically extracting document image contents into a contextually structured format. For example, the document template database may include a plurality of templates for identifying and explaining key data elements in various document image formats that can be used to extract contextually structured data from incoming document images with a matching document image format. Several embodiments are particularly directed to automatically identifying and associating document metadata with corresponding document data in a document image, such as for generating a machine-facilitated annotation of the document image. In some embodiments, the machine-facilitated annotation of a document may be used to generate a template for the template database. These and other embodiments are described and claimed.

Some challenges facing extracting data from document images include an inability to recover contextual insights from a document image based on the output of an optical character recognition (OCR) process. In other words, an OCR process may identify the words and text in a document image, but little or no information regarding type or relationships between the words and text in the document image is provided by the OCR process. For example, a document image may include a form with data entries (e.g., an invoice, a bill of sale, a bill of lading, a loan application). In some such examples, an OCR process may identify that the form includes the following text: 'Subtotal', 'Total', '$7.50', and '$8.23', however, the OCR process provides no indication of which amount the 'Subtotal' is related to or which amount the 'Total' is related to. In other words, the OCR process cannot identify 'Subtotal' and 'Total' as document metadata or '$7.50' or '$8.23' as document data, nor can the OCR process indicate 'Subtotal' is metadata related to the data, '$7.50' and 'Total' is metadata related to the data, '$8.23'. These and other issues can limit the applicability and usefulness of OCR processes.

Additionally, utilizing manual annotation to determine information regarding type or relationships between the words and text in the document image has several limitations and drawbacks. Some of the limitations of image validation include but are not limited to the following. Manual review is resource intensive, slow, inefficient, and error prone. For example, each document image must be reviewed individually, regardless of similarities between document images, such as in the case of forms. Further, manual review is error prone, especially when significant portions of document images being reviewed are the same or similar. Accordingly, each document image may require review from multiple people for error correction. Additionally, many approaches, such as some pixel based approaches, require the use of graphical processing units (GPUs), which are exceedingly expensive. These and other factors may result in data not being extracted from document images, such as due to the prohibitive cost, and/or extracted data with errors and excessive resource investment. Such limitations can drastically reduce the usefulness of document images and the feasibility of data extraction techniques, contributing to inefficient systems, devices, and methods.

In light of the above challenges, several embodiments described herein include a contextually structuring data system (CSDS) that can automatically extract contextual insights from a document image. These contextual insights may assist in classifying text as data or metadata and/or associating data with corresponding metadata. As described in more detail below, automatic extraction of contextual insights from document images may be efficiently and accurately achieved, at least in part, by including, or utilizing, one or more of the following features, devices, and techniques.

In various embodiments, a CSDS may implement one or more of a batch process and a production process to extract document image contents into a contextually structured format. The batch process and the production may both utilize at least one of a template database for matching document images to a template and a metadata database for generating a machine-facilitated annotation of document images. However, the batch process may be initially performed on a historical collection of document images to build one or more of the template database and the metadata database. While the production process may be used on incoming images after the template database and/or metadata database have been initially built. Nevertheless, the production process may manipulate data in the template and/or metadata databases, such as by creating new data or updating old data.

One or more embodiments disclosed hereby may include a CSDS that operates in the following exemplary manner to extract document image contents into a contextually structured format during a batch process. It will be appreciated that the production process may operate similarly except with operations being performed to compare an incoming document image to templates generated by a previous batch process instead of operations in the batch process that are performed to compare the incoming document to other document images that were concurrently received.

Initially, the CSDS receives unstructured input data (UID) comprising document images, such as images of receipts, forms, bills, orders, and the like. The CSDS may filter and format the UID, such as with a data adjuster, to produce a standardized-filtered collection of images.

Optical character recognition may be performed on each image in the standardized-filtered collection of images to produce semi-structured data comprising word tokens that include text identified in each image and the corresponding locations of the text in each image. Next, the text identified in each image may be removed, leaving the document structure (e.g., boxes, format, background, etc.), and producing a collection of document structures. An image hash function (e.g., dhash, phash, or whash) may be applied to each of the document structures to generate a collection of image hashes. In the batch process, the image hashes may then be used to arrange the standardized-filtered collection of images into clusters with each of the clusters corresponding to a candidate template in a set of candidate template. For instance, the hamming distance between each of the image hashes may be used to cluster the standardized filtered collection of images into groups that each correspond to a candidate template in the set of candidate templates. In the production process, on the other hand, the hash of an incoming document image is used to identify the closest matching templates in the template database (i.e., candidate template matches).

In the batch process, linear regressions may be performed on each of the candidate templates in the set of candidate templates to determine whether each candidate template is an actual template. In the production process, linear regressions may be performed on an incoming document to determine which, if any, templates of one or more candidate template matches correspond to the incoming document. To perform the linear regressions, a set of common words may be identified for each candidate template. For instance, the word tokens in the semi-structured data can be used to determine common words that appear in each of the images that correspond to a respective candidate template. In various embodiments, common words may be determined, or filtered, based on location in the image. For example, SQL Join may be used to match words in common parts of an image using the locations included in word tokens.

Once the set of common words is determined, one or more linear regressions in one or more rounds may be performed to verify the candidate templates as actual templates. In various embodiments, linear regressions for each candidate template may be performed based on the locations of the common words in the cluster of images corresponding to a respective candidate template. In several embodiments, a separate linear regression may be performed for each dimension included in the location comprised in a word token. For example, an x-regression and a y-regression may be performed for a two-dimensional image. In some embodiments, the location comprised in a word token may include a common reference point on a bounding box included in the word token. For example, the bounding box in the word token may include four corners identifying the location of the text in the corresponding image. In such examples, the location used for the linear regression may include the coordinates of one of the four corners of the bounding box. In another such example, the location used for the linear regression may include a center point of the four corners of the bounding box.

In various embodiments, multiple rounds of linear regressions may be performed. In various such embodiments, images and/or common words may be excluded from subsequent rounds of linear regressions based on residuals determined from prior linear regressions, such as based on thresholds. In many embodiments, the linear regressions may utilize the locations of less than each instance of a common word. In many such embodiments, the linear regressions may utilize the locations of the first and last instances of each common word in the images. In various embodiments, the linear regressions may include robust linear regressions. In several embodiments, the linear regressions may be used to determine stretch/compression terms for aligning a document image with a template.

Once the actual templates are identified using linear regressions, an annotation for each of the actual templates may be determined. In one or more embodiments, an annotation for an image may identify metadata and corresponding data in the image, oftentimes referred to as data blocks and/or metadata blocks. More generally, each block of metadata may describe a corresponding block of data in document images. For example, each question in a form would be a metadata block and each answer provided in the form would be the data block that corresponds to one of the questions. In such examples, the metadata describes the data by contextualizing the answer as being in response to the question.

In some embodiments, one or more of the annotations may be provided via a user interface. In many embodiments, one or more of the annotations may be determined automatically by the CSDS (e.g., machine-facilitated annotation). When a template is annotated it may be recorded in the template data base as a template dataset including one or more of a representative document image hash, a representative document structure, a document template with annotations, a list of metadata words, locations for the metadata words, and locations for corresponding data. The template datasets may be used to match future incoming document to the relevant template and annotation.

One or more embodiments disclosed hereby may include a CSDS that operates in the following exemplary manner to automatically identify and associate document metadata with corresponding document data in a document image. In many embodiments, a binary classification model may utilize a frequency analysis, a set of proximate words, and/or metrics corresponding to the set of proximate words to identify metadata in a document image. A set of text blocks may be generated around spatially separate portions text and adjusted based on proximity and location of data versus metadata. Each of the resulting text blocks may comprise a metadata block with at least one metadata word and a data block with at least one data word corresponding to the metadata block. Accordingly, the machine-facilitated annotation may be determined using the resulting text blocks.

The functionality of the CSDS, such as the exemplary operational aspects described above, may result in numerous advances and advantages, including but not limited to the following. As previously mentioned, various embodiments may cluster document templates, such as via linear regression, based on the locations of one or more common words found in document images. This approach differs from pixel-based approaches and can result in improved accuracy, efficiency, and usefulness of data extraction. When a new document image is matched to a template, the CSDS may precisely and efficiently identify and explain key data elements in the new document image, such as by mapping OCR extractions to context (e.g., relating metadata to corresponding data). In various embodiments, words and text that appears in the same place in multiple templates may be extracted and treated as metadata. In some embodiments, a blended image of the background of each image (e.g., document data removed) plus document metadata, or similarity scores between different template images, may be used to confirm a template match.

Many embodiments may reduce, or remove, the need for manual review, improving overall efficiency. For example, in various embodiments, distinct image quality, document structure, document metadata, and document data scores may be utilized to create an overall image ranking score. In various such embodiments the overall image ranking score may be used to prioritize which document images should be manually reviewed. This may allow document images with one or more of low-quality ratings, poor document structure, missing metadata, and a high level of textual errors to be readily identified for manual review. One or more embodiments may utilize machine learning techniques to continually improve template matching accuracy and/or computed image review priority ranking scores. Several embodiments may adjust for skew, noise, and/or shifting among document images. Many embodiments may operate without the need for all words to be read accurately from a document image by OCR. Additionally, embodiments may be realized without the need for GPUs, reducing the cost of implementation.

In some embodiments, each identified template may initially be manually annotated to enable future identification/explanation of key data elements in other documents matching the template. However, many embodiments may utilize automated identification/explanation of key data elements (e.g., prediction of where to find key data elements in a document image) to annotate identified templates. By including automated identification/explanation of key data elements, one or more CSDSs disclosed hereby may automatically annotate document images, and incoming document images may be matched to both automatically annotated and human annotated templates, such as using linear regressions. Some embodiments may generate a model that predicts whether words are metadata based on metadata history for that word and/or surrounding context. Images that are not matched to a template (referred to as singletons) may be scored by the model to predict which words are likely to be metadata. However, these techniques can be used for multi-image templates (for which metadata is known without the model) and singletons (for which the model is used to predict the metadata).

In many embodiments, blocks of text may be efficiently agglomerated based on spatial proximity and then subdivided based on a combination of metadata location and column-wise pixel intensity. This process can allow for machine-facilitated annotations by automatically associating metadata elements with relevant text. In many embodiments, this can enable immediate value to be derived from the system while manual annotations may be performed as needed, such as for improved accuracy. Additionally, these techniques do not require deep learning methods or other modeling that is computationally intensive and/or requires heavy compute power. However, these techniques produce a structure that is useful input to convolutional neural network (CNN) models and any boosts in accuracy resulting from the deep learning method may be readily added to supplement accuracy results.

In these and other ways, components described here may provide techniques to improve extracting data from document images, resulting in increased efficiency, decreased computational cost, and/or reduced resource requirements, in an accurate, dynamic, and scalable manner, resulting in several technical effects and advantages over conventional computer technology, including increased capabilities and improved adaptability. For example, components described hereby may access and derive valuable insights from information in document images that was previously inaccessible, or impractical to access. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. For example, components described herein may enable a computing device to digitize and/or extract key information from document images. In some embodiments, digitizing and/or extracting key information from document images may enable a computing device to assist the visually impaired with interpreting and understanding key information in document images. Further, one or more of the features, techniques, and/or components described herein may be utilized to improve the technical field of data extraction, digitization, data mining, data management, record keeping, and/or the like.

In several embodiments, components described herein may provide specific and particular manners of extracting contextually structured data from document images. In multiple embodiments, the specific and particular manners of extracting contextually structured data from document images may include one or more of annotating document images, generating document templates, matching document images to templates, and/or identifying/explaining of key data elements in a document image. In several embodiments, the specific and particular manners of extracting contextually structured data from document images may include using image hash function to cluster document images with words removed (e.g., removing data and leaving metadata prior to clustering). In many embodiments, the specific and particular manners of extracting contextually structured data from document images may include producing three-dimensional pixel masks for images with image blending. In various embodiments, the specific and particular manners of extracting contextually structured data from document images may include a pixel-to-pixel translation algorithm that allows for highly precise mapping of individual images to reference document templates and/or identification of template matches. In multiple embodiments, the specific and particular manners of extracting contextually structured data from document images may include generating an overall image review priority ranking score based on one or more of distinct image qualities, document structure, document metadata, and document text scores. In many embodiments, one or more of the components described herein may be implemented as a set of rules that improve computer-related technology by allowing a function not previously performable by a computer that enables an improved technological result to be achieved. For example, the function allowed may include classifying text in document images as data or metadata and associating the data with corresponding metadata in the document image.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
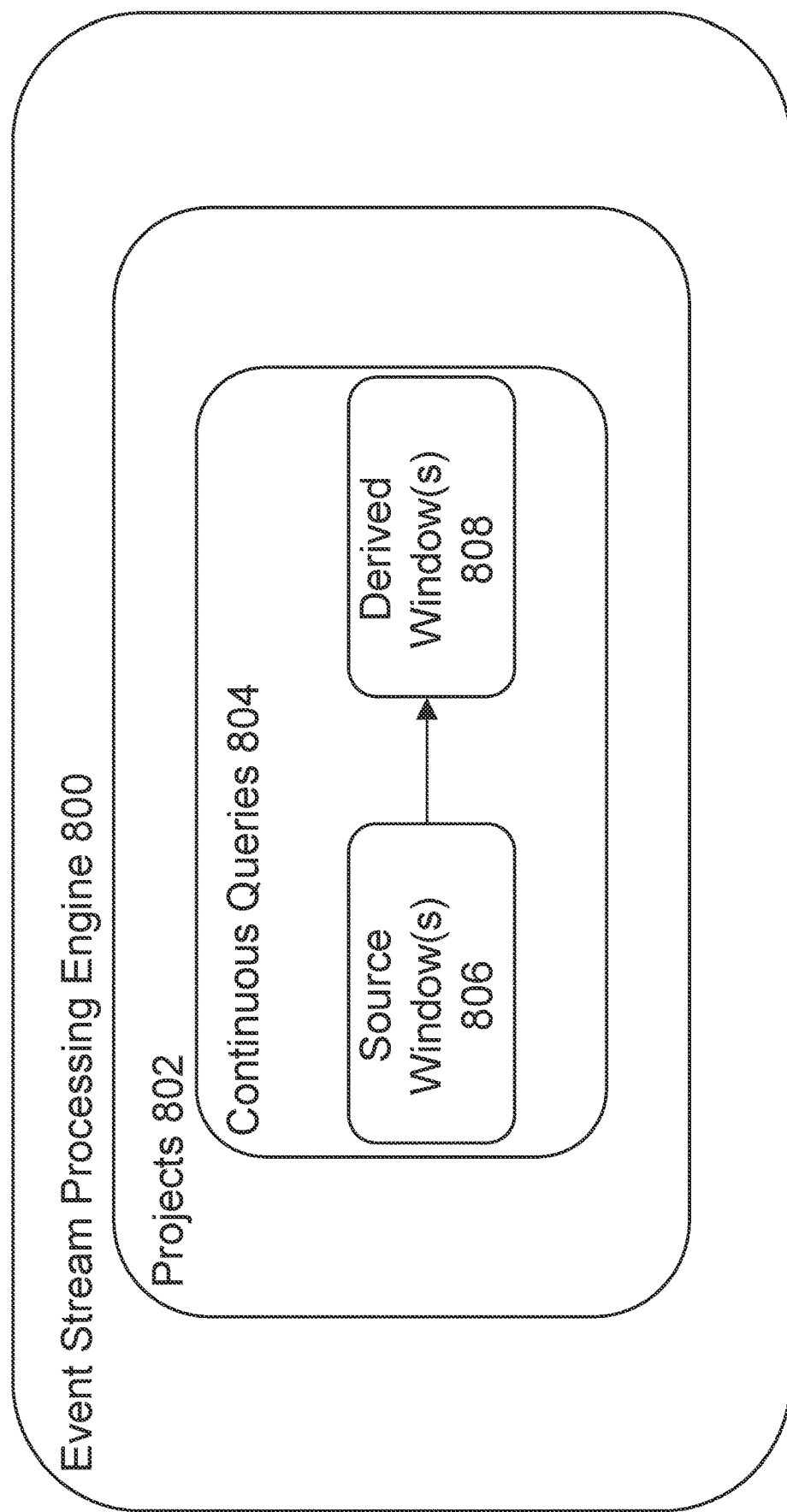
FIG. 8 illustrates a block diagram including components of an Event Stream Processing Engine (ESPE), according to embodiments of the present technology.
Figure 9:
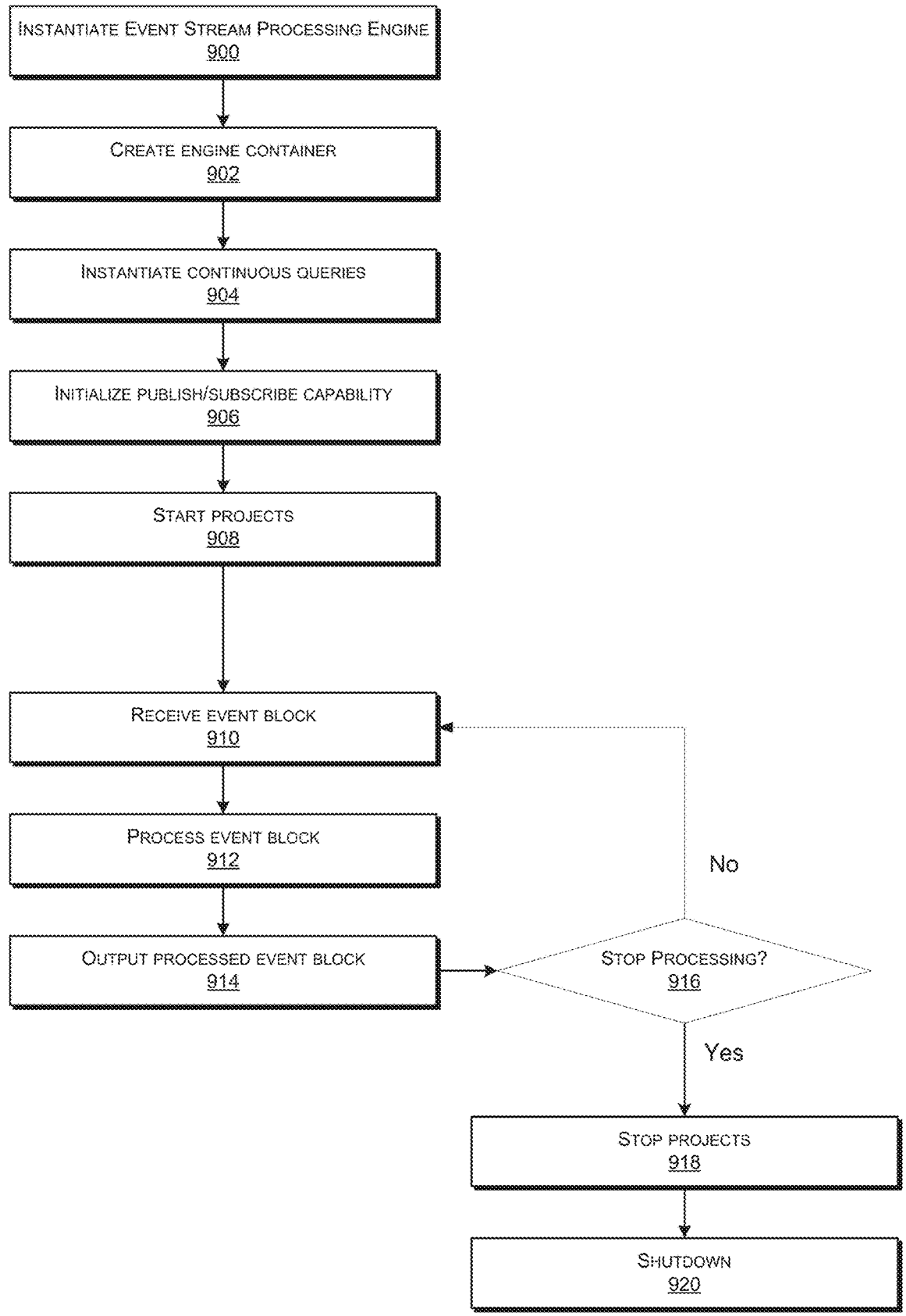
FIG. 9 illustrates a flow chart showing an example process including operations performed by an event stream processing engine, according to some embodiments of the present technology.
Figure 10:
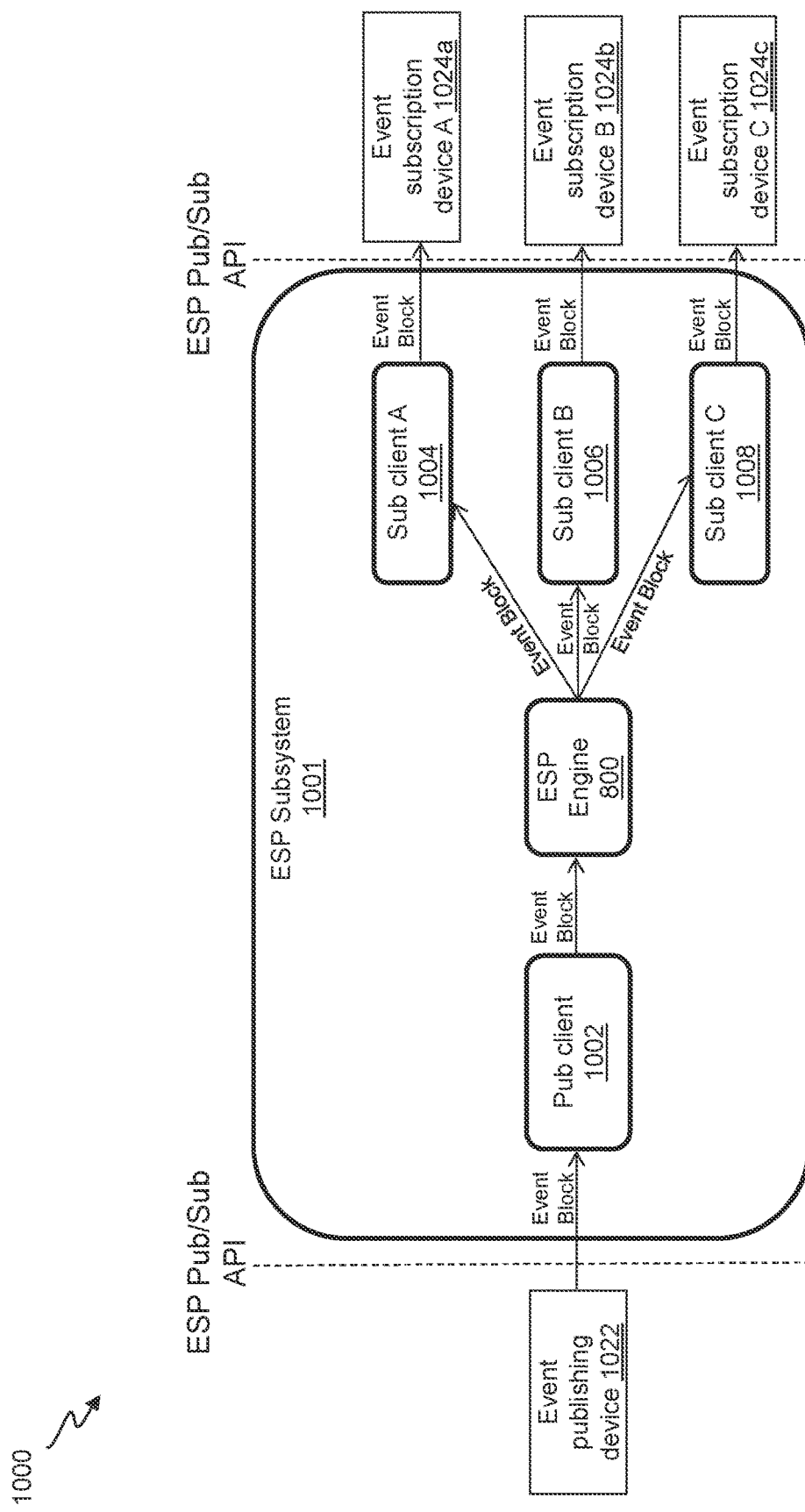
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed databased on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
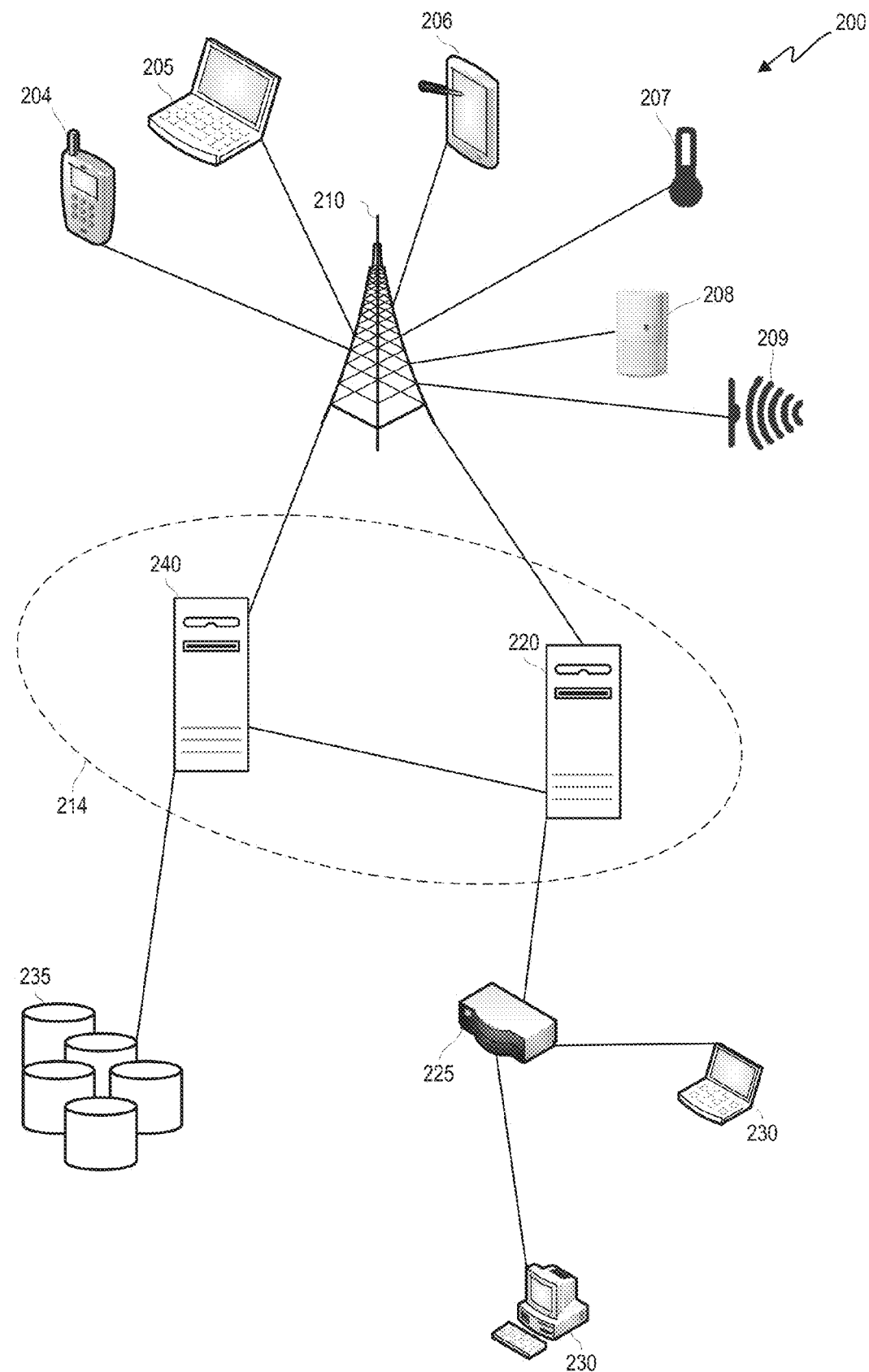
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real-time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results databased on the client's needs and rules.

Figure 3:
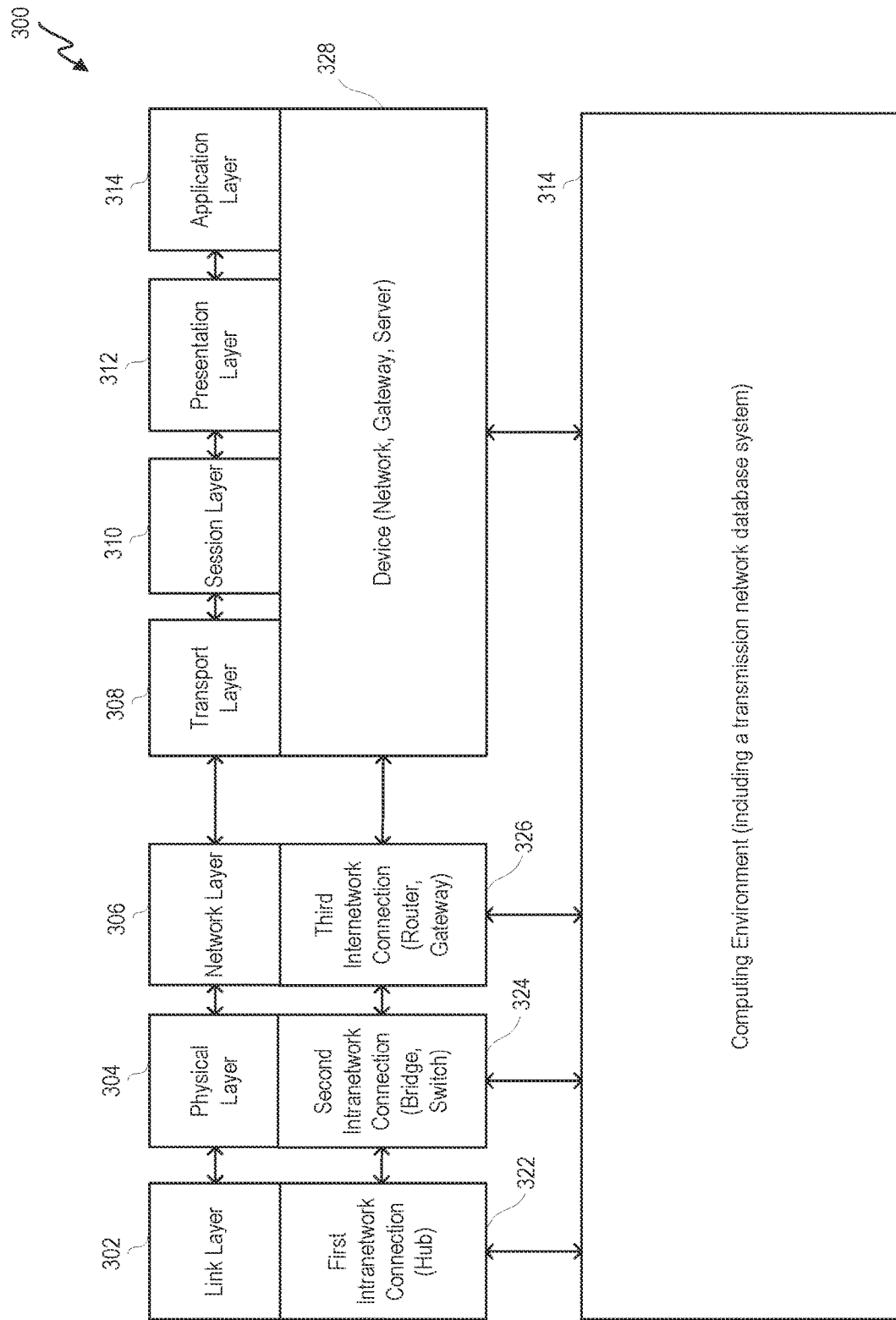
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format databased on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
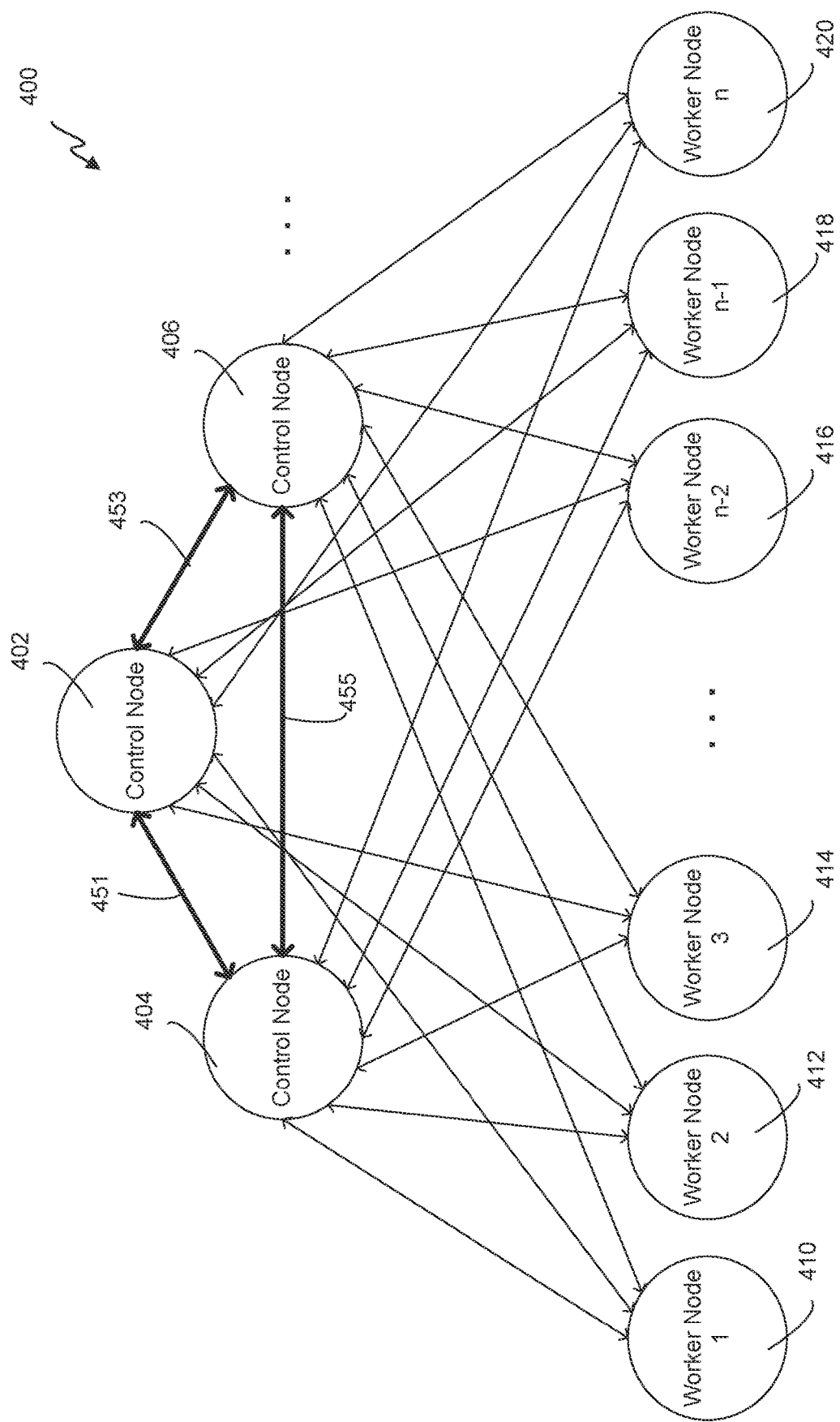
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology.

Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
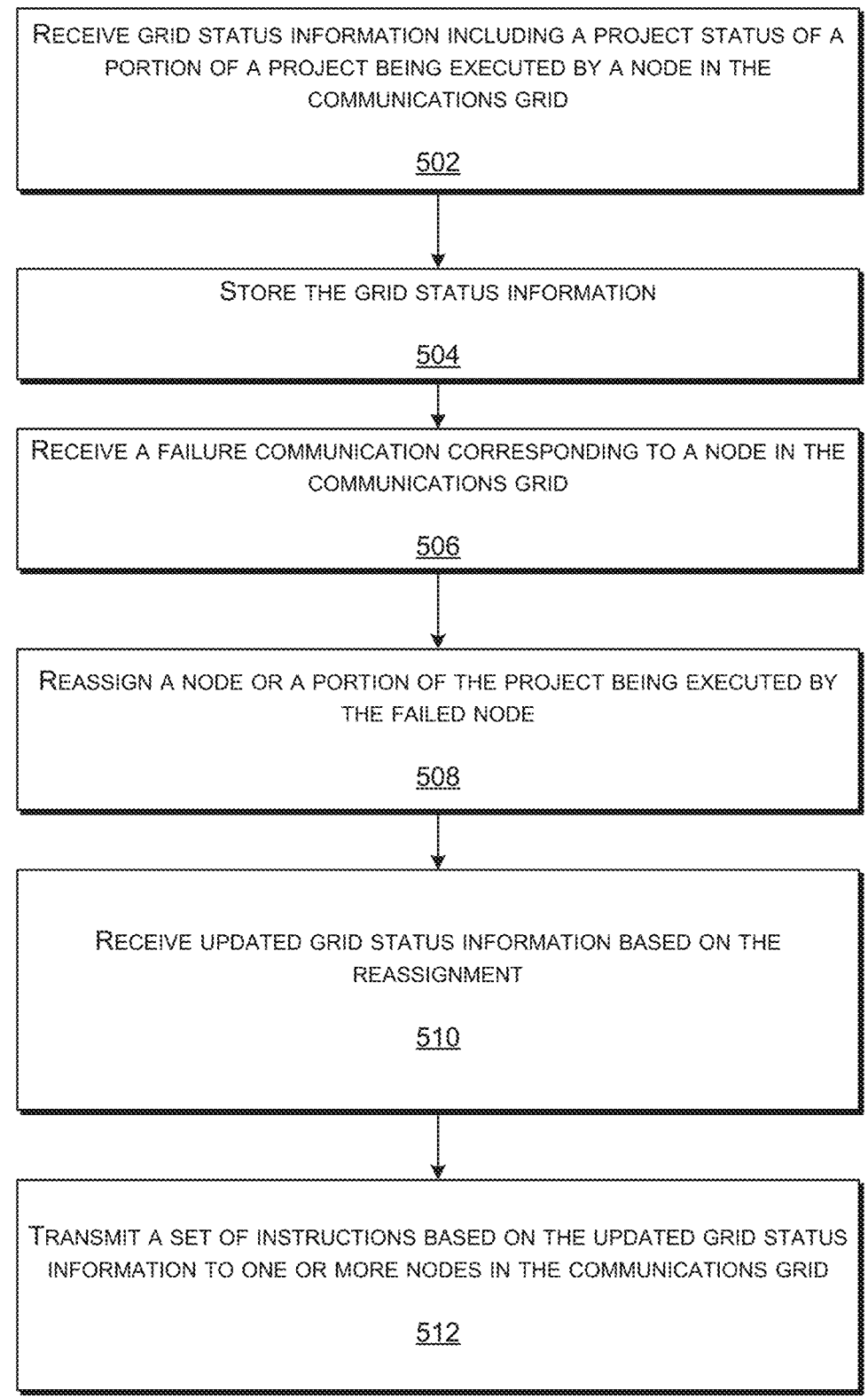
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
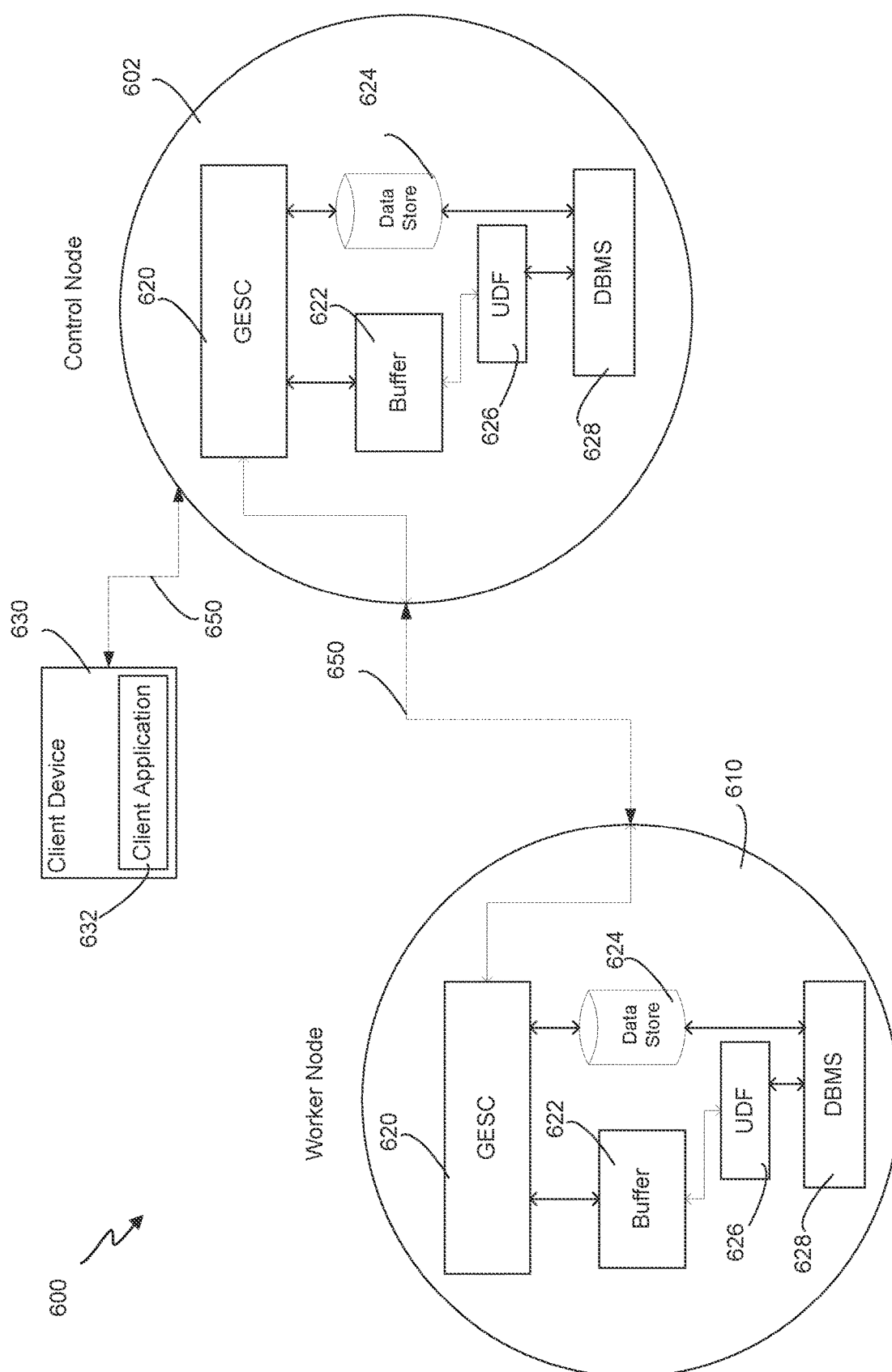
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1.

Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
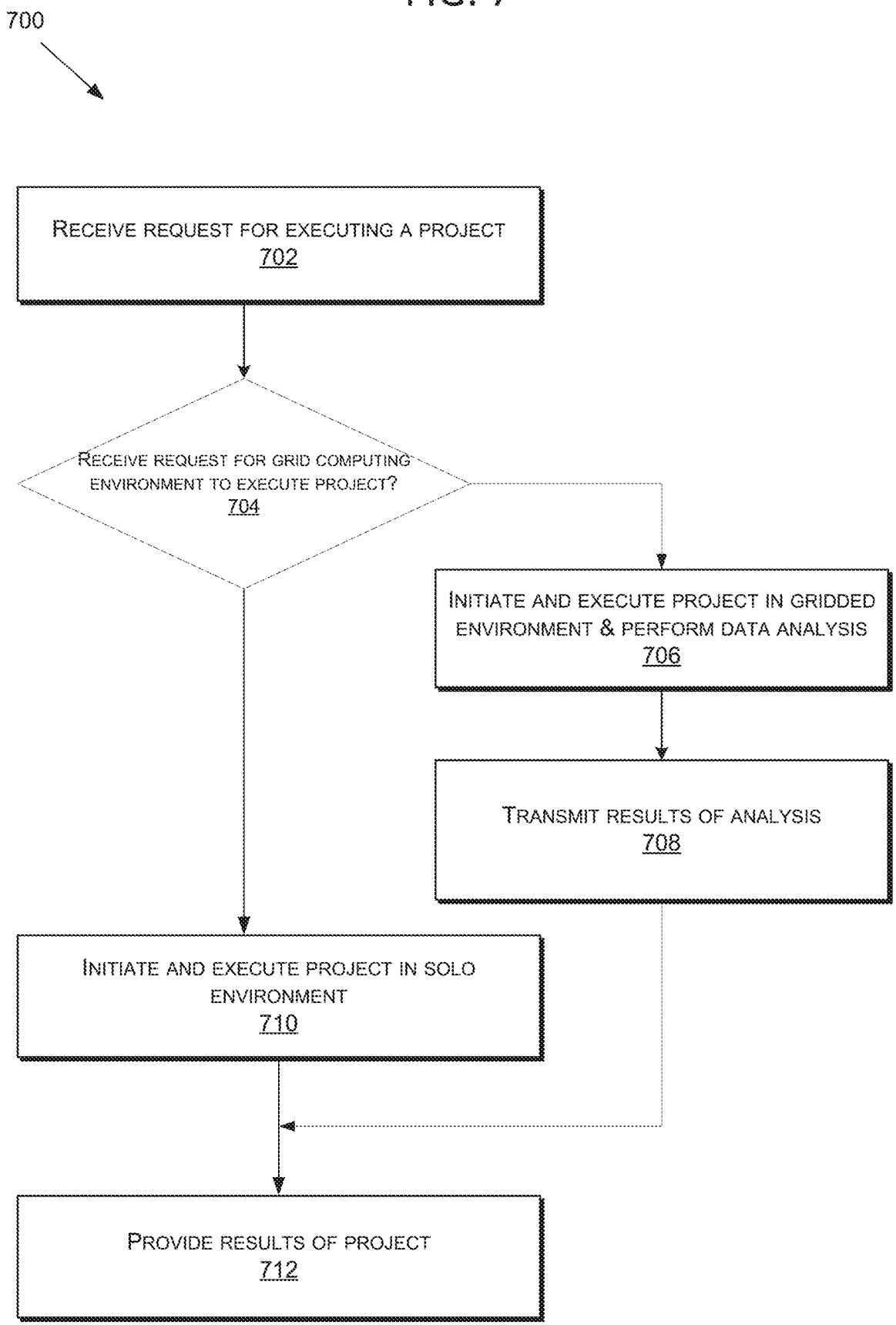
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device

1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe application programming interface (API) may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
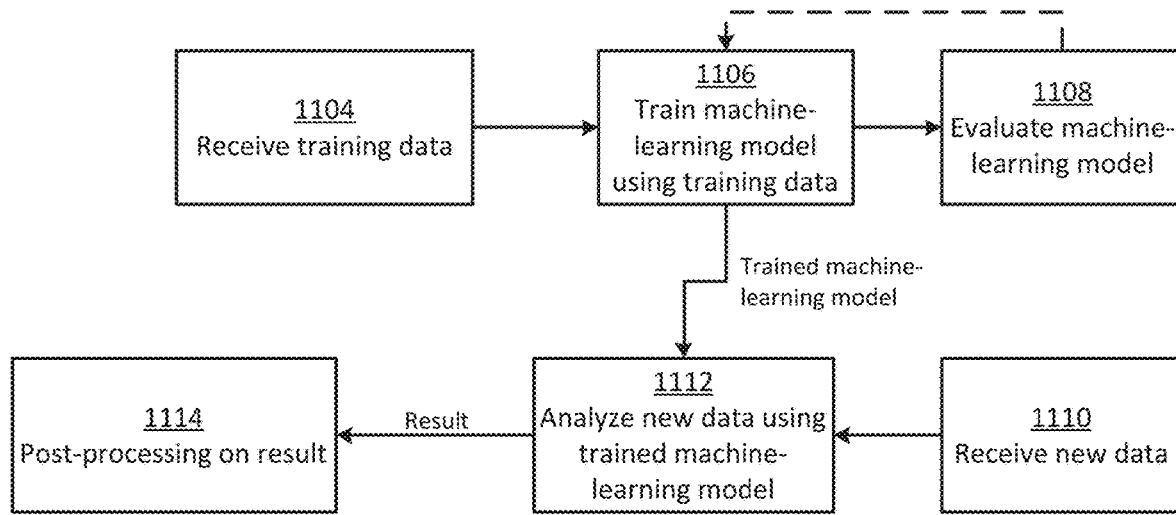
FIG. 11 illustrates a flow chart showing an example process for generating and using a machine-learning model, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
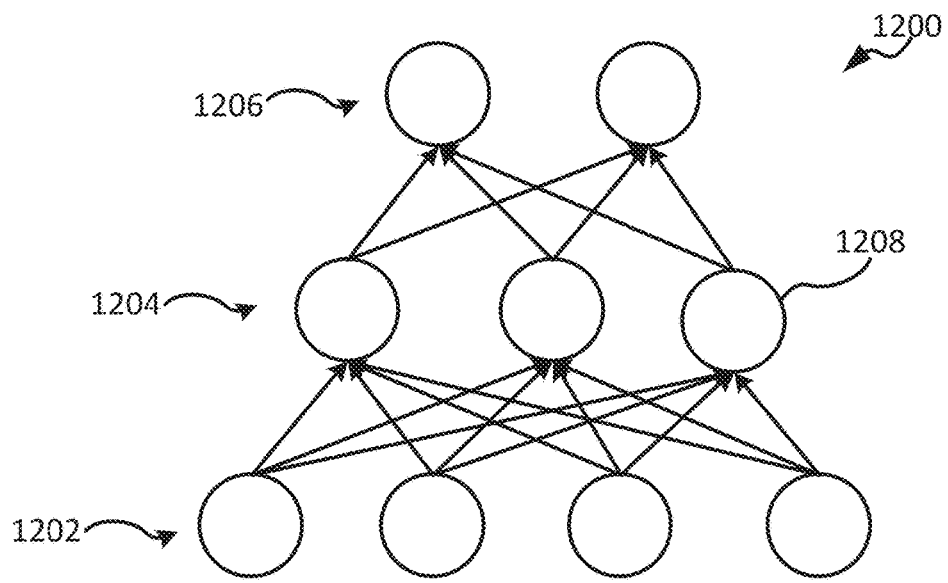
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), a complex programmable logic device (CPLD), a digital signal processor (DSP), a system on a chip (SOC), hardware accelerators (e.g., an artificial intelligence (AI) accelerator, cryptographic accelerator), a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing. Still further, one or more of these processors may be used in applications that do not utilize machine learning.

According to embodiments discussed herein, the above-described computing devices and systems may be utilized to implement one or more components of a CSDS, such as a reinforcement trainer. In some embodiments, machine learning may be utilized to continuously improve template matching accuracy and/or the computed image review priority ranking score. In many embodiments, one or more components of a CSDS output data in a format that is readily input to convolutional neural network (CNN) models. In several embodiments, machine learning (e.g., deep learning) may be utilized to improve the accuracy of a CSDS. For example, machine learning may be utilized to improve one or more of identification of templates, data/metadata identification, and data/metadata correlation. These and other features described herein may result in an improved computer by enabling a computing device and/or system implementing one or more components of an CSDS to realize unique and advantageous functionalities, such as automatically contextualizing data extracted from an image.

Figure 13:
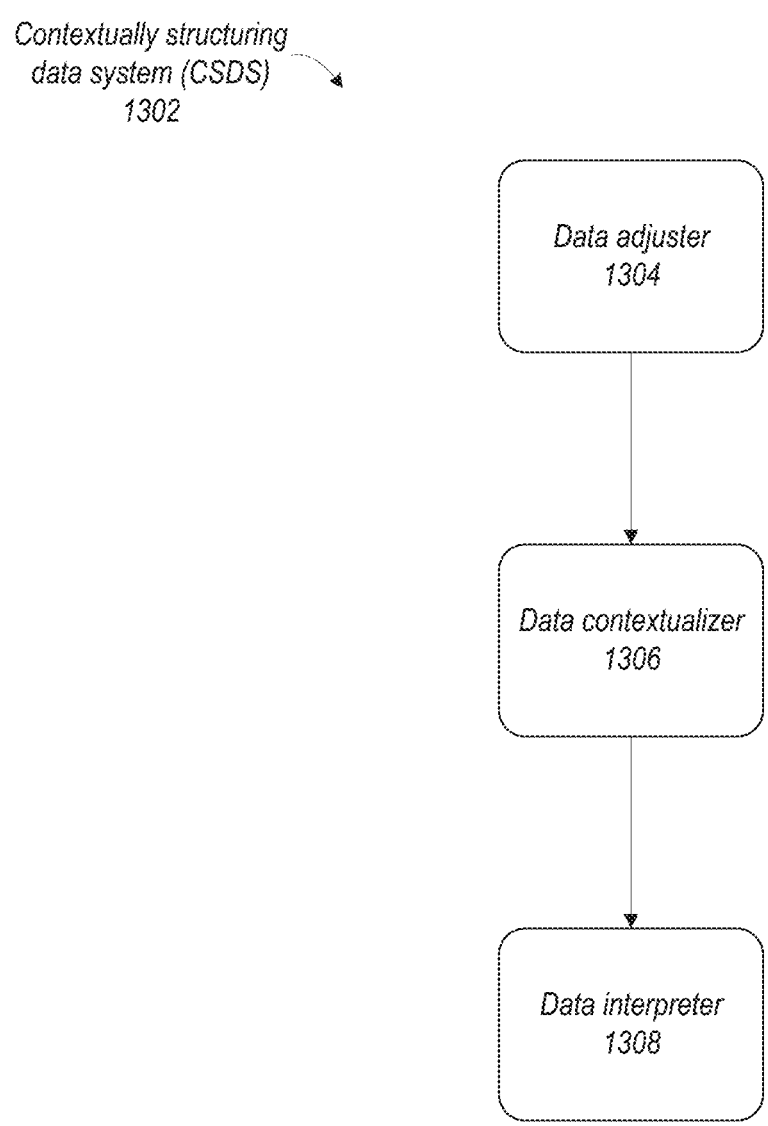
FIG. 13 illustrates an exemplary contextually structuring data system (CSDS), according to some embodiments of the present technology.

FIG. 13 illustrates a contextually structuring data system (CSDS) 1302 according to one or more embodiments described hereby. The CSDS 1302 may include a data adjuster 1304, a data contextualizer 1306, and a data interpreter 1308. The components of CSDS 1302 may interoperate to identify, extract, analyze, interpret, predict, and/or present one or more of data, metadata, and data/metadata correlations to produce data contextually structured data from document images. In various embodiments, the data adjuster 1304 may be responsible for filtering and formatting data for input to the data contextualizer 1306. Oftentimes, the data contextualizer 1306 may extract contextually structured data from the filtered and formatted input data. Typically, the data interpreter 1308 may provide output data interpretation and user interface functionalities. In some embodiments, the data interpreter 1308 may generate an overall image review priority ranking score based on one or more of distinct image qualities, document structure, document metadata, and document text scores. In many embodiments, one or more components illustrated in FIG. 13, or described with respect thereto, may be the same or similar to one or more other components described herein. Embodiments are not limited in this context.

CSDS 1302 may implement one or more of a batch process and a production process to extract document image contents into a contextually structured format. The batch process and the production may both utilize at least one of a template database for matching document images to a template (see e.g., FIG. 15A) and a metadata database for generating a machine-facilitated annotation of document images (see e.g., FIG. 15B). However, the batch process may be initially performed on a historical collection of document images to build one or more of the template database and the metadata database. While the production process may be used on incoming images after the template database and/or metadata database have been initially built. Nevertheless, the production process may manipulate data in the template and/or metadata databases, such as by creating new data or updating old data.

In some embodiments, CSDS 1302 operates as follows to extract document image contents into a contextually structured format during a batch process. It will be appreciated that the production process may operate similarly except with operations being performed to compare an incoming document image to templates generated by a previous batch process instead of operations in the batch process that are performed to compare the incoming document to other document images that were concurrently received. Oftentimes, the batch process may be used to determine a list of unique templates.

Initially, the CSDS 1302 receives unstructured input data (UID) comprising document images via data adjuster 1304. Data adjuster 1302 may filter and format the UID, such as with a data adjuster, to produce a standardized-filtered collection of images.

Optical character recognition may be performed on each image in the standardized-filtered collection of images to produce semi-structured data comprising word tokens that include text identified in each image and the corresponding locations of the text in each image. In many embodiments, the data adjuster 1304 may perform OCR or utilize an API to have an OCR process performed.

Next, the data contextualizer 1306 may remove the text identified in each image, leaving the document structure (e.g., boxes, format, background, etc.), and producing a collection of document structures. Further data contextualizer 1306 may apply an image hash function (e.g., dhash, phash, or whash) to each of the document structures to generate a collection of image hashes. In the batch process, the image hashes may then be used by the data contextualizer 1306 to arrange the standardized-filtered collection of images into clusters with each of the clusters corresponding to a candidate template in a set of candidate template. For instance, the hamming distance between each of the image hashes may be used to cluster the standardized filtered collection of images into groups that each correspond to a candidate template in the set of candidate templates. In the production process, on the other hand, the hash of an incoming document image is used to identify the closest matching templates in the template database (i.e., candidate template matches). In many embodiments, a hash may be compared to all (or a subset) of the hashes from other documents, and the hash with the lowest hamming distance may be used. In many such embodiments, this may be available as hashes take up very little storage (in memory) and computing the hamming distance is not computationally intensive.

In the batch process, linear regressions may be performed by the data contextualizer on each of the candidate templates in the set of candidate templates to determine whether each candidate template is an actual template. In the production process, linear regressions may be performed on an incoming document to determine which, if any, templates of one or more candidate template matches correspond to the incoming document. To perform the linear regressions, a set of common words may be identified for each candidate template. For instance, the word tokens in the semi-structured data can be used to determine common words that appear in each of the images that correspond to a respective candidate template. In various embodiments, common words may be determined, or filtered, based on location in the image. For example, SQL Join may be used to match words in common parts of an image using the locations included in word tokens.

Once the set of common words is determined, one or more linear regressions in one or more rounds may be performed to verify the candidate templates as actual templates (see e.g., FIGS. 27A-27F. In various embodiments, linear regressions for each candidate template may be performed based on the locations of the common words in the cluster of images corresponding to a respective candidate template. In several embodiments, a separate linear regression may be performed for each dimension included in the location comprised in a word token. For example, an x-regression and a y-regression may be performed for a two-dimensional image. In some embodiments, the location comprised in a word token may include a common reference point on a bounding box included in the word token. For example, the bounding box in the word token may include four corners identifying the location of the text in the corresponding image. In such examples, the location used for the linear regression may include the coordinates of one of the four corners of the bounding box. In another example, the four corners may be utilized to identify the center point of the bounding box and the center point of the bounding box may be used for the linear regressions. In many embodiments, rotation is adjusted for before running the clustering process. As such, any of the possible locations may be used.

In various embodiments, multiple rounds of linear regressions may be performed. In various such embodiments, images and/or common words may be excluded from subsequent rounds of linear regressions based on residuals determined from prior linear regressions, such as based on thresholds. In many embodiments, the linear regressions may utilize the locations of less than each instance of a common word. In many such embodiments, the linear regressions may utilize the locations of the first and last instances of each common word in the images. In various embodiments, the linear regressions may include robust linear regressions. In several embodiments, the linear regressions may be used to determine stretch/compression and shift terms for aligning a document image with a template.

Once the actual templates are identified using linear regressions, an annotation for each of the actual templates may be determined. In one or more embodiments, an annotation for an image may identify metadata and corresponding data in the image, oftentimes referred to as data blocks and/or metadata blocks. More generally, each block of metadata may describe a corresponding block of data in document images. For example, each question in a form would be a metadata block and each answer provided in the form would be the data block that corresponds to one of the questions. In such examples, the metadata describes the data by contextualizing the answer as being in response to the question.

In some embodiments, one or more of the annotations may be provided via a user interface, such as a graphical user interface generated by data interpreter 1308. In many embodiments, one or more of the annotations may be determined automatically by the CSDS (e.g., machine-facilitated annotation), such as with data contextualizer 1306. When a template is annotated it may be recorded in the template data base as a template dataset including one or more of a representative document image hash, a representative document structure, a document template with annotations, a list of metadata words, locations for the metadata words, and locations for corresponding data. The template datasets may be used by the data contextualizer 1306 to match future incoming document to the relevant template and annotation.

As will be described in more detail below, such as with respect to FIGS. 28A-28E, CSDS 1302 may operate to automatically identify and associate document metadata with corresponding document data in a document image, such as with data contextualizer 1306. In many embodiments, a binary classification model may utilize a frequency analysis, and/or metrics corresponding to the set of proximate words to identify metadata in a document image. In many embodiments, the set of proximate words may be determined based on a proximity threshold. In many embodiments, word tokens from an OCR process performed on the document image may be utilized to identify the set of proximate words. A set of text blocks may be generated around spatially separate portions of text and adjusted based on proximity and location of data versus metadata. Each of the resulting text blocks may comprise a metadata block with at least one metadata word and a data block with at least one data word corresponding to the metadata block. Accordingly, the machine-facilitated annotation may be determined using the resulting text blocks.

In many embodiments, CSDS 1302 includes an algorithm that begins by training on a corpus of historical customer data (e.g., a document collection for a batch process). The algorithm may begin by running optical character recognition (OCR) on each image and recording the location of each word. The algorithm may then create a copy of that page with every word read by OCR removed to produce a collection of document structures. The document structures are input to an image hash function to produce a collection of image hashes. Once the algorithm has run on each available collection of document images, the algorithm computes hamming distances and clusters the document images based on hamming distance. This can provide a list of candidate template matches that are then passed to a word-based algorithm for linear regressions (see e.g., FIGS. 27A-27F).

Computing hamming distance on the whole template may include an n-digit hash. In various embodiments, the image may have all of the text (data and metadata) to leave only repetitive, consistent invariant non-text elements (e.g., logos, bounding boxes). In many embodiments, this serves as a first check to avoid unnecessary processing. For example, the check can avoid running the linear regressions for pairs of documents that clearly have different document structures. For each candidate template match, the algorithm may find instances where the same word is in approximately the same location in both documents and create a table data structure with the matched words and their locations in each data set. In many embodiments, all instances of a matched word may not be used. In many such embodiments, utilizing less than all instances of a matched word may improve accuracy because multiple versions of the same word may create excessive outliers that skew the results. For example, only the first and last instance of a matched word may be used in document images. In some embodiments, the algorithm then runs two robust linear regressions on the locations of the words in the template vs. the new image (separately for x and y coordinates). Robust linear regressions may be used because they correct for outliers. For example, when the same word appears in different places in an image may result in large outliers that may cause a non-robust linear regression to have errors. When the templates are the same a linear transformation exists between the matched words on each page. However, large residuals can occur when the same word appears twice in almost the same location (e.g., 'via ground', 'via air', and 'via ship' in a column). Thus, these words are filtered out, such as based on residual thresholds, and the robust regressions are re-run.

The coefficients of the linear regressions indicate the shifting and compression constants. The intercept may indicate the shift constant and the slope may indicate the compression constant. The angle of rotation can also be computed from the coefficient of the opposite axis. (if original scanned at an angle to produce document image, it adjusts and allow you to map it to the template). After the match is found, words that appear in the same location (adjusted for angle, zoom, and shift) in both images are likely part of the template and can be considered template words. The structure of each image (with the words removed as described in the image hashing description) can also be adjusted for angle, zoom, and shift.

In many embodiments, document structure similarity scores are computed. Sometimes, the document structure similarity score and the number of words appearing in the same location are combined to create an estimate of the likelihood that two document images have a common format. The document structure similarity score may provide a numerical indication of the similarity between the structure of an incoming image and a template.

In various embodiments, multiple similarity scores (e.g., scores corresponding to one or more of image quality, document structure, document metadata, and document data) may be compared/utilized to confirm that images are the same (such as by creating overall image ranking scores). After the matching portion of the algorithm is complete, matches are grouped into clusters corresponding to common templates. In many embodiments, one or more of a blended image (see FIG. 24), a pixel mask (see FIG. 25), and a document template (see FIG. 26) may be produced for each cluster. In many such embodiments, the blended image, pixel mask, and/or document template may be stored in a template database as a template dataset. In some embodiments, an operator can be prompted to manually annotate a single image for each cluster. In other embodiments, the CSDS may automatically annotate an image for each cluster (see FIGS. 28A-28E). These and other features disclosed hereby may allow the algorithm to accurately predict the location of each annotation for every image in the cluster.

For each image cluster, a representative document image hash, background image (with words removed), manual annotations, and list of metadata words with their locations will be stored in a template database, such as in a corresponding template dataset. The template dataset will be used by the production process (see e.g., FIG. 22) to match incoming documents to known templates.

After the historical analysis (batch process) is complete, a slightly modified process will allow analysis of incoming documents (production process). The key difference is that instead of comparing new images to each other, they will be matched against the information stored for each existing cluster in the template database. The clustering algorithm from above (including image hashing and word-based clustering) will determine if each new document belongs to an existing template. If so, the annotations can then be determined by adjusting the cluster annotation for the angle, zoom, and shift of the incoming image. If there is no match, the new image will be sent to an operator for a manual annotation exercise or be automatically be annotated by the CSDS 1302.

Many embodiments may result in one dataset per template with one record per document image. In various embodiments, each column may be a data value from the document image. Several embodiments may estimate confidence scores at multiple levels (e.g., template and field level). Oftentimes confidence scores may be utilized to prioritize images for manual review, such as by triggering an exception handler. The exception handler may interrupt or divert the normal process flow of an algorithm. For example, a confidence score below a minimum threshold may generate an exception that causes the exception handler to tag the corresponding image for manual review. In some such examples, the exception handler may cause the corresponding image to be removed from or added to one or more collections and/or analyses, such as in response to user input (see e.g., FIGS. 19C and 19D). In some embodiments, disposition history (e.g., previous actions and/or input in response to the same or similar circumstances) is used to adjust baseline confidence scores. For instance, some templates and fields are expected to be more accurately captured than other. In another instance, baseline confidence scores may be adjusted with the objective of reducing the amount time spent reviewing accurate extractions and increasing the amount of time spent reviewing of inaccurate extractions.

Various embodiments may include a graphical user interface (GUI) for manual review. In some embodiments, manual reviews may be presented with a GUI that prioritizes which images have the greatest need for manual review. In some such embodiments, columns can be interactively filtered and sorted. In many embodiments, rankings may be computed based on a composite score derived from the confidence associated with each step of the process. For example, the composite score may be based on scores relating to one or more of assessed image quality, template matching distance, document structure overlap, identified metadata overlap, and overall text field accuracy.

Figure 14:
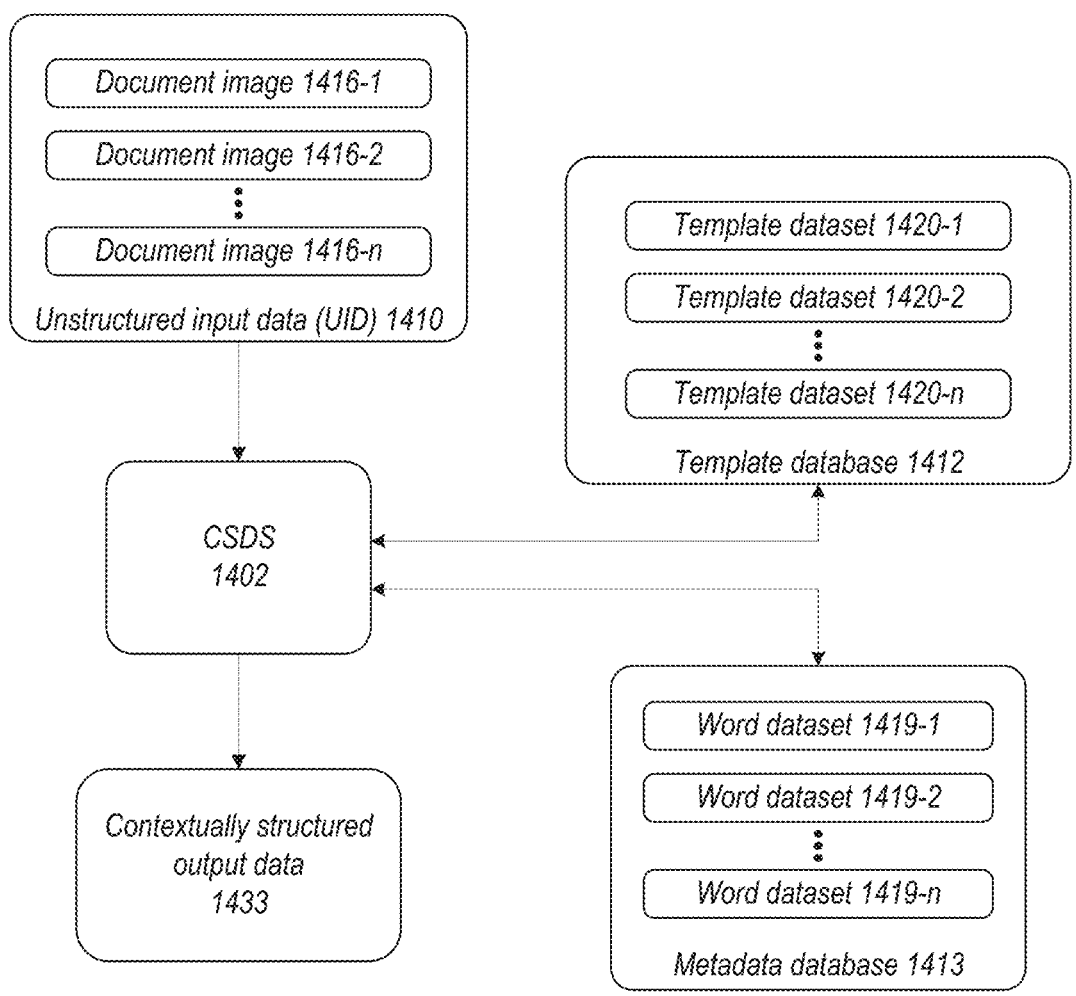
FIG. 14 illustrates an exemplary CSDS in an operating environment, according to some embodiments of the present technology.

FIG. 14 illustrates a CSDS 1402 in operating environment 1400 according to one or more embodiments described hereby. The operating environment 1400 may include CSDS in conjunction with unstructured input data (UID) 1410, template data set 1412, metadata database 1413, and contextually structured output data 1433. Generally, CSDS 1402 may utilize template database 1412 and/or metadata database 1413 to generate contextually structured output data 1433 based on UID 1402. Oftentimes, CSDS 1402 may generate, maintain, and/or refine the template database 1412 and the metadata database 1413 to improve the contextually structured output data 1433 generated by the CSDS 1402. The UID 1410 may include one or more document images 1416-1, 1416-2, 1416-*n* (or document images 1416). The template database 1412 may include one or more template datasets 1420-1, 1420-2, 1420-*n* (or template datasets 1420). The metadata database 1413 may include one or more word datasets 1419-1, 1419-2, 1419-*n* (or word datasets 1419). As will be described in more detail below, the template database 1412 may be utilized by CSDS 1402 to match document images in UID 1410 to a template dataset in template database 1412 and the metadata database 1413 may be utilized by CSDS 1402 to identify metadata and correlate the metadata with associated data (e.g., text) in document images in UID 1410. In many embodiments, one or more components illustrated in FIG. 14, or described with respect thereto, may be the same or similar to one or more other components described herein. For example, CSDS 1402 may be the same or similar to CSDS 1302. Embodiments are not limited in this context.

Figure 15A:
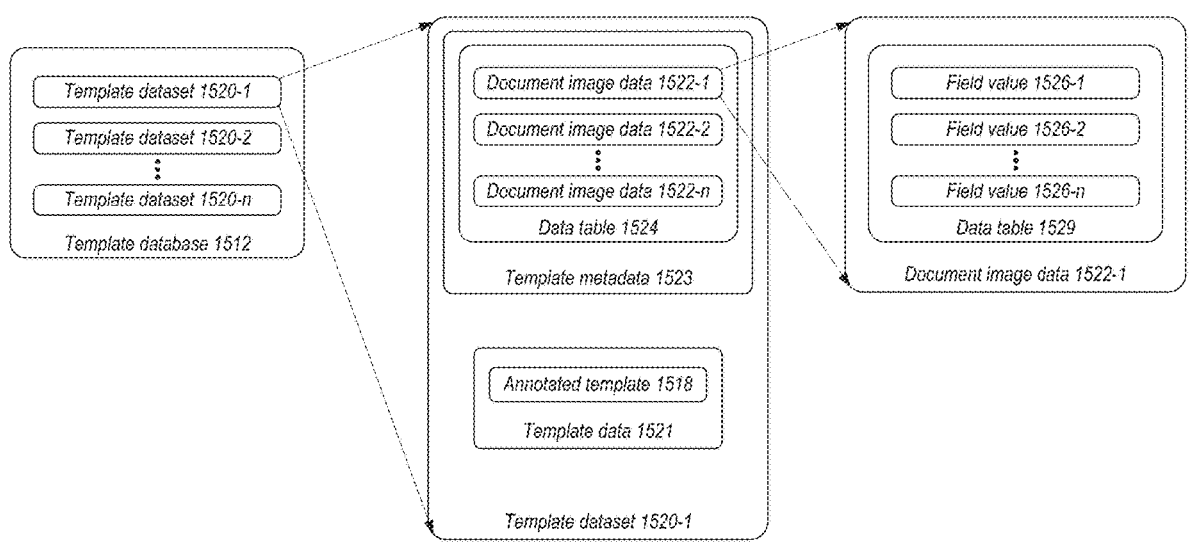
FIG. 15A illustrates various features of an exemplary template database, according to some embodiments of the present technology.

FIG. 15A illustrates various features of a template database 1512 according to one or more embodiments described hereby. The template database 1512 may include one or more template datasets 1520-1, 1520-2, 1520-*n* (or template datasets 1520). Each of the template datasets 1520 may include template data 1521 with an annotated template 1518, template metadata 1523 with data table 1524 having one or more document image data 1522-1, 1522-2, 1522-*n* (or document image data 1522). Each of the one or more document image data 1522 may include a data table 1524 with one or more field values 1526-1, 1526-2, 1526-*n* (or field values 1526). In various embodiments, the template database 1512 may be utilized to match incoming document images to one of the template datasets 1520. In various such embodiments, the matched template dataset may be utilized to annotate the matched incoming document image and produce contextually structured data from the matched incoming document image. In some embodiments, data tables may refer to indexes of and/or pointers to available data. In many embodiments, one or more components illustrated in FIG. 15A, or described with respect thereto, may be the same or similar to one or more other components described herein. For example, template database 1512 may be the same or similar to template database 1412. Embodiments are not limited in this context.

More generally, the document template database 1512 may include a plurality of template datasets 1520 for identifying and explaining key data elements in various document image formats that can be used to extract contextually structured data from incoming document images with a matching document image format. A CSDS may utilize the template datasets 1520 to facilitate the extraction of contextually structured data from document images with a known format or layout. In several embodiments, each template dataset 1520 may include a representative document image hash, a representative document structure, the annotated template 1518, and a list of metadata words with locations for the annotated template.

In various embodiments, template data 1521 may include data used to match and extract data from incoming document images and template metadata 1523 may include data used to generate and/or characterize the template data set 1520-1. For example, the annotated template 1518 may identify data and metadata portions of an image as well as associations between data and metadata in the image. In some such examples, annotated template may include word tokens from the image as well as associations between the word tokens. In various embodiments, template data 1521 may include one or more blended images, pixel masks, word tokens, and document structures, in addition to annotated template 1518 for to matching and extracting data from incoming document images. On the other hand, for example, template metadata 1523 may include one or more of confidence scores, document images used to create the template dataset, and document images assigned to the template dataset.

In many embodiments, a template dataset may include one or more word tokens, such as in template data 1521, annotated template 1518, template metadata 1523, and/or document image data 1522. Word tokens may identify text and locations of the text in a document image. In several embodiments, word tokens may be semi-structured data output from an OCR process. Word tokens may include an indication of a corresponding image, an America Standard Code for Information Interchange (ASCII) version of image text and a location in the corresponding image. In some embodiments, the location in the corresponding image may include four points that define a bounding box around the image text.

Figure 24:
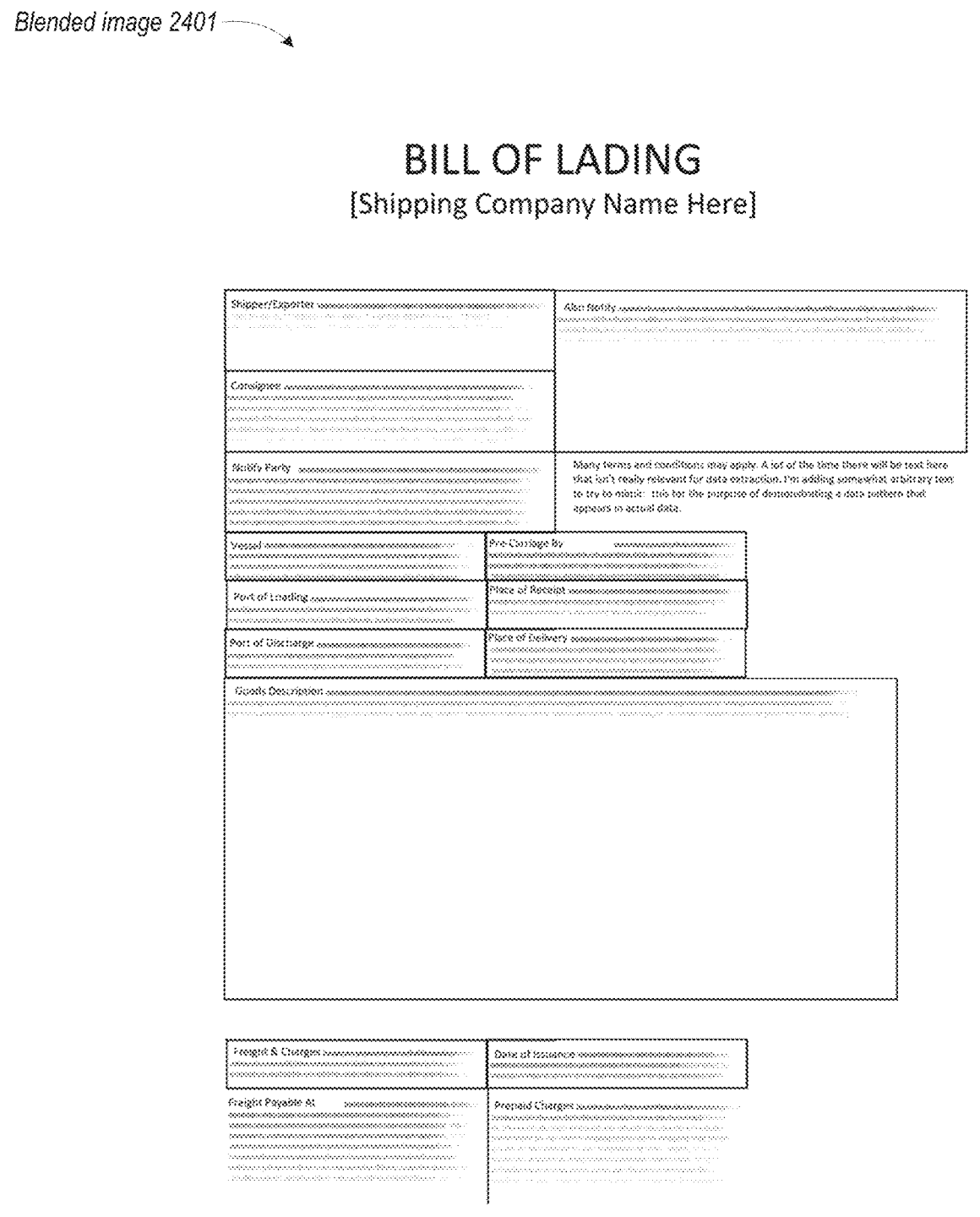

In many embodiments, template datasets 1520 may include one or more of blended images, pixel masks, document structure, document templates, document images, and the like. In some embodiments, a blended image may include an overlay of images belonging to a single template. As shown in FIG. 24, structural and metadata elements will appear clearly in a blended image because the structural and metadata elements do not change among different document images belonging to a single template. However, data elements will appear blurry in a blended image because data elements change among different document images belonging to a single template. In some embodiments, blended images may be used to determine the accuracy with which document images are matched to a template. For instance, the structure and/or metadata element appear blurry in a blended image when document images used to produce the blended image do not have matching structure and/or metadata elements. Accordingly, a blended image may be presented via a user interface to confirm a template match (see e.g., FIG. 19D).

As previously mentioned, in various embodiments, template datasets may include one or more pixel masks. In various embodiments, pixel masks may be used to identify or separate different portions of a document image. For example, a data pixel mask may cover data in a document image or a metadata pixel mask may cover metadata in the document image. Many embodiments may include a multiple dimensional, or layer, pixel mask (e.g., pixel mask 2503 of FIG. 25). For example, a document structure layer of a pixel mask may be generated by removing data and metadata while leaving backgrounds and formatting; a metadata layer of the pixel mask may be generated by removing metadata, backgrounds, and formatting while leaving metadata; and a data layer of the pixel mask may be generated by removing metadata, backgrounds, and formatting while leaving data. In many embodiments, various layers may be selectively stacked and used. For example, data and metadata layers may be stacked and used in conjunction with a document image to identify the structure of the document image by blocking other portions of the document image with the pixel mask.

In some embodiments, each of the document image data 1522 may correspond to or include a document image previously identified as belonging to the associated template. In some such embodiments, each field value 1526 in data table 1529 may characterize the corresponding document image. For example, data table 1529 may include field values corresponding to one or more of a document identifier, a template identifier, confidence score(s) (e.g., assessed image quality, template matching distance, document structure overlap, identified metadata overlap, and overall text field accuracy), date, originator, recipient, text contents, binary values (such as check box values for revocability or transferability).

Figure 15B:
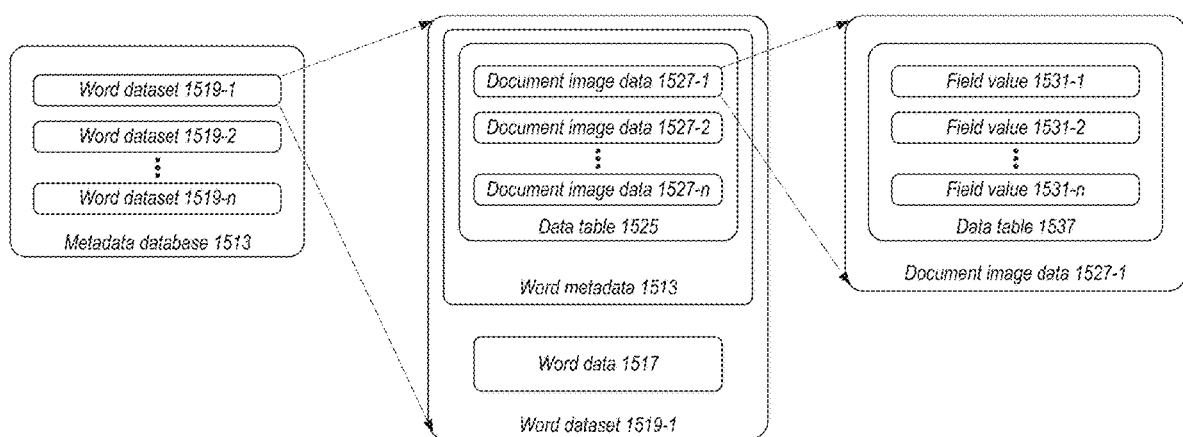
FIG. 15B illustrates various features of an exemplary metadata database, according to some embodiments of the present technology.

FIG. 15B illustrates various features of a metadata database 1513 according to one or more embodiments described hereby. The metadata database 1513 may include one or more word datasets 1519-1, 1519-2, 1519-*n* (or word datasets 1519). Each of the word datasets 1519 may include word data 1521, word metadata 1523, and data table 1525 with one or more document image data 1527-1, 1527-2, 1527-*n* (or document image data 1527). Each of the one or more document image data 1527 may include a data table 1537 with one or more field values 1531-1, 1531-2, 1531-*n* (or field values 1531). In various embodiments, the metadata database 1513 may be utilized to identify metadata and correlate the identified metadata with data in incoming document images. For example, metadata words may be identified utilizing word datasets 1519 corresponding to one or more words and/or combinations of words in incoming document images. In some embodiments, data tables may refer to indexes of and/or pointers to available data. In many embodiments, one or more components illustrated in FIG. 15B, or described with respect thereto, may be the same or similar to one or more other components described herein. For example, metadata database 1513 may be the same or similar to template database 1413. Embodiments are not limited in this context.

More generally, the document template database 1512 may include a plurality of word datasets 1519 for identifying metadata and/or correlating the identified metadata with corresponding data. In some embodiments, a CSDS may utilize the word datasets 1519 to facilitate the extraction of contextually structured data from document images without a known format or layout (i.e., a match identified in the template database). In many embodiments, metadata database 1513 may be used to perform frequency analysis of words in document images to identify metadata. In many such embodiments, results of the frequency analysis of words may be stored in metadata database 1513. In various embodiments, word datasets 1519 may be grouped by use case or type in the metadata database 1513. In various such embodiments, this may facilitate metadata predictions based on a single use case instead of multiple disparate use cases. For example, bill of ladings would not be analyzed with credit card applications. In various embodiments, use cases may include one or more of trade finance, anti-money laundering, banking, insurance, government, disability claims, and medical records.

In various embodiments, word data 1517 may include data used by a model (e.g., binary classification model) to predict whether a word is metadata and word metadata 1513 may include data used to generate and/or characterize the word data 1517. For example, word data 1517 may include one or more of the frequency with which the word corresponding to the word dataset has previously been metadata, whether there is a word in immediate orthogonal proximity (e.g., below a threshold distance), whether the surrounding words have historically been metadata, count of distinct images the word has appeared in, and total historical count for the word. On the other hand, for example, word metadata 1523 may include one or more of confidence scores, threshold distances, threshold intensities, and document images used to create the word data 1517, such as a historical corpus of document images included in document image data 1527.

In various embodiments, word datasets 1519 may include one or more blended images, pixel masks, word tokens, and document structures. In many embodiments, a word dataset may include one or more word tokens, such as in word data 1517 or word metadata 1513. The process for identifying metadata and/or correlating the identified metadata with corresponding data using metadata database 1513 is described in more detail below, such as with respect to FIGS. 28A-28E.

FIG. 16 illustrates various features of a process flow 1600 for a CSDS 1602 according to one or more embodiments described hereby. The CSDS 1602 may include a data adjuster 1604, a data contextualizer 1606, and a data interpreter 1608. The components of CSDS 1602 may interoperate to identify, extract, analyze, interpret, predict, and/or present one or more of data, metadata, and data/metadata correlations related to UID 1610 to produce data contextually structured data from document images. Oftentimes, the data contextualizer 1606 may extract contextually structured data from the filtered and formatted input data. Typically, the data interpreter 1608 may provide output data interpretation and user interface functionalities. In some embodiments, the data interpreter 1608 may generate an overall image review priority ranking score based on one or more of distinct image qualities, document structure, document metadata, and document text scores. The data adjuster 1604 may include data arbiter 1630, the data contextualizer 1606 may include template manager 1636, pixel manager 1638, and metadata identifier 1640, and the data interpreter 1608 may include data analyzer 1642. In many embodiments, one or more components illustrated in FIG. 16, or described with respect thereto, may be the same or similar to one or more other components described herein. For example, CSDS 1602 may be the same or similar to CSDS 1302. Embodiments are not limited in this context.

In various embodiments, the data adjuster 1604 may be responsible for filtering and formatting data for input to the data contextualizer 1606. In various embodiments, the data arbiter 1630 may format UID 1610 for input to an optical analyzer 1634. In various such embodiments, optical analyzer 1634 may perform optical character recognition on the formatted version of UID 1610 created by data arbiter 1630. In the illustrated embodiment, optical analyzer 1634 is an independent component from CSDS 1602. However, in other embodiments, the CSDS may perform optical character recognition processes. In some embodiments, output from the optical analyzer 1634 may be provided directly to data contextualizer 1606 instead of passing through data adjuster. In various embodiments, data adjuster 1604 may perform one or more filtering and/or formatting processes on output from the optical analyzer 1634 before providing filtered and/or formatted output from the optical analyzer 1634.

In some embodiments, template manager 1636 may operate a template database (not shown) to match incoming document images, such as in UID 1610, to one of the template datasets in the template database. In such embodiments, the matched template dataset may be utilized to annotate the matched incoming document image and produce contextually structured data from the matched incoming document image. In various embodiments, linear regressions may be used to cluster and/or match document images to templates. As will be described in more detail below, such as with respect to FIGS. 27A-27F, in some embodiments, linear regressions may be used to rotate, stretch, compress, and/or shift document images to match templates. In one or more embodiments, pixel manager 1638 may generate one or more of a blended image (see FIG. 24), a pixel mask (see FIG. 25), and a document template (see FIG. 26). In many embodiments, pixel manager 1638 may map one or more characteristics of document images. For example, pixel manager 1638 may map pixel intensity (e.g., amount of light or numerical value of a pixel) to facilitate identifying spaces between text blocks, such as spaces between columns. In several embodiments, metadata identifier 1640 may operate a metadata database (not shown) to identify metadata in document images included in UID 1610. In several such embodiments, metadata identifier 1640 may associate metadata identified in document images to corresponding data in the document image. For example, metadata identifier 1640 may identify 'Name:" as metadata in a document image. In some such examples, metadata identifier 1640 may identify 'John Smith' in the document image as corresponding to the metadata, 'Name'. Accordingly, contextually structured data extracted from the document image may include a key-value pair of 'Name'-'John Smith'.

The data interpreter 1608 may provide output data interpretation and user interface functionalities. In some embodiments, the data analyzer 1642 may generate an overall image review priority ranking score based on one or more of distinct image qualities, document structure, document metadata, and document text scores. For example, data analyzer 1642 may generate an overall image review priority ranking score based on an assessed image quality score generated by data adjuster 1604, template matching confidence score generated by template manager 1636, document structure overlap score generated by pixel manager 1638, and an identified metadata overlap score generated by metadata identifier 1640, and an overall text field accuracy score generated by optical analyzer 1634. In some such embodiments, the data interpreter 1608 may present document images for manual review based on the overall image review priority ranking score computed by data analyzer 1642. In some embodiments, data interpreter 1608 may receive corrections, notes, and/or feedback from users. For example, data interpreter 1608 may provide, or enable access to various features and settings, such as reviewing and revising templates or priority ranking score computation.

Figure 17:
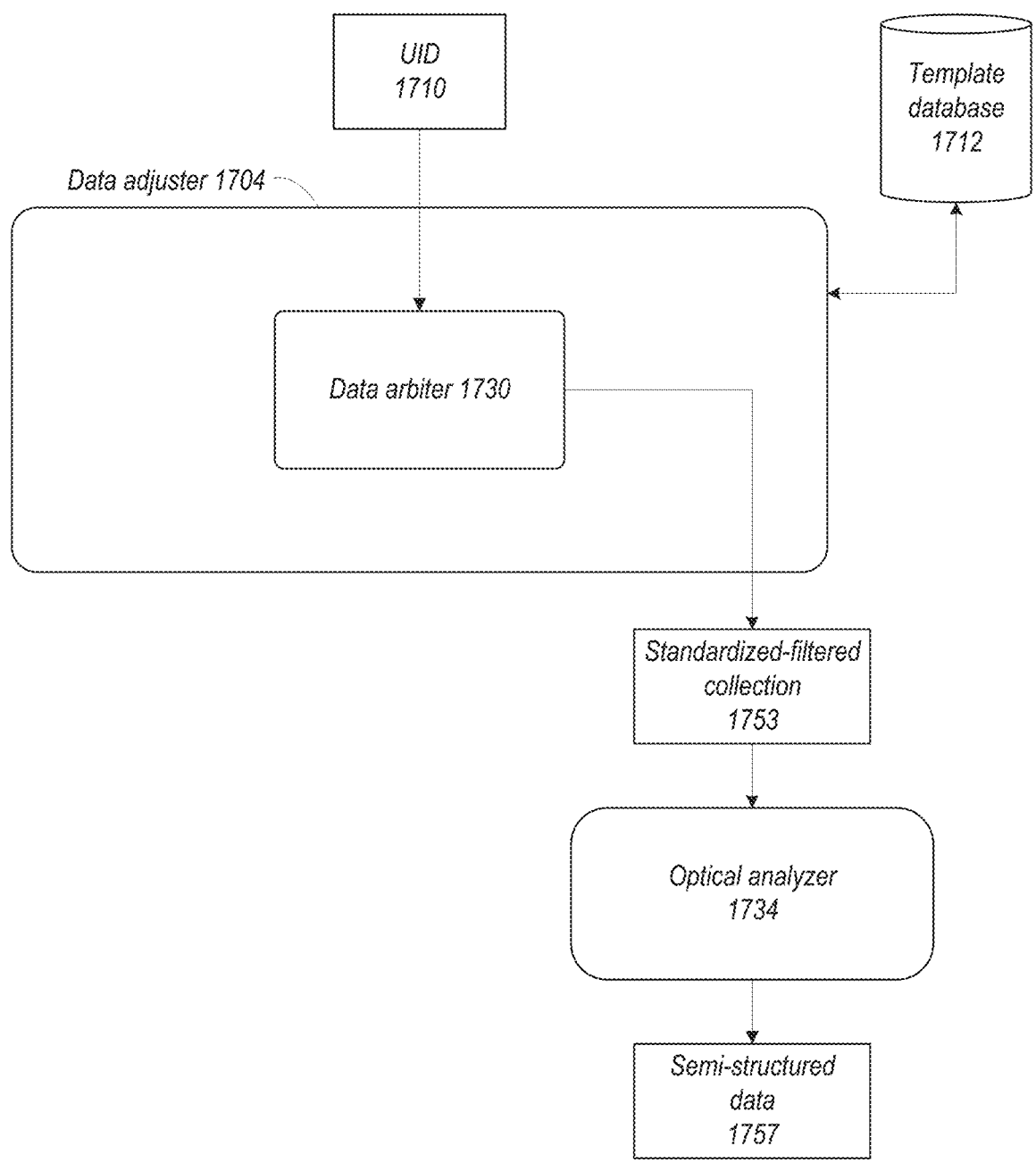
FIG. 17 illustrates various features of an exemplary process flow for a data adjuster, according to some embodiments of the present technology.

FIG. 17 illustrates various features of a process flow 1700 for a data adjuster 1704 according to one or more embodiments described hereby. The data adjuster 1704 is illustrated in conjunction with UID 1710, template database 1712, and optical analyzer 1734. The data adjuster 1704 includes data arbiter 1730. In some embodiments, the data adjuster 1704 may include the optical analyzer 1734. In various embodiments, the data arbiter 1730 may condition document images in UID 1710 for input into optical analyzer 1734 as standardized-filtered collection 1753. The optical analyzer 1734 may perform one or more optical character recognition processes on the standardized-filtered collection 1753 to produce semi-structured data 1757 comprising word tokens corresponding to document images in the standardized-filtered collection 1753. In many embodiments, one or more components illustrated in FIG. 17, or described with respect thereto, may be the same or similar to one or more other components described herein. For example, data adjuster 1704 may be the same or similar to data adjuster 1604. Embodiments are not limited in this context.

In one or more embodiments, data adjuster 1704 may utilize data arbiter 1730 to filter and format the UID 1710 into the standardized-filtered collection 1753 of document images. For example, the data arbiter 1730 may remove low-quality and non-conforming images from UID 1710 to produce the standardized-filtered collection 1753 of images. In another example, the data arbiter 1730 may standardize images in UID 1710 by converting images to a standard size or recoloring them (e.g., removing background color) to produce the standardized-filtered collection 1753 of images. In some embodiments, nonconforming images may be presented via a user interface for confirmation prior to removal (see e.g., FIG. 19C).

In several embodiments, optical analyzer 1734 may generate semi-structured data 1757 based on the standardized-filtered collection 1753. In some embodiments, semi-structured data 1757 may include word tokens comprising words and their locations identified by optical analyzer 1734 in a document image in UID 1710. For example, locations of words in a word token may comprise a bounding box with four corners identifying the location of the text in the corresponding image. In various embodiments, the optical analyzer 1734 may be separate from the data adjuster 1704. For example, optical analyzer 1734 may be operated by a third-party and accessed via an application programming interface (API). In other embodiments, the optical analyzer 1734 may be included in the data adjuster 1734, or at least as a component of the CSDS.

In some embodiments, customizable settings for one or more of data adjuster 1704, data arbiter 1730, and optical analyzer 1734 may control various aspects of the production of standardized-filtered collection 1753 and/or semi-structured data 1757. For example, the data arbiter 1730 may condition UID 1710 into standardized-filtered collection 1753 based on one or more settings, such as minimum size, quality, file format, and the like. In another example, one or more threshold confidence score for identifying a word in an optical recognition process may be provided to optical analyzer 1734. In many embodiments, settings may be stored in the template database 1712. In several embodiments, a data interpreter (e.g., data interpreter 1608) may be utilized to adjust the settings.

Figure 18:
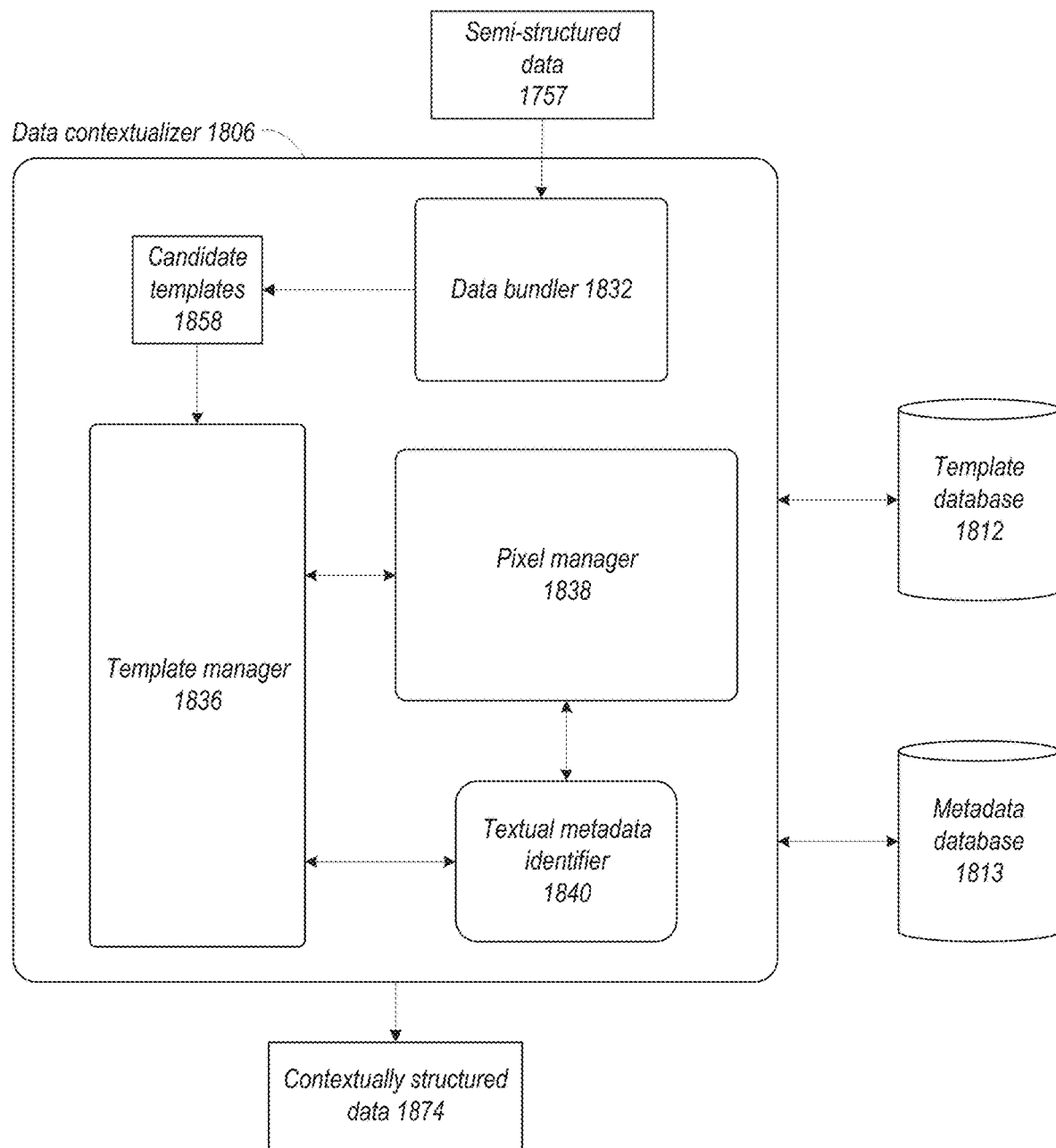
FIG. 18 illustrates various features of an exemplary process flow for a data contextualizer, according to some embodiments of the present technology.

FIG. 18 illustrates various features of a process flow 1800 for a data contextualizer 1806 according to one or more embodiments described hereby. In various embodiments, the data contextualizer 1806 may receive semi-structured data 1757 as input from optical analyzer 1734 and/or data adjuster 1704. The data contextualizer 1806 may generate contextually structured data 1874 from semi-structured data 1757 using one or more of template database 1812 and metadata database 1813. In many embodiments, one or more components illustrated in FIG. 18, or described with respect thereto, may be the same or similar to one or more other components described herein. For example, data contextualizer 1806 may be the same or similar to data contextualizer 1606. Embodiments are not limited in this context.

As will be described in more detail below, data contextualizer 1806 may implement one or more aspects of the linear regressions of FIGS. 27A-27F and/or the correlating of data with metadata of FIGS. 28A-28E. However, the operation of data contextualizer 1806 may generally proceed as follows. Data bundler 1832 may cluster document images in semi-structured data 1757 to produce candidate templates 1858 by hashing the document structures and grouping the images into groups corresponding to candidate templates 1858 based on hamming distances computed between each of the image hashes. The candidate templates 1858 may then be provided to the template manager 1836 for verification as actual templates using one or more linear regressions.

In some embodiments, machine-facilitated annotations may be generated for one or more of the actual templates with textual metadata identifier 1841. Accordingly, textual metadata identifier 1841 may recognize metadata in document images and correlate the metadata with data in the document images. In several embodiments, textual metadata identifier 1841 may create one or more models that can predict whether a word is metadata. For example, a first model may be generated for singletons (i.e., images that are not associated with a template) and a second model may be generated for clustered images. In some embodiments, a separate model may be generated for each template. In one or more embodiments, the models and/or underlying data the models were generated on (e.g., frequency analysis) may be stored in the metadata database 1813. In various embodiments, machine-facilitated annotations may be reviewed, revised, and/or confirmed via a user interface. In other embodiments, annotations may be manually provided via a user interface.

In various embodiments, for each actual template, template manager 1836 may store, as a template dataset, a representative document image hash, a representative document structure, the annotated template, and a list of metadata words with locations for the annotated template in template database 1812. In some embodiments, pixel manager 1838 may generate a blended image (see FIG. 24), a pixel mask (see FIG. 25), and a document template (see FIG. 26) for each actual template determined by template manager 1836. In some such embodiments, one or more of the blended image, the pixel mask, and the document template may be stored in the template database 1812 and/or the metadata database 1813.

Figure 19A:
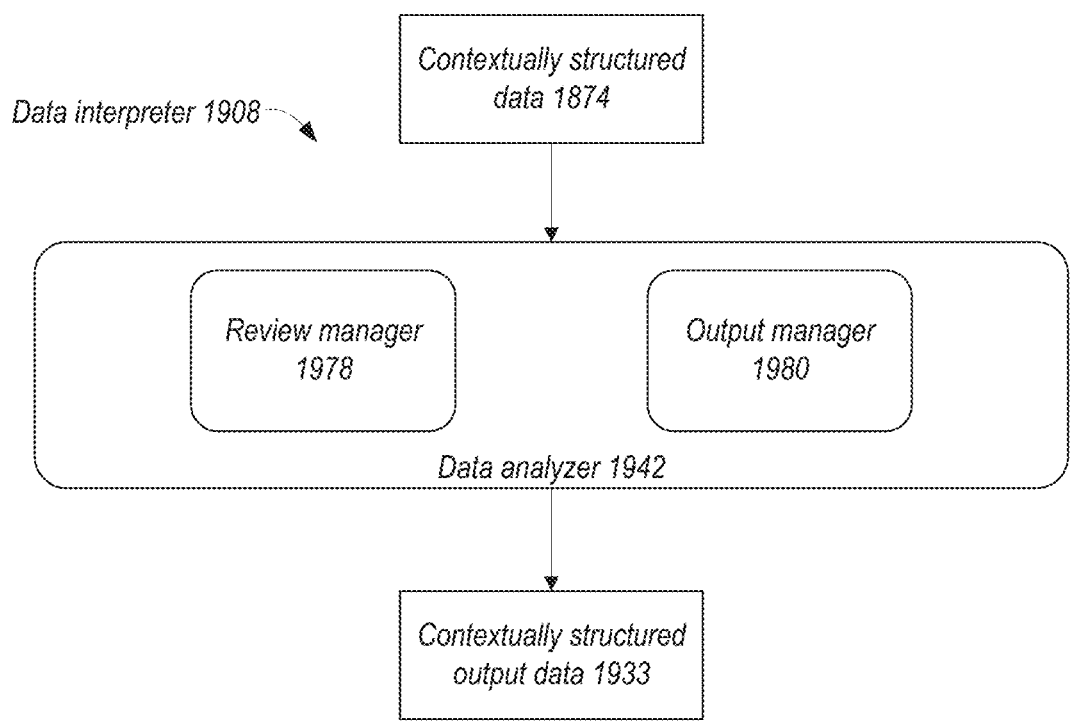
Figure 19D:
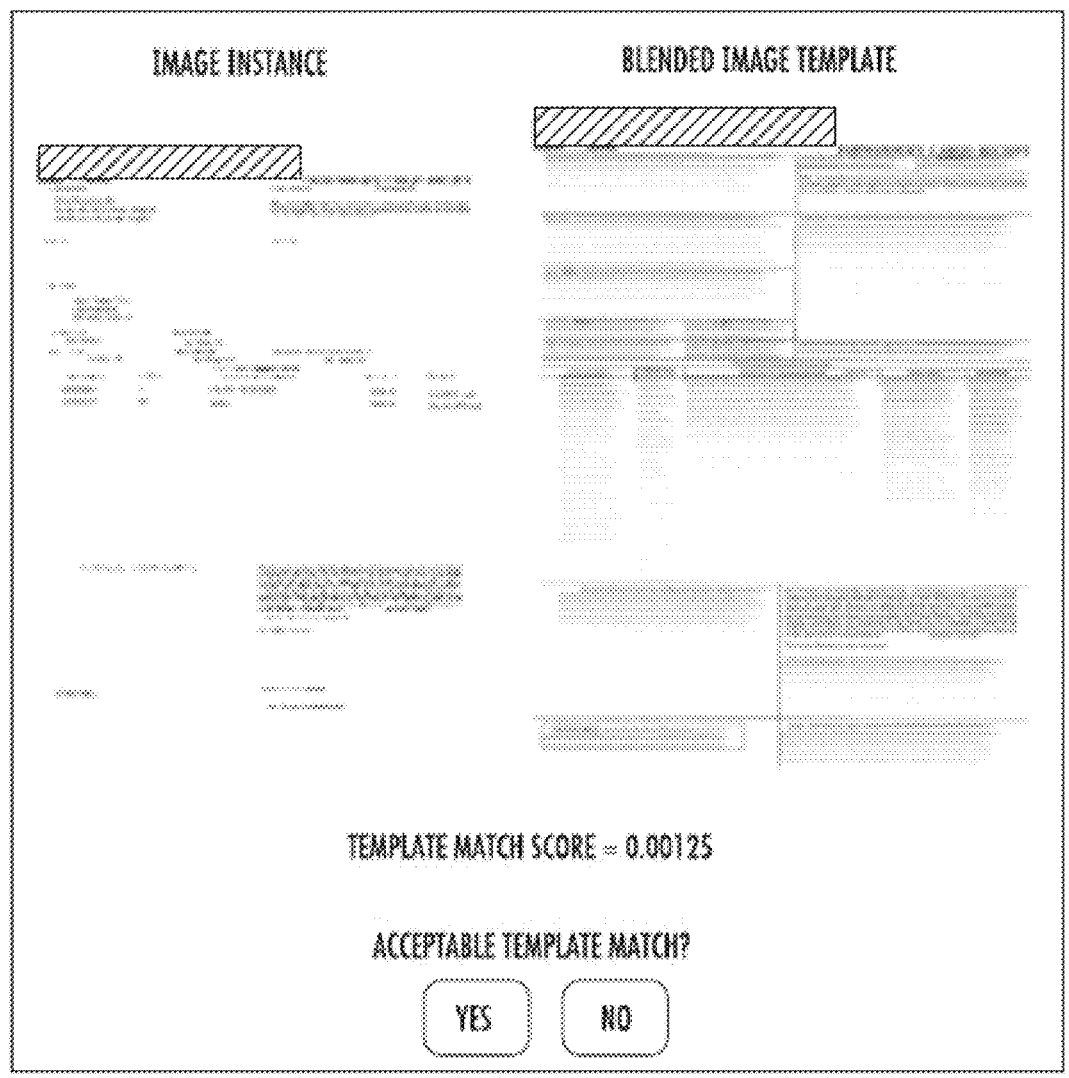
Figure 19E:
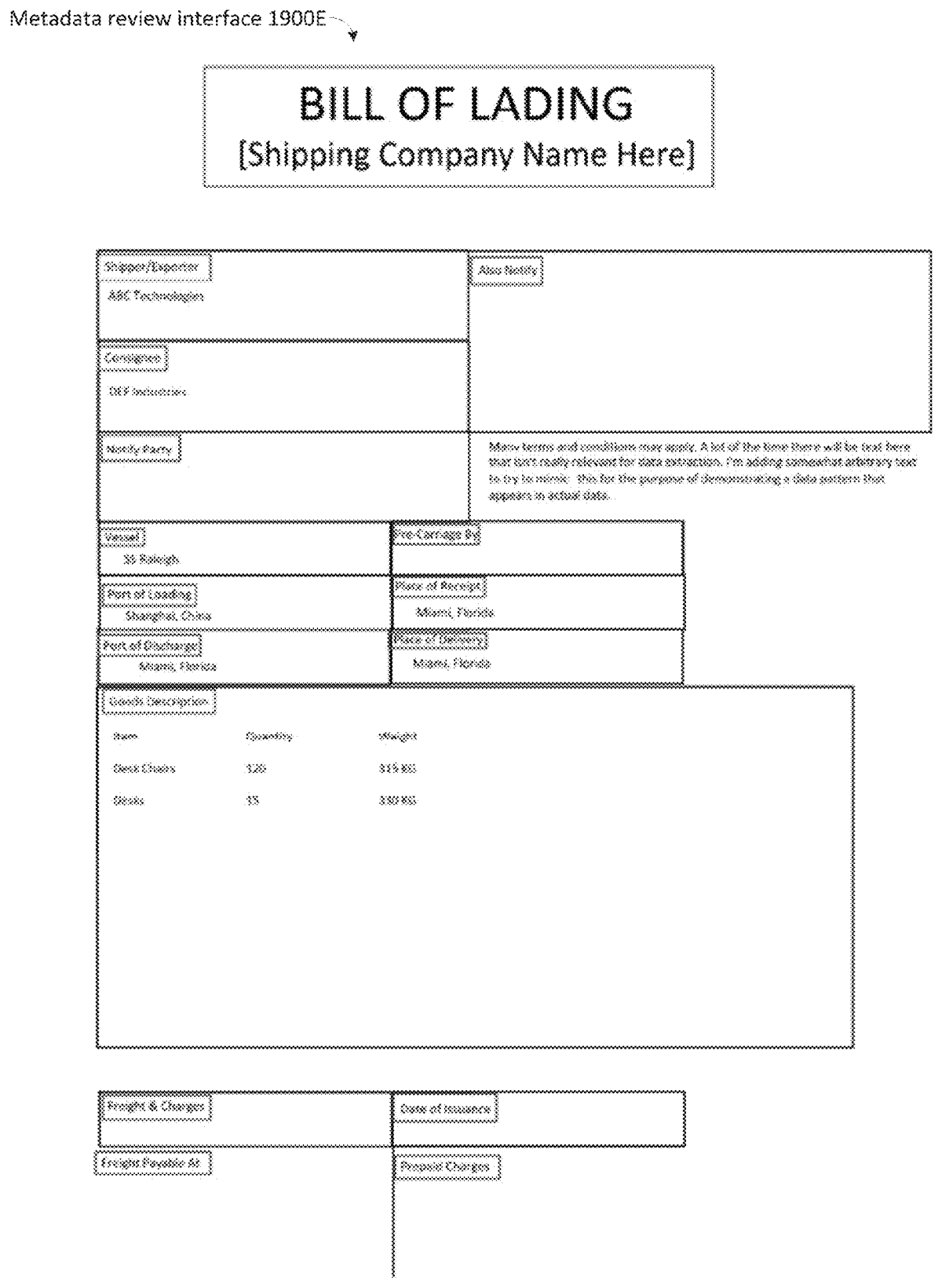

FIGS. 19A-19F illustrates various features of process flow 1900 for a data interpreter 1908 and various corresponding user interfaces 1900B, 1900C, 1900D, 1900E, 1900F, according to some embodiments of the present technology. Referring to FIG. 19A, in various embodiments, the data interpreter 1908 may receive contextually structured data 1974 as input from data contextualizer 1806. In various such embodiments, data interpreter 1908 may generate contextually structured output data 1933 based on the contextually structured data 1874 and/or user input. The data interpreter 1908 includes a data analyzer 1942 with review manager 1978 and output manager 1980. The data interpreter 1908 may provide output data interpretation and user interface functionalities, such as via data analyzer 1942. Accordingly, FIG. 19B illustrates a review ranking interface 1900B, FIG. 19C illustrates a nonconforming image interface 1900C, FIG. 19D illustrates a template match interface 1900D, FIG. 19E illustrates a metadata review interface 1900E, and FIG. 19F illustrates a data review interface 1900F. In many embodiments, one or more components illustrated in FIG. 19, or described with respect thereto, may be the same or similar to one or more other components described herein. For example, data interpreter 1908 may be the same or similar to data interpreter 1608. Embodiments are not limited in this context.

In some embodiments, the review manager 1978 may generate an overall image review priority ranking score based on one or more of distinct image qualities, document structure, document metadata, and document text scores. For example, review manager 1978 may generate an overall image review priority ranking score based on an assessed image quality score generated by data adjuster 1704, a template matching confidence score generated by template manager 1836, document structure overlap score generated by pixel manager 1838, and an identified metadata overlap score generated by metadata identifier 1840, and an overall text field accuracy score generated by optical analyzer 1734.

In many embodiments, the review priority rankings may be presented via a user interface, such as via review ranking interface 1900B. As shown in the illustrated embodiment, the review ranking interface 1900B may present a listing of image instances ranked by review priority. Additionally, the review ranking interface 1900B may include other metrics regarding each image instance, such as the metrics used to determine the review priority ranking. In the illustrated embodiment, the review ranking interface 1900B includes the following for each image instance: an indication of whether the image instance is nonconforming (e.g., as determined by data adjuster 1304); a nonconformance (quality) score, a predicted template, a template confidence, a document structure score, a matching metadata score, and an OCR text accuracy score. In many embodiments, the output manager 1980 may present document images for manual review based on the overall image review priority ranking score computed by data analyzer 1942. For example, a corresponding document image may be presented for manual review in response to selection of an image instance in review ranking interface 1900B. In some embodiments, the weighting for each of the scores used to compute the overall image review priority ranking score may be customizable. In various embodiments, the weighting for each of the scores used to compute the overall image review priority ranking score may be optimized based on historical data, prior dispositions, and/or user input.

In several embodiments, data interpreter 1908 may receive feedback and/or output from one or more other components, such as in the form of performance metrics, interrupts, and/or exceptions. In several such embodiments, the feedback and/or output may be presented via a graphical user interface (GUI) generated by output manager 1980. In many embodiments, the data interpreter 1908 may present additional information and/or request user input in conjunction with presenting feedback via the GUI. For example, feedback from data adjuster 1304 indicating an image may be nonconforming may be presented to a user via nonconforming image interface 1900C along with a request for user input to confirm whether or not the image is nonconforming. In another example, feedback from data from data contextualizer 1306 indicating an image may not match a template may be presented to a user via template match interface 1900D along with a corresponding blended image and a request for user input to confirm whether or not the image matches the template.

In many embodiments, operational settings of the CSDS may be customized and/or optimized by review manager. In multiple embodiments, a user may customize the contextually structured output data 1933 via functionality of review manager 1976 presented via output manager 1980. In some embodiments, review manager 1978 may update one or more operational and/or procedural parameters based on corrections, notes, and/or feedback received from users via output manager 1980. For example, output manager 1980 may provide, or enable access to various features and settings, such as reviewing and revising templates in the template database, reviewing metadata identification metrics, or priority ranking score computation techniques. In one or more embodiments, review manager 1978 may allow features and/or functionalities of a CSDS to be set. In various embodiments, the contents of one or more databases (e.g., template database and/or metadata database) may be accessed, viewed, and manipulated via data interpreter 1908. For example, metadata and data classifications and content may be reviewed and/or edited via metadata review interface 1900E and data review interface 1900F. In such examples, a user may select a data block or metadata block to edit the data block or metadata block. Editing a data or metadata block may include changing the contents or the size of the block. In many embodiments, the review interfaces 1900E, 1900F may allow blocks to be added, removed, or reclassified. For example, a block identified as a metadata block may be reclassified as a data block. In FIG. 19E, metadata blocks are outlined with red. In FIG. 19F, data blocks are outlined with blue. In some embodiments, text identified by an OCR processes may be provided along with the corresponding portion of the original image.

Figure 20:
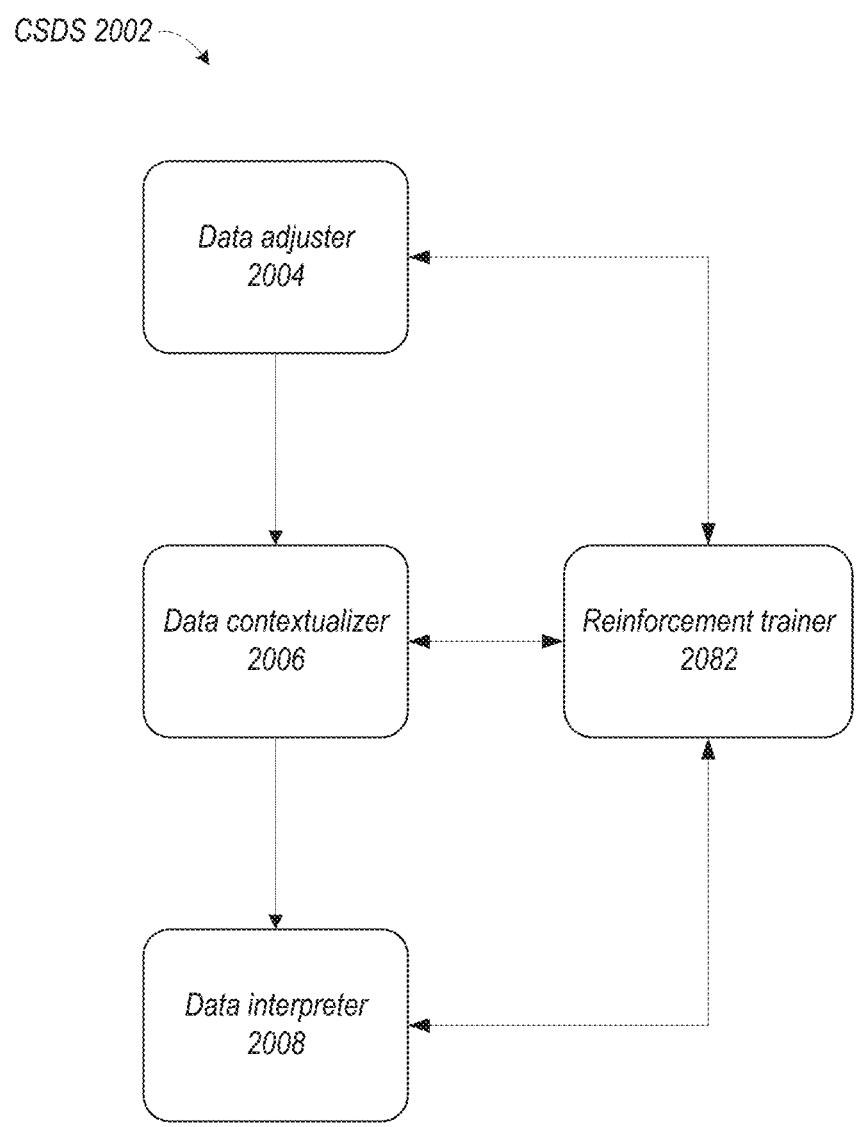
FIG. 20 illustrates various features of an exemplary process flow for a reinforcement trainer, according to some embodiments of the present technology.

FIG. 20 illustrates various features of a process flow 2000 for a reinforcement trainer 2082 according to one or more embodiments described hereby. The reinforcement trainer 2082 may interoperate with one or more of data adjuster 2004, data contextualizer 2006, and data interpreter 2008 to analyze, improve, and identify patterns in data. For example, reinforcement trainer 2082 may adjust operational parameters of CSDS 2082 based on feedback received from one or more of data adjuster 2004, data contextualizer 2006, and data interpreter 2008. In one such example, reinforcement trainer 2082 may utilize machine learning to continuously improve template matching accuracy and/or the computed image review priority ranking score. In many embodiments, reinforcement trainer may implement, or at least access (via a network), machine learning algorithms, such as neural networks to identify patterns in feedback data (e.g., error data), and using the patterns to improve one or more of performance, reliability, and efficiency of the CSDS. In many embodiments, data adjuster, data contextualizer 2006, data interpreter 2008, and/or reinforcement trainer 2082 may output data in a format that is readily input to convolutional neural network (CNN) models. In several embodiments, machine learning (e.g., deep learning) may be utilized to improve the accuracy of a CSDS. For example, machine learning may be utilized to improve one or more of identification of templates, data/metadata identification, and data/metadata correlation by data contextualizer. In many embodiments, one or more components illustrated in FIG. 20, or described with respect thereto, may be the same or similar to one or more other components described herein. For example, CSDS 2002 may be the same or similar to CSDS 1302. Embodiments are not limited in this context.

Figure 21:
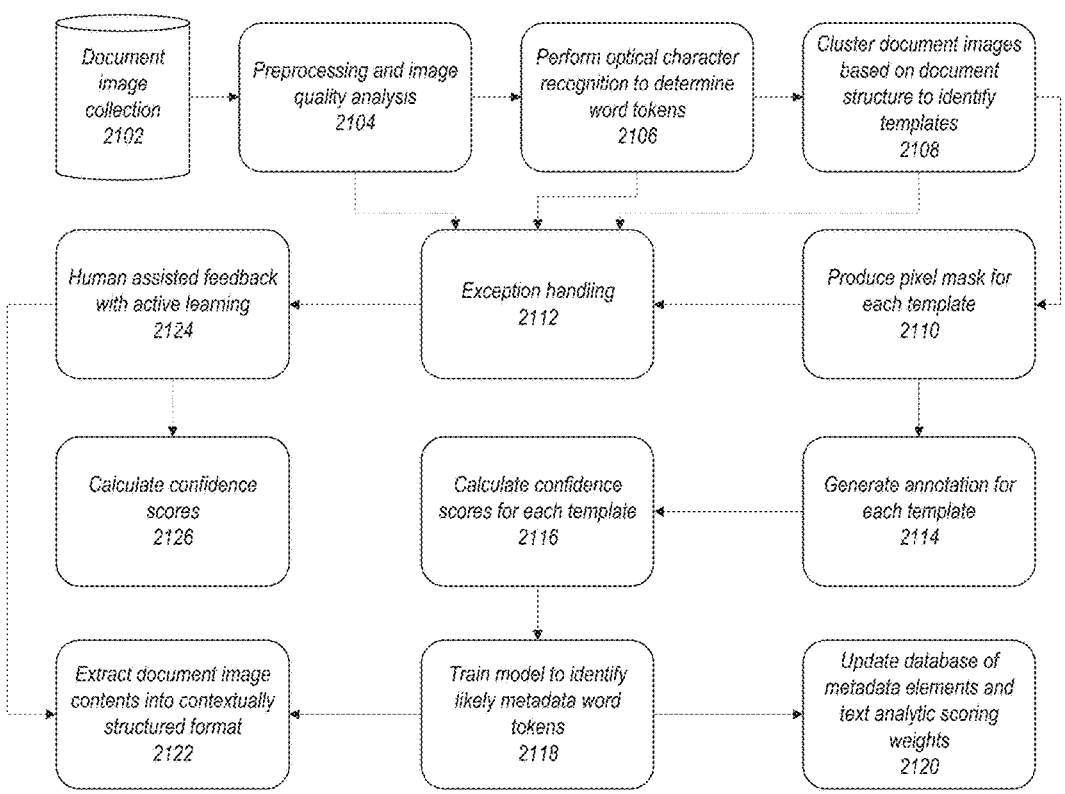
FIG. 21 illustrates an exemplary logic flow for a batch process, according to some embodiments of the present technology.

FIG. 21 illustrates an example embodiment of a logic flow for a batch process 2100 according to one or more embodiments described hereby. In various embodiments, the batch process 2100 may be performed by a CSDS to extract contextually structured data from a large set of document images, such as a historical archive. In many embodiments, the batch process 2100 may be utilized to initialize, create, and/or update one or more databases disclosed hereby. The batch process 2100 may be representative of some or all of the operations executed by one or more embodiments described herein. More specifically, the batch process 2100 may illustrate operations performed by one or more components of a contextually structuring data system (e.g., CSDS 1302). In one or more embodiments, these operations may be performed in conjunction with accurately and consistently extracting contextually structured data from document images, by automatically identifying one or more of document layout, document data, document metadata, and/or correlations therebetween in a document image. In many embodiments, one or more blocks illustrated in FIG. 21, or features described with respect thereto, may be implemented by one or more components of an CSDS. For example, preprocessing and image quality analysis may be performed by data arbiter 1630 of FIG. 16. Embodiments are not limited in this context.

In the illustrated embodiment shown in FIG. 21, the batch process 2100 may begin at block 2102. At block 2102, a document image collection 2102 may be identified for application of the batch process 2100. In many embodiments, the document image collection 2102 may be included in a template database. In some embodiments, the document image collection 2102 may be received via data interpreter 1608. At block 2104, preprocessing and image quality analysis may be performed. For instance, data adjuster 1604 may perform preprocessing and image quality analysis on UID 1610. Proceeding to block 2106 optical character recognition may be performed to determine word tokens for document images. For example, optical analyzer 1634 may perform optical character recognition.

Continuing to block 2108, document images in collection 2102 may be clustered based on document structure (e.g., portion of document image remaining after data words and metadata words are removed) to identify templates. In some embodiments, pixel and/or image hashing may be used to cluster document images. For example, data bundler 1832 may hash each image and compute the hamming distance between different hashes to identify clusters of document images. In many embodiments, the hamming distances may be utilized to determine a set of candidate templates from the document image collection 2102. At block 2110 a pixel mask may be produced for each template. For instance, pixel manager 1638 may generate pixel masks for each template. In many embodiments, the pixels masks are stored in the template database with the corresponding template dataset. In one or more embodiments, pixel masks may be utilized to assist with manual review of document images.

Block 2112 may include exception handling. For example, if issues occur, such as due to confidence levels (e.g., for matching) being below a threshold, exception handling 2112 may be triggered. In another example, if one or more work tokens from optical character recognition are corrupted, exception handling 2112 may be triggered. Exception handling 2112 may cause user input to be requested to resolve an issue. For example, exception handling 2112 may cause data interpreter 1608 to require review and/or revision of predicted metadata/data correlations, or template matches, with low confidence scores. At block 2114 an annotation may be generated for each template 2114.

Proceeding to block 2116, a confidence score for each template may be computed. For example, template manager 1836 and/or data analyzer 1942 may compute a confidence score for each template. Continuing to block 2118, a model may be trained to identify likely metadata words. For instance, textual metadata identifier 1840 may train one or more models to predict metadata words in document images. At block 2120, the metadata database including metadata elements and text analytic scoring weights may be updated. For example, reinforcement trainer 2082 may update metadata elements and text analytic scoring weights to improve future metadata identification and/or correlation. Proceeding to block 2122, document image context may be extracted into a contextually structured format. In some embodiments, human assisted feedback with active learning may be performed at block 2124. For example, human assisted feedback with active learning may be implemented by reinforcement trainer 2082 and data interpreter 2008. In many embodiments, active learning may include machine learning techniques. In several embodiments, one or more confidence scores may be computed, or recomputed, at block 2126 in response to the human assisted feedback with active learning.

Figure 22:
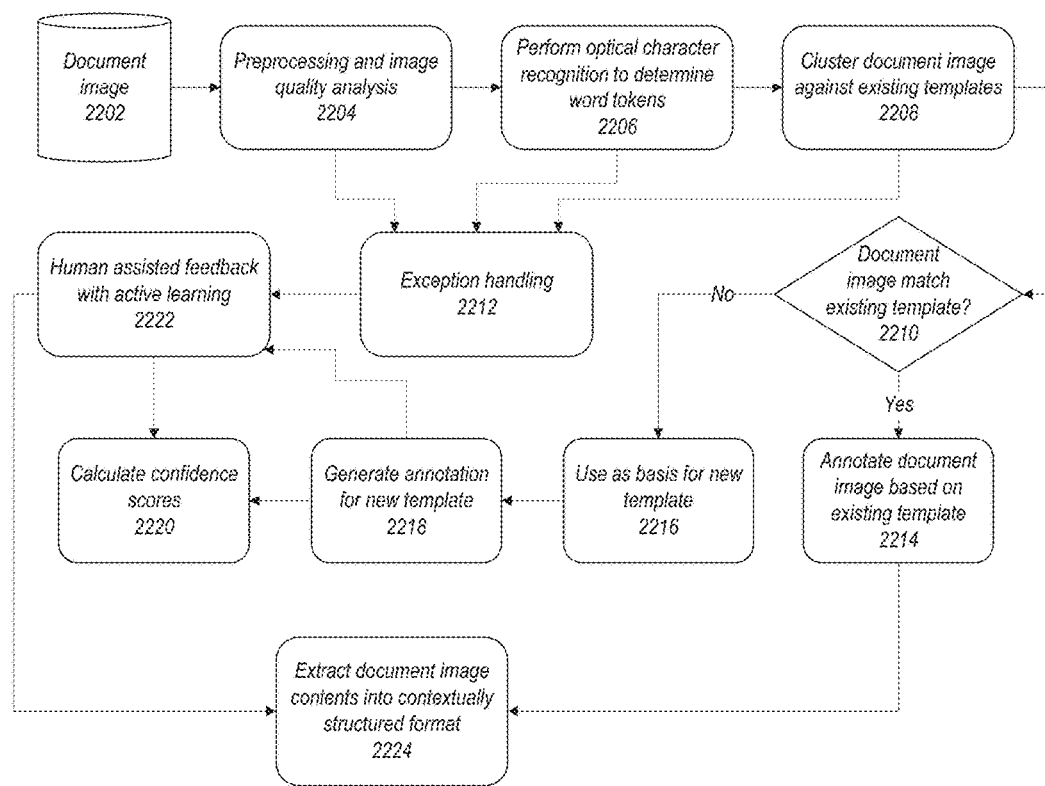
FIG. 22 illustrates an exemplary logic flow for a production process, according to some embodiments of the present technology.

FIG. 22 illustrates an example embodiment of a logic flow for a production process 2200 according to one or more embodiments described hereby. In various embodiments, the production process 2200 may be performed by a CSDS to extract contextually structured data from a small set of document images that are potentially related to previous document images, such as by uploading monthly purchase orders. In many embodiments, the production process 2200 may be utilized to add to and/or update one or more databased disclosed hereby. The production process 2200 may be representative of some or all of the operations executed by one or more embodiments described herein. More specifically, the production process 2200 may illustrate operations performed by one or more components of a contextually structuring data system (e.g., CSDS 1302). In one or more embodiments, these operations may be performed in conjunction with accurately and consistently extracting contextually structured data from document images, by automatically identifying one or more of document layout, document data, document metadata, and/or correlations therebetween in a document image. In many embodiments, one or more blocks illustrated in FIG. 22, or features described with respect thereto, may be implemented by one or more components of an CSDS. For example, template manager 1636 of data contextualizer 1606 may generate annotations for new templates. Embodiments are not limited in this context.

In the illustrated embodiment shown in FIG. 22, the batch process 2200 may begin at block 2202. At block 2202, a document image 2202 may be identified for application of the production process 2200. In many embodiments, the document image 2202 may be included in a template database. In some embodiments, the document image collection 2202 may be received via a user interface provided by data interpreter 1608. At block 2204, preprocessing and image quality analysis may be performed. For instance, data adjuster 1604 may perform preprocessing and image quality analysis on UID 1610. Proceeding to block 2206 optical character recognition may be performed to determine word tokens for document images. For example, optical analyzer 1634 may perform optical character recognition.

Continuing to block 2208, the document image 2202 may be clustered against existing templates in the template database. In many embodiments, data contextualizer 1306 may compute the hamming distance between document image 2202 and one or more templates, or hashes thereof, in the template database. In many embodiments, the hamming distances may be utilized to determine a set of candidate template matches for the document image 2202. At block 2210 it may be determined whether document image 2202 matches an existing template in the template database. If not, the document image 2202 is utilized at block 2216 as a bases for a new template in the template database. At block 2218 an annotation for the new template may be generated. For example, data contextualizer may utilize a metadata database to annotate the new template. At block 2220 confidence scores may be computed for the new template. Continuing to block 2222 human assisted feedback with active learning may be utilized in the same or similar way as described above with respect to batch process 2100.

Similarly, block 2212 may include exception handling. Thus, if issues occur, such as due to confidence levels (e.g., for matching) being below a threshold, exception handling 2212 may be triggered. In another example, if one or more word tokens from optical character recognition are corrupted, exception handling 2212 may be triggered. Exception handling 2212 may cause user input to be requested to resolve an issue. For example, exception handling 2212 may cause data interpreter 1608 to require review and/or revision of predicted metadata/data correlations, or template matches, with low confidence scores. At block 2224 contents of the document image 2202 may be extracted into a contextually structured format. In various embodiments, the contextually structured format of the document image 2202 may be communicated via a user interface and/or stored in a database. Further, additional analytics regarding the document image 2202 may be performed on the contextually structured format. For example, the number of times a product was shipped via air as compared to via land may be determined based on the contextually structured format of a collection of purchase orders. In several embodiments, one or more confidence scores may be computed, or recomputed, at block 2220 in response to the human assisted feedback with active learning. For example, a user interface may be generated for manual review of a template, and a template confidence score corresponding to the template may be increased due to the manual review confirming the template. In some such embodiments, a blended image may be presented for manual review of the template.

FIG. 23A-23D illustrate an example embodiment of a logic flow for a batch process 2300 according to one or more embodiments described hereby. In various embodiments, the batch process 2300 may be performed by a CSDS to extract contextually structured data from a large set of document images, such as a historical archive. In many embodiments, the batch process 2300 may be utilized to initialize, create, and/or update one or more databased disclosed hereby. The batch process 2300 may be representative of some or all of the operations executed by one or more embodiments described herein. More specifically, the batch process 2300 may illustrate operations performed by one or more components of a contextually structuring data system (e.g., CSDS 1402). In one or more embodiments, these operations may be performed in conjunction with accurately and consistently extracting contextually structured data from document images, by automatically identifying one or more of document layout, document data, document metadata, and/or correlations therebetween in a document image. In many embodiments, one or more blocks illustrated in FIGS. 23A-23D, or features described with respect thereto, may be implemented by one or more components of an CSDS. For example, pixel mapping of an image to a template may be performed by data contextualizer 1606 of FIG. 16. Embodiments are not limited in this context.

In the illustrated embodiment shown in FIGS. 23A-23D, the batch process 2300 may begin with document image collection 2330 being identified for application of the batch process 2300 at block 2330. At block 2332 low-quality and nonconforming images may be filtered out. In many embodiments, block 2332 includes subblock 2332-1 for initial review and annotation. At block 2334 images may be standardized and preprocessed. In several embodiments, block 2334 includes subblock 2334-1 for resizing images, subblock 2334-2 for binarizing images with adaptive thresholding, and subblock 2334-3 for morphological transformation.

Continuing to block 2336, optical character recognition may be applied. In the illustrated embodiment, block 2336 includes subblock 2336-1 for detecting words, subblock 2336-2 for identifying bounding boxes, and subblock 2336-3 for removing identified words. Identifying bounding boxes may include determining four points that define a box surrounding an identified word. At block 2338 the document images may be clustered, such as based on hamming distances computed from hashes of the document images. Accordingly, the block 2338 may include subblock 2338-1 for applying image hashing and subblock 2338-2 for computing hamming distances. At block 2339, the batch process 2300 proceeds from FIG. 23A to block 2340 in FIG. 23B. Pixel mapping of images to templates may be performed at block 2340. In several embodiments, block 2340 includes subblock 2340-1 for computing offset and scaling, such as for potential template matches, and similarly subblock 2340-2 for computing rotation and skew. One or more of these and other operations performed in a production or a batch process may be performed one or more times on a dynamic portion of input document images without departing from the scope of this disclosure.

Proceeding to block 2342, the batch process 2300 may determine which of the images match an existing document template. Accordingly, if a document image matches an existing document template, then image blending may be performed. The image blending of block 2350 may include subblock 2350-1 for creating a reference template and subblock 2350-2 for requiring a plurality of images for a respective identified template in order to generate a blended image. In some embodiments, a blended image may include an overlay of a plurality of images belonging to a single template. As shown in FIG. 24, structural and metadata elements will appear clearly in a blended image because the structural and metadata elements do not change among different document images belonging to a single template. However, data elements will appear blurry in a blended image because data elements change among different document images belonging to a single template. Accordingly, multiple images are needed to perform image blending. In some embodiments, blended images may be used to determine the accuracy with which document images are matched to a template. For instance, the structure and/or metadata element appear blurry in a blended image when document images used to produce the blended image do not have matching structure and/or metadata elements.

Referring back to decision block 2342, if a document image does not match an existing document template, it may be used as the basis for a new document template at block 2344. At block 2346 an annotation of the new document template may be determined. Proceeding to block 2348, the document template database may be updated with a template dataset for the new template. After block 2346, the batch process 2300 may proceed to block 2350 for image blending as described above. At block 2351, the batch process 2300 moves from FIG. 23B to block 2352 of FIG. 23C.

Continuing to block 2352 a three-dimensional (3D) pixel mask may be generated, such as based, at least in part, on the image blending in block 2350. In the illustrated embodiment block 2352 includes subblock 2352-1 for identifying pixel masks for document structures (e.g., by removing data and metadata while leaving backgrounds, formatting, and the like, subblock 2352-2 for identifying a pixel mask for data words, and subblock 2352-3 for identifying a pixel mask for metadata words. At block 2354 document contents (e.g., data) and metadata may be extracted into a structured format. Block 2354 may include subblock 2354-1 for outputting information to a tabular format and subblock 2354-2 for computing a confidence score for accuracy.

At block 2356 text analytics may be applied. As previously mentioned, OCR may be utilized to transform image data into text data to facilitate text analytics on previously inaccessible data. Accordingly, the exact text analytics may be dependent on use case. In many embodiments, block 2356 includes subblock 2356-1 for inferring relationship/correlation between text fields (e.g., document data) and metadata elements (e.g., document metadata) and subblock 2356-2 for incorporating enhanced spell checking. For example, a spell checking algorithm that uses a distance function with a threshold that compares each new word to a dictionary and matches it to the closest word may be utilized. In another example, a spell checking algorithm that looks at manual corrections of data to create a lookup of misspelled words to correctly spelled words may be used. At block 2358 a composite ranking for review prioritization may be computed. In many embodiments, rankings may be computed based on a composite score derived from the confidence associated with multiple steps/aspects of the process. For example, the composite score may be based on scores relating to one or more of assessed image quality, template matching distance, document structure overlap, identified metadata overlap, and overall text field accuracy.

Figure 23A:
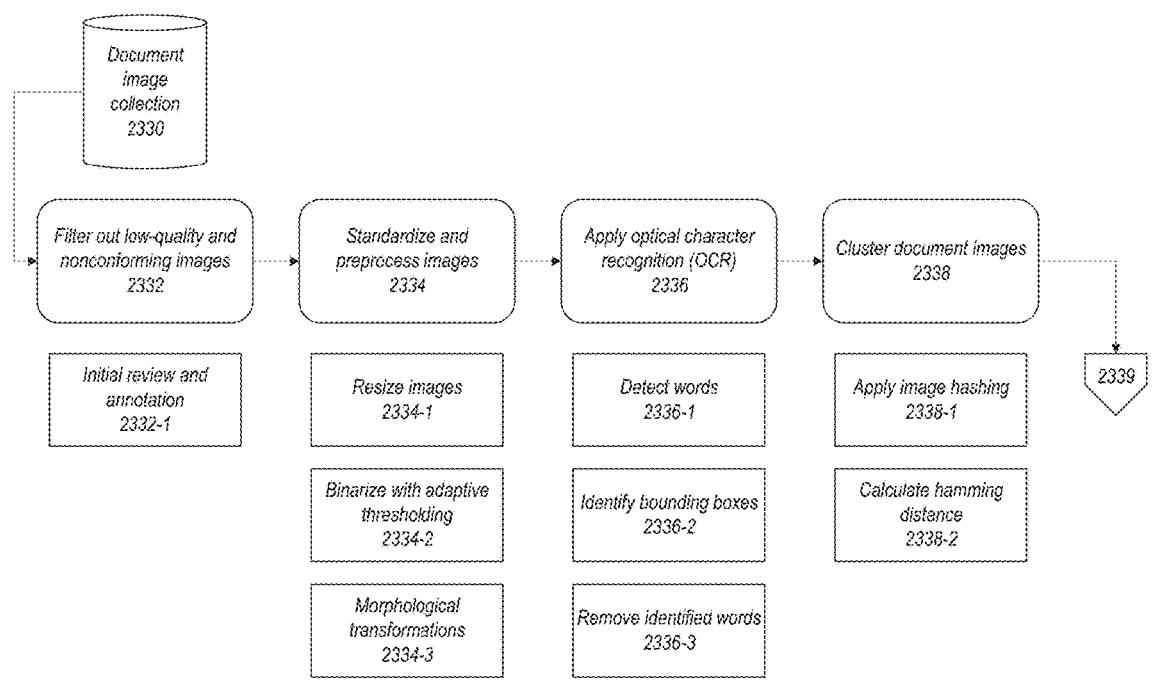
Figure 23B:
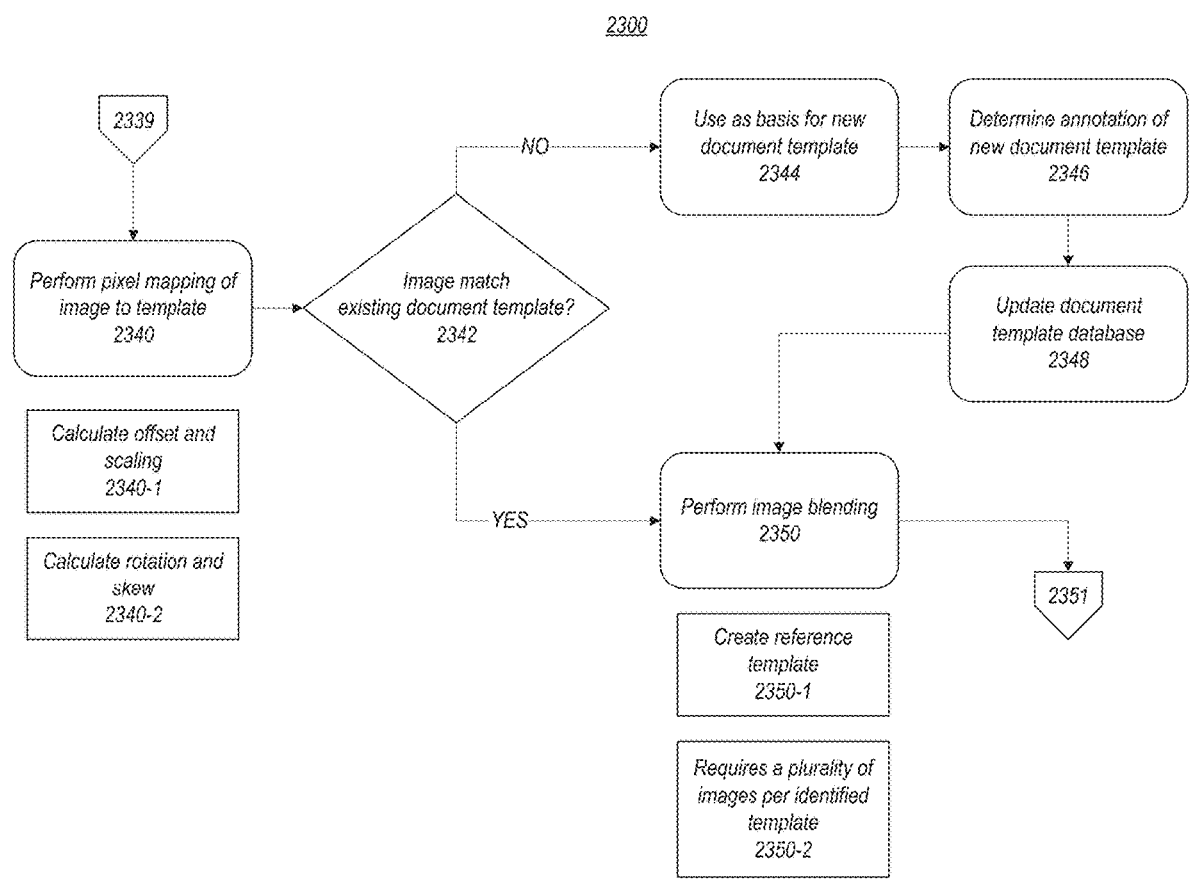
Figure 23C:
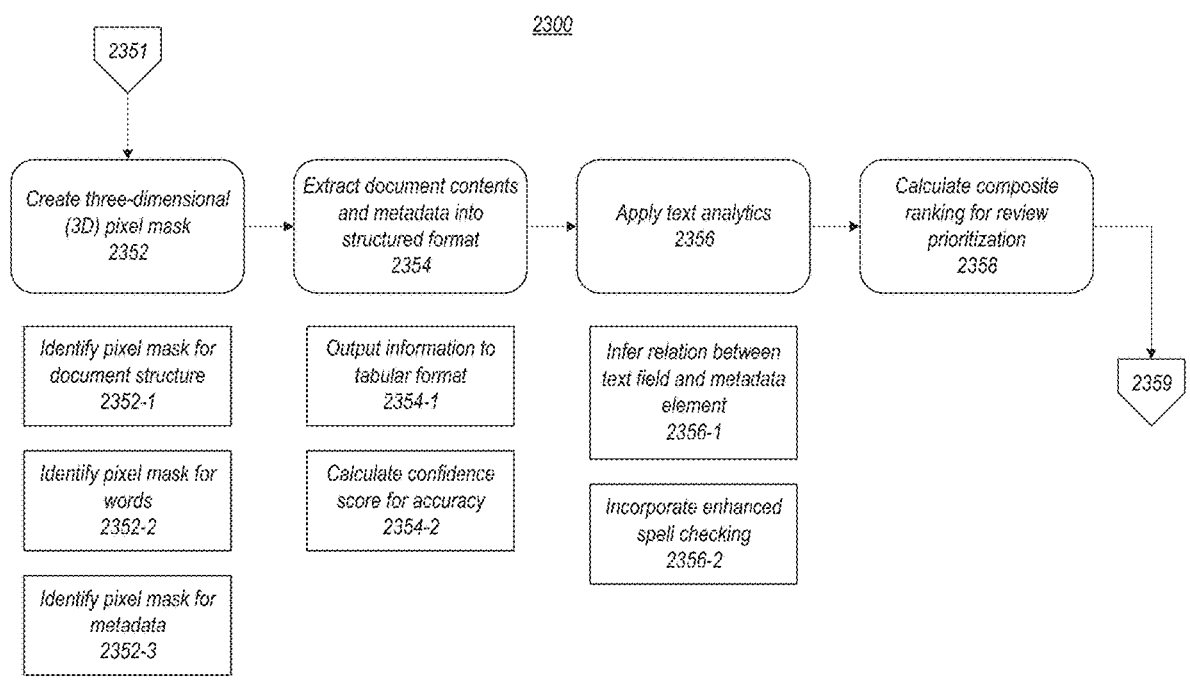

At block 2359, the batch process 2300 moves from FIG. 23C to block 2360 of FIG. 23D. Continuing to block 1360 instances with low confidence may be identified for review. Block 1360 includes subblock 2360-1 for tagging associated images for review, subblock 2360-2 for visualizing document elements via the corresponding 3D pixel mask (one dimension/layer for document structure, one dimension/layer for document data, and one/layer dimension for document metadata), subblock 2360-3 for highlighting elements with low confidence (e.g., for manual review), and subblock 2360-4 for capturing review assessment (e.g., user feedback). Proceeding to block 2362 the structured data may be updated based on disposition and modification in the review assessment. At block 2364 a machine learning model may be trained to adjust confidence scores based on the review assessment. For example, an operator may manually review text output for each field, which can then be used as a target for a machine learning model to predict the likelihood of a mistake.

FIG. 24 illustrates a blended image 2401 according to one or more embodiments described hereby. In some embodiments, a blended image may include an overlay of a plurality of images belonging to a single template. For example, the blended image for template dataset 1520-1 of FIG. 15 may be generated from each document image associated with each of the document image data 1522. As shown in FIG. 24, structural and metadata elements will appear clearly in a blended image because the structural and metadata elements do not change among different document images belonging to a single template. However, data elements will appear blurry in a blended image because data elements change among different document images belonging to a single template. Accordingly, multiple images are needed to perform image blending. In some embodiments, blended images may be used to determine the accuracy with which document images are matched to a template. For instance, the structure and/or metadata element appear blurry in a blended image when document images used to produce the blended image do not have matching structure and/or metadata elements. Clarity of the repetitive document structure and metadata overlays indicates the quality of template matching provided by CSDSs disclosed hereby. In various embodiments, blended images may be stored for each template dataset. Embodiments are not limited in this context.

Figure 25:
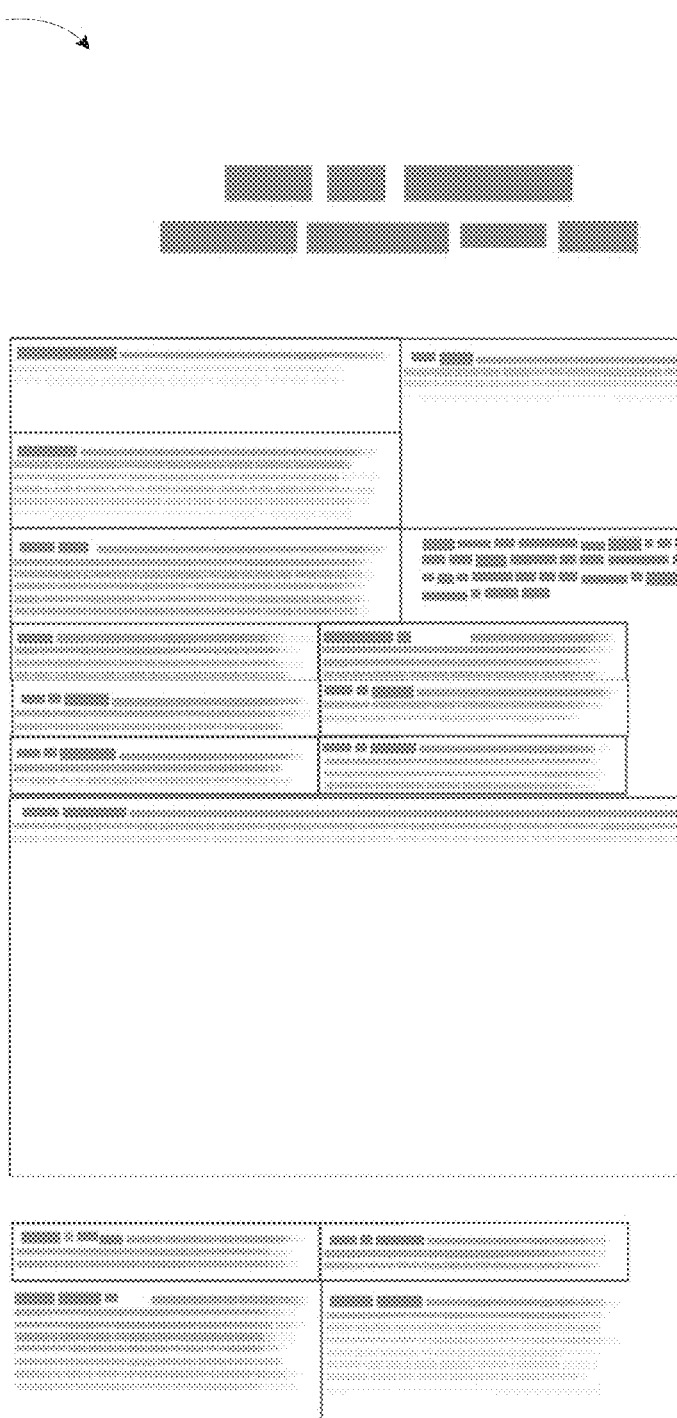
FIG. 25 illustrates an exemplary pixel mask, according to some embodiments of the present technology.

FIG. 25 illustrates a pixel mask 2503 according to one or more embodiments described hereby. In various embodiments, pixel mask 2503 may be generated based on blended image 2401 and/or one or more word tokens. In various embodiments, pixel masks may be used to identify or separate different portions of a document image. For example, a data pixel mask may cover data in a document image, or a metadata pixel mask may cover metadata in the document image. Many embodiments may include a multiple dimensional, or layer, pixel mask. In many embodiments, the pixel mask 2503 may comprise a three-dimensional pixel mask. For example, the teal portion may correspond to a data pixel mask, the green portions may correspond to a metadata pixel mask, and the magenta portion may correspond to a document structure pixel mask.

A document structure layer of a pixel mask may be generated by removing data and metadata while leaving backgrounds and formatting. A metadata layer of the pixel mask may be generated by removing backgrounds and formatting while leaving metadata. A data layer of the pixel mask may be generated by removing metadata, backgrounds, and formatting while leaving data. In many embodiments, various layers may be selectively stacked and used. For example, data and metadata layers may be stacked and used in conjunction with a document image to identify the structure of the document image by blocking other portions of the document image with the pixel mask. Embodiments are not limited in this context.

FIG. 26 illustrates a document template 2605 according to one or more embodiments described hereby. In some embodiments, the document template 2605 may include a representation of a document image with the data removed but the document structure and/or document metadata remaining. In many embodiments, the document template 2605 may be utilized to readily identify data in a corresponding template. In some embodiments, a document template may be generated by removing blurry portions from a blended image 2401. In several embodiments, document template 2605 may be generated with pixel mask 2503. For example, the data layer pixel mask may be utilized to remove all data from an image, leaving the document template 2605 with metadata and the document structure. In various embodiments, document templates may be stored for each template dataset. Embodiments are not limited in this context.

Figure 27C:
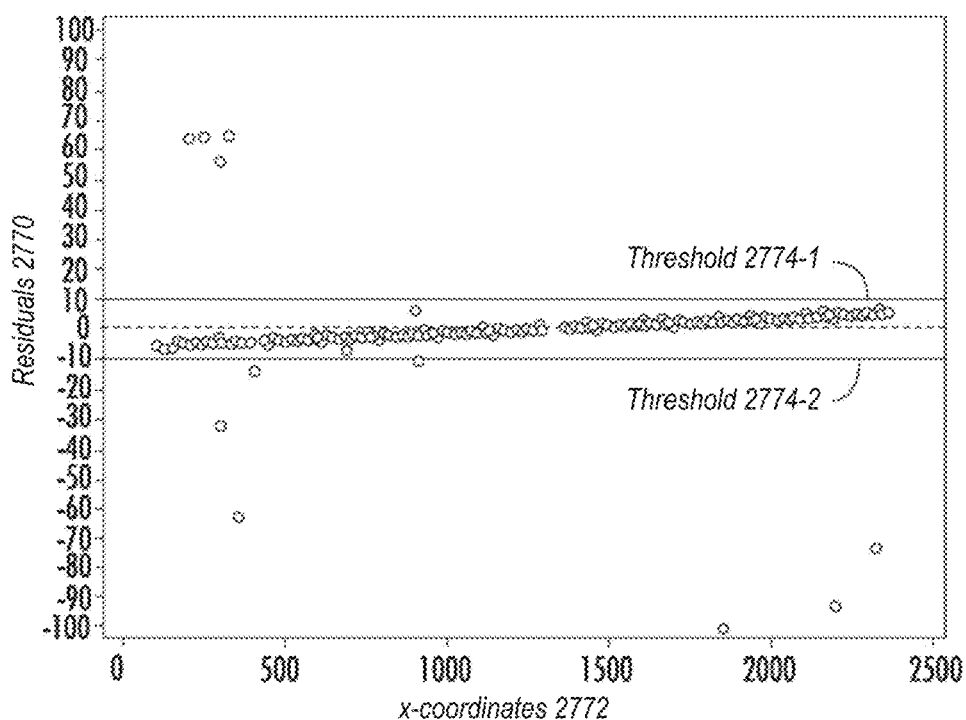
Figure 27D:
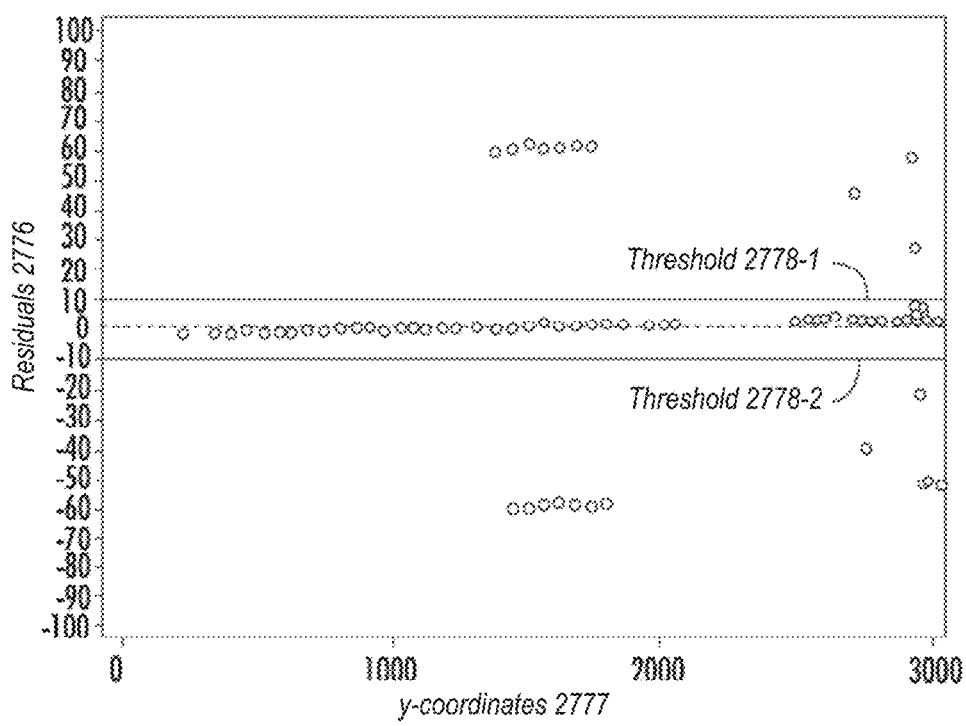
Figure 27E:
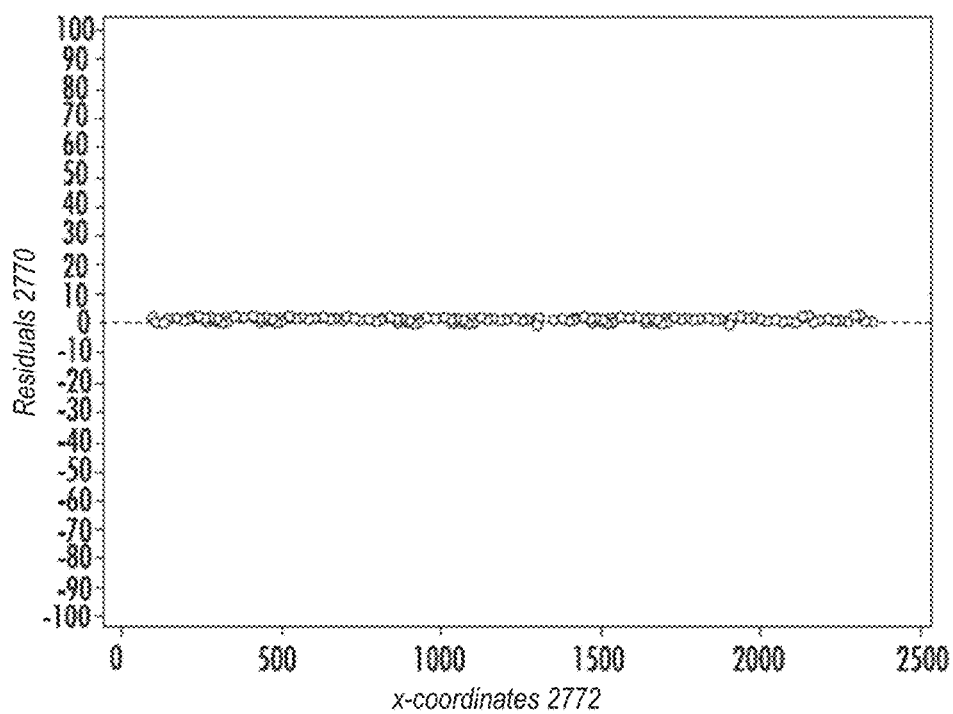
Figure 27F:
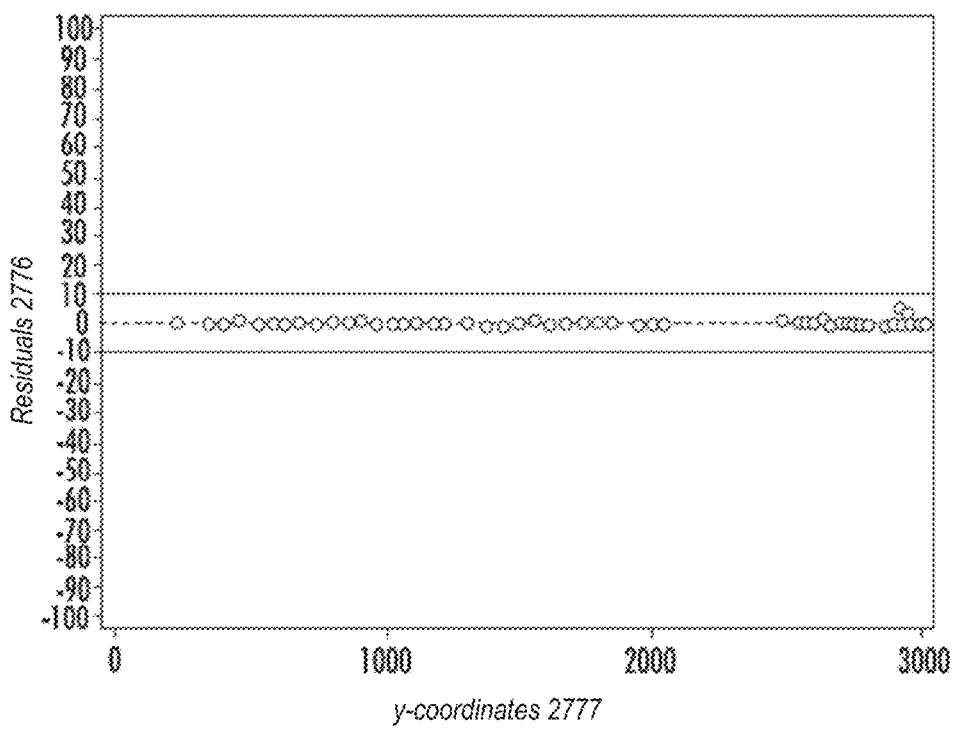

FIGS. 27A-27F illustrate an exemplary process flow for matching a document image 2749 to a template 2718 with linear regressions according to one or more embodiments described hereby. In various embodiments, the linear regression may be utilized to identify a linear transformation between a document image and a template (or another document image). In various such embodiments, the linear transformation may be used to confirm a candidate template is an actual template. More specifically, FIG. 27A includes template 2718 with metadata blocks 2751-1, 2751-2, 2751-3 (or metadata blocks 2751) and data blocks 2753-1, 2753-2, 2753-3 (or data blocks 2753), and document image 2749 with metadata blocks 2757-1, 2757-2, 2757-3 (or metadata blocks 2757) and data blocks 2759-1, 2759-2, 2759-3 (or data blocks 2759). FIG. 27B includes regression equations 2760-1, 2760-2 (or regression equations 2760) and table 2700B with common words 2762 and corresponding locations 2764, and FIG. 27C illustrates plot 2700C with upper threshold 2774-1, lower threshold 2774-2, residuals 2770 along the vertical axis, and x-coordinates 2772 along the horizontal axis. FIG. 27D illustrates plot 2700D with upper threshold 2778-1, lower threshold 2778-2, residuals 2776 along the vertical axis, and y-coordinates 2777 along the horizontal axis. FIG. 27E illustrates plot 2700E with residuals 2770 along the vertical axis and x-coordinates 2772 along the horizontal axis. FIG. 27F illustrates plot 2700F with residuals 2776 along the vertical axis and y-coordinates 2777 along the horizontal axis. The process flow of FIGS. 27A-27F are described with respect to a production process for simplicity. However, it will be appreciated that it can readily be adapted for the batch process. Embodiments are not limited in this context.

Matching a document image 2749 to a template 2718 with linear regressions may begin by identifying a set of common words 2762 and the corresponding location 2764. In various embodiments, common words 2762 may be limited to metadata words in a document image. As shown in FIG. 27A, the common words 2762 between template 2718 and document image 2749 may include 'Name:' of metadata blocks 2751-1, 2757-1, 'Address:' of metadata blocks 2751-2, 2757-2, and 'City:' of metadata blocks 2751-3, 2757-3. In many embodiments, the common words 2762 may be determined based on word tokens generated from an OCR process. For instance, the word tokens in the semi-structured data can be used to determine common words that appear in each of the images that correspond to a respective candidate template.

Referring to FIG. 27B, table 2700B may be created with the set of common words 2762 and the locations 2764 of the common words in the corresponding document image or template. In many embodiments, the set of common words is determined based on corresponding word tokens for each of the document images. In the illustrated embodiment, X1 values and Y1 values may correspond to the x-coordinates and y-coordinates, respectively, for locations in the template 2718, and X2 values and Y2 values may correspond to the x-coordinates and y-coordinates, respectively, for locations in the document image 2749. In the illustrated embodiment, the locations 2764 may refer a common reference point on the bounding box surrounding the associated word. For example, the bounding box may include four corners identifying the location of the text in the corresponding image. In such examples, the locations 2764 used for the linear regressions may include the coordinates of one of the four corners of the bounding box (or the center point may be determined from the four corners and used). Accordingly, as shown in table 2700B, '15' corresponds to the x-coordinate and '8' corresponds to the y-coordinate of the common reference point for 'Name:' in template 2718; '17' corresponds to the x-coordinate and '9' corresponds to the y-coordinate of the common reference point for 'Name:' in document image 2749; '12' corresponds to the x-coordinate and '67' corresponds to the y-coordinate of the common reference point for 'Address:' in template 2718; '14' corresponds to the x-coordinate and '74' corresponds to the y-coordinate of the common reference point for 'Address:' in document image 2749; '14' corresponds to the x-coordinate and '127' corresponds to the y-coordinate of the common reference point for 'City:' in template 2718; and '15' corresponds to the x-coordinate and '144 corresponds to the y-coordinate of the common reference point for 'City:' in document image 2749.

In many embodiments, the linear regressions may utilize the locations of less than each instance of a common word.

In many such embodiments, the linear regressions may utilize the locations of the first and last instances of each common word in the images. In various embodiments, the linear regressions may include robust linear regressions. In various embodiments, the common words may be filtered based on location in the image prior to performing linear regressions. For example, SQL Join may be used to match words in common parts of an image using the locations included in table 2700B.

Once the set of common words is determined, one or more linear regressions in one or more rounds may be performed using regression equations (e.g., regression equations 2760) to match a document image (e.g., document image 2749) to a template (e.g., template 2718). In many embodiments, separate sets of one or more linear regressions with one or more rounds may be performed for each of a plurality of candidate template matches determined based on image hashing and clustering techniques disclosed hereby.

In the illustrated embodiment, a separate linear regression may be performed for each dimension included in the locations 2764. Accordingly, an x-regression may be performed with regression equation 2760-1 and a y-regression may be performed with regression equation 2760-2. In several embodiments, the linear regressions may be used to determine stretch, compression, shift, and/or rotation terms for aligning a document image with a template. In the regression equations 2760, $m_{x1}$ and $m_{y2}$ may be stretch/compression terms, $m_{x2}$ and $m_{y1}$, along with stretch/compression terms, give the angle of rotation, and $b_x$ and $b_y$ are shift terms.

In various embodiments, multiple rounds of linear regressions may be performed. In various such embodiments, images and/or common words may be excluded from subsequent rounds of linear regressions based on residuals determined from prior linear regressions, such as based on thresholds. Referring to FIGS. 27C and 27D, plot 2700C illustrates the residuals 2770 for the x-coordinates 2772 of locations 2764 from a first round of x-coordinate linear regressions and plot 2700D illustrates the residuals 2776 for the y-coordinates 2777 of locations 2764 from a first round of y-coordinate linear regressions. It will be appreciated that, for simplicity, additional common words and corresponding locations are utilized for the linear regressions and shown in the plots 2700C, 2700D, 2700E, 2700F that are not illustrated in FIG. 27A or 27B.

Plot 2700C includes upper and lower thresholds 2774-1, 2774-2 and plot 2700D includes upper and lower thresholds 2776-1, 2776-2. Any locations with residuals above the upper thresholds 2774-1, 2776-1 or below the lower thresholds 2774-2, 2776-2 are filtered out before a second round of x-coordinate and y-coordinate linear regressions are performed. Accordingly, the corresponding locations may be removed from table 2700B.

Referring to FIGS. 27E and 27F, plot 2700E illustrates the residuals 2770 for the x-coordinates 2772 of locations 2764 from a second round of x-coordinate linear regressions and plot 2700D illustrates the residuals 2776 for the y-coordinates 2777 of locations 2764 from a second round of y-coordinate linear regressions. In various embodiments, the residuals 2770, 2776 may be in units of pixels. In many embodiments, the stretch, compression, shift, and/or rotation terms for aligning the document image 2749 with template 2718 may be determined using the second round of x-coordinate and y-coordinate linear regressions.

In some embodiments, one or more of the large residuals that are filtered out before the second round may result from a common word appears twice in almost the same location. For example, a first row of a column in a set of document images may include 'By Air', a second row of the column in the set of document images may include 'By Sea', and a third row of the column in the set of document images may include 'By Land'. In such examples, a linear regression between the 'By' in 'By Air' from a first document image and the 'By' in 'By Sea' in a second document image can result in a large residual. Accordingly, in some embodiments, the linear regressions may utilize the locations of less than each instance of a common word. For example, the first and last instance of each common word in each document image may be used for linear regressions. In such examples, large residuals may be mostly avoided because the first and last instances are unlikely to be proximate to each other. In operation, the instances used may or may not be filtered based on proximity to each other.

After the match is found, words that appear in the same location (adjusted for angle, zoom, and shift) are likely part of the document template and can be considered template words and/or metadata words. In some embodiments, the document structure of each image (as described in the image hashing description) can also be adjusted for angle, zoom, and shift and a similarity score can be computed. The document structure similarity score and number of words appearing in the same location can be combined to create an estimate of the likelihood of being a match. In many embodiments, the similarity score and/or number of words appearing in the same location may be presented via a user interface for confirmation of the match.

Figure 28A:
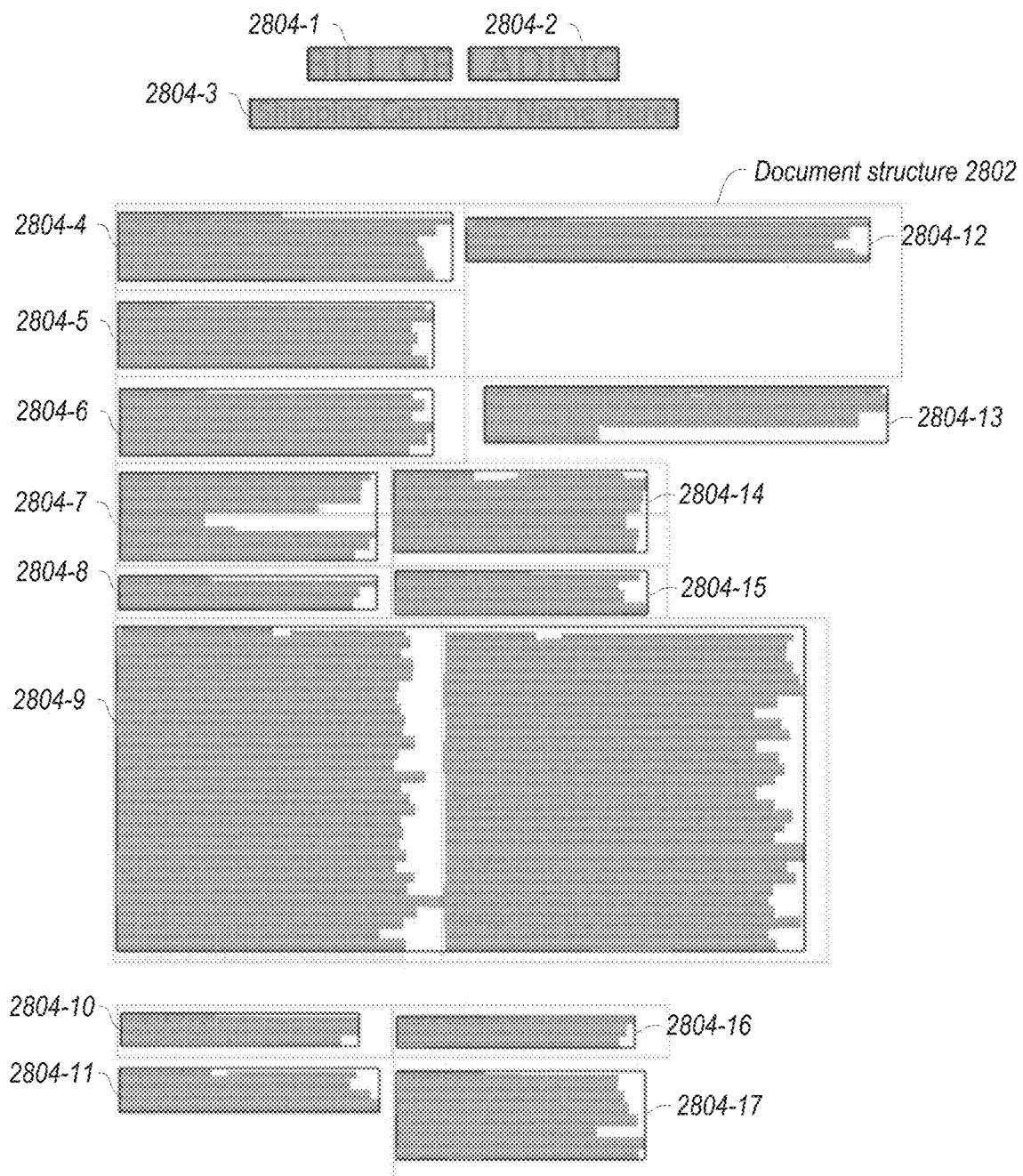
FIGS. 28A-28E illustrate an exemplary process flow for correlating data with metadata in document images, according to some embodiments of the present technology.
Figure 28B:
Figure 28C:
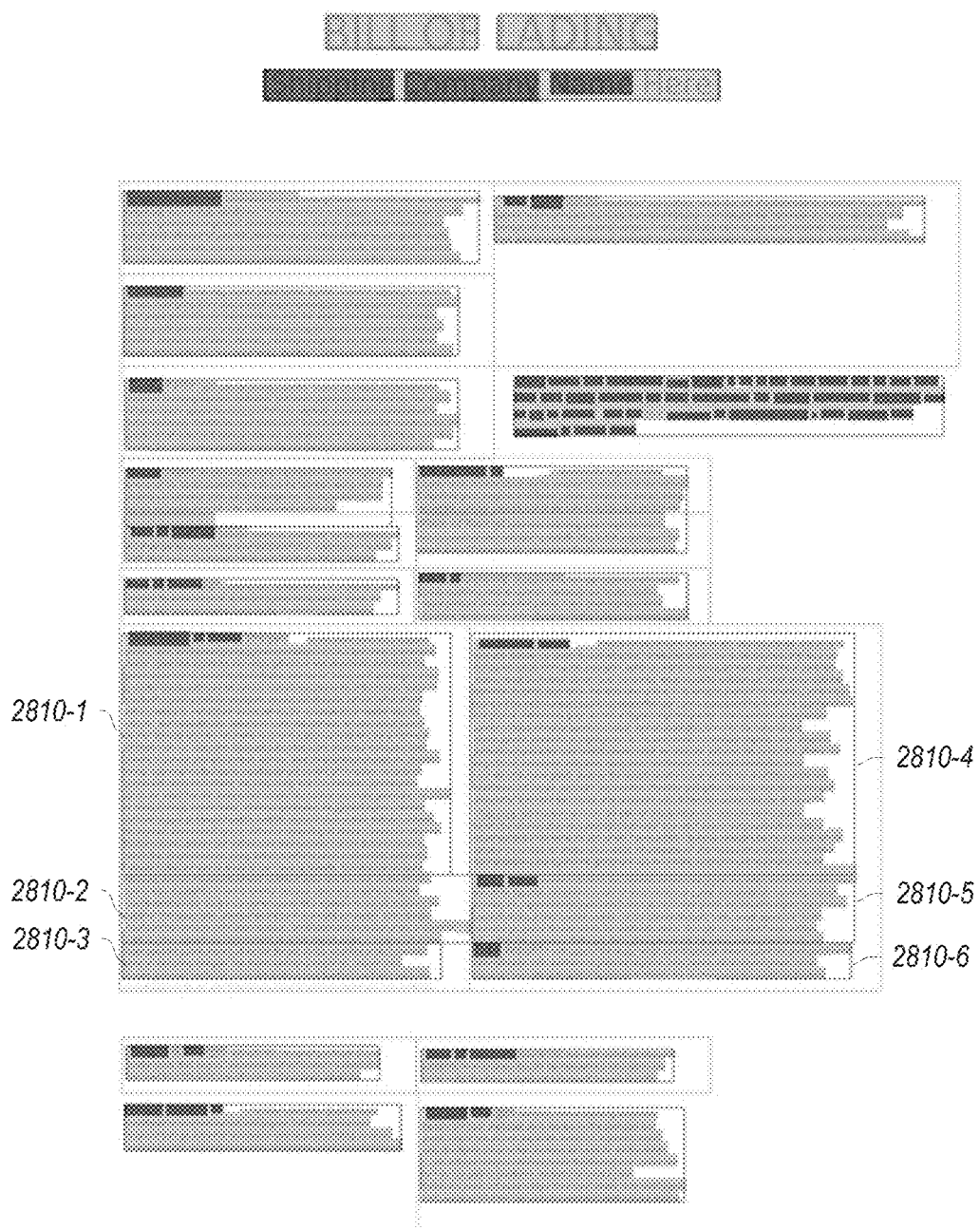
Figure 28D:
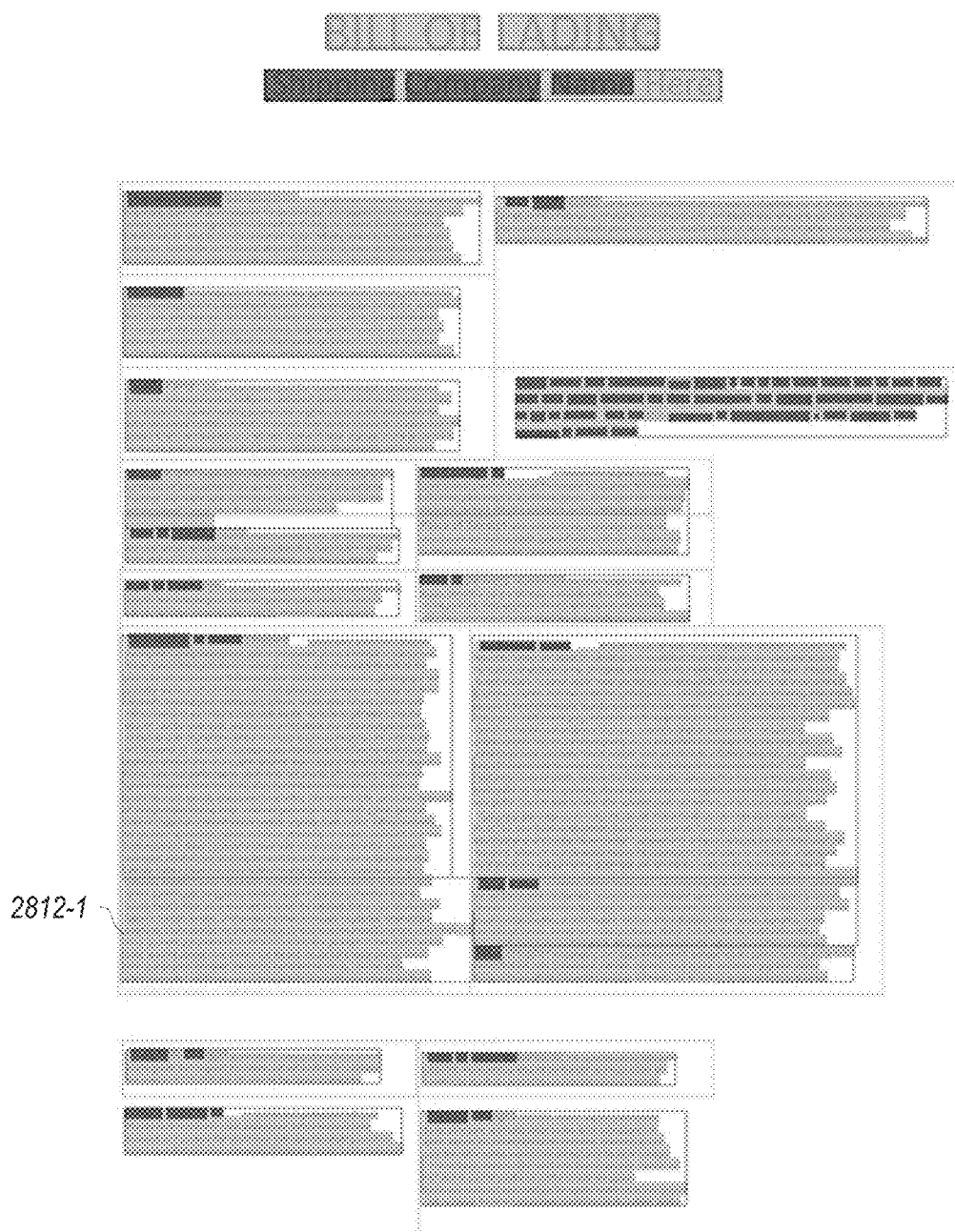

FIGS. 28A-28E illustrate various features of a process flow 2800 for correlating data with metadata in document images according to one or more embodiments described hereby. The process flow 2800 may include state 2800A in FIG. 28A, state 2800B in FIG. 28B, state 2800C in FIG. 28C, state 2800D in FIG. 28D, and state 2800E in FIG. 28E. Further, FIG. 28A includes document structure 2802 and text blocks 2804-1 through 2804-17; FIG. 28B includes text blocks 2806-1, 2806-2, 2808-1, 2808-2, 2808-3; FIG. 28C includes text blocks 2810-1 through 2810-6; FIG. 28D includes text block 2812-1; and FIG. 28E includes text block 2814-1. In one or more embodiments, the process flow 2800 may be utilized to correctly associate the metadata with corresponding data after the metadata has been identified. Embodiments are not limited in this context.

Generally, identifying metadata and correlating the metadata with corresponding data in a document image may include seven steps. The first step may be performed to identify metadata prior to correlating the metadata with corresponding data in the next six steps associated with process flow 2800. In step two, words may be linked into text blocks based on spatial proximity. In step three, the text blocks may be divided based upon location of predicted metadata words. In step four, further text block divisions occur based on local minima and maxima, such as of column-wise pixel intensity. In step five, adjoining text blocks with no metadata are recombined into a single text block. In step six, each text block without metadata is combined with the closest text block including metadata that is above or to the left of the non-metadata block and within a threshold number of pixels. In step seven, text blocks are consolidated into a structured format that retains the association between text and metadata. In many embodiments, identification of metadata and/or correlation of the metadata to corresponding data may utilize word tokens generated by an OCR process. Various data associated with this process may be stored in a metadata database, such as to facilitate future identification and/or correlation of metadata. The following process is described and illustrated in terms of text blocks and/or bounding boxes, however, the illustrations, text blocks, and/or bounding boxes are not necessarily generated in practice. Instead, any technique to group, regroup, and track which words are grouped together may be used.

More specifically, in step one, metadata identification is performed within use cases so that metadata (form content headers) is consistent/repetitive over a corpus of document images. In many embodiments, such as embodiments with repeated templates, one or more of the template data sets in the template data base are utilized to create a model predicting whether a word is metadata. For example, one or more of identified metadata, document templates, blended images, pixel masks, and document structures in the template database may be used to create the model.

Additionally, one or more frequency analyses are performed over the corpus of document images (e.g., collection of document images corresponding to a template). For example, a frequency analysis can be performed over the document image corpus OCR output to identify the total term frequency and the count of distinct documents in which the term appears. Identified metadata words, such as metadata words identified in the template database, can be utilized to understand a document structure, but identified metadata words may not be available, such as in the case of singletons (i.e., images that do not match to a template).

Accordingly, for singletons (or whenever identified metadata words are not available), various embodiments may use images that did cluster with a specific template to create a targeted dataset using information that is available (e.g., non-matching template datasets) and build a binary classification model that predicts whether a given word is metadata using the targeted dataset. In various embodiments, the binary classification model may utilize one or more frequency analyses and one or more metrics corresponding to a set of proximate words for each word token in the set of word tokens to a binary classification model to produce a set of metadata words for the document image. For example, inputs for the binary classification model may include one or more of the following: (1) How often the word in question has been metadata in the past out of known metadata; (2) Whether there is a word in immediate orthogonal proximity to that word (below a threshold distance)—this is done separately for words in each direction; and (3) how often those surrounding words have historically been metadata.

For words that have not appeared in the previously discovered in clusters, a secondary binary classification model may be used. In the second binary classification model one or more of the following inputs may be used: (1) Count of distinct images the word is in historically; (2) Total historical count for that word; (3) Whether there is a word in immediate orthogonal proximity to that word (below a threshold distance), done separately for words in each direction. (4) Whether those surrounding words have historically been metadata. In many embodiments, the second binary classification model may be used for documents of the same use case (e.g., bill of ladings would not be analyzed with credit card applications). In other embodiments, a single model may be used with switching to scoring code on new singletons. For example, a single model with a first mode for the batch process and a second mode for the production process.

Once the metadata is identified, each metadata block may be associated with corresponding a data block in process flow 2800. Referring to step 2 in conjunction with FIG. 28A, words in close spatial proximity may be linked into clusters (e.g., text blocks). In some embodiments, a pixel mask may be created to segment the words and the space between words as a unified text block. In several embodiments, thresholds distances (and/or proximity thresholds) may be defined based on historical analysis, such as within a single use case. For example, the historical analysis may determine, based on historical document image data, a plurality of proximities of relevant words to the word comprised in a respective word token or a plurality of distances between words in a text block.

In various embodiments, multiple threshold distances may be used. For example, a left-direction threshold distance, a right-direction threshold distance, a top-direction threshold distance, and a bottom direction threshold distance may be used. Similarly, one or more proximity thresholds may be used in determining the set of proximate words from word tokens described above. in some embodiments, one or more threshold distances might be able to be held for forms in general. As shown in state 2800A of FIG. 28A, step one can create bounding boxes around text blocks 2804-1, 2804-2, 2804-3, 2804-4, 2804-5, 2804-6, 2804-7, 2804-8, 2804-9, 2804-10, 2804-11, 2804-12, 2804-13, 2804-14, 2804-15, 2804-16, 2804-17 using the upper and lower most points and east and west most points in each cluster as shown below. Additionally, the document structure 2802 may be indicated in state 2800A by the yellow boxes.

Referring to step 3 in conjunction with FIG. 28B, for each text block from step 2, horizontal splits may be created to subdivide upper and lower sub-regions based upon the locations of predicted metadata words (identified via blue highlighting). Accordingly, text block 2804-7 is subdivided into text blocks 2806-1, 2806-2, and text block 2804-9 is subdivided into text blocks 2808-1, 2808-2, 2808-3 in state 2800B. More generally, the identified metadata from step 1 is what allows for accurate breaking of the clusters and the later association of content to metadata.

Referring to step 4 in conjunction with FIG. 28C, for each text block from step 3, vertical splits are created between left/right subregions based on local minima and maxima of column-wise pixel intensity from the image in step 3. Accordingly, text block 2808-1 is subdivided into text blocks 2810-1, 2810-4, text block 2808-2 is subdivided into text blocks 2810-2, 2810-5, and text block 2808-3 is subdivided into text blocks 2810-3, 2810-6.

Referring to step 5 in conjunction with FIG. 28D, when two adjoining text blocks from step 4 contain no metadata words and share a north/south border they may be recombined into a single text block. Accordingly, text blocks 2810-2, 2810-3 may be recombined into text block 2812-1.

Figure 28E:
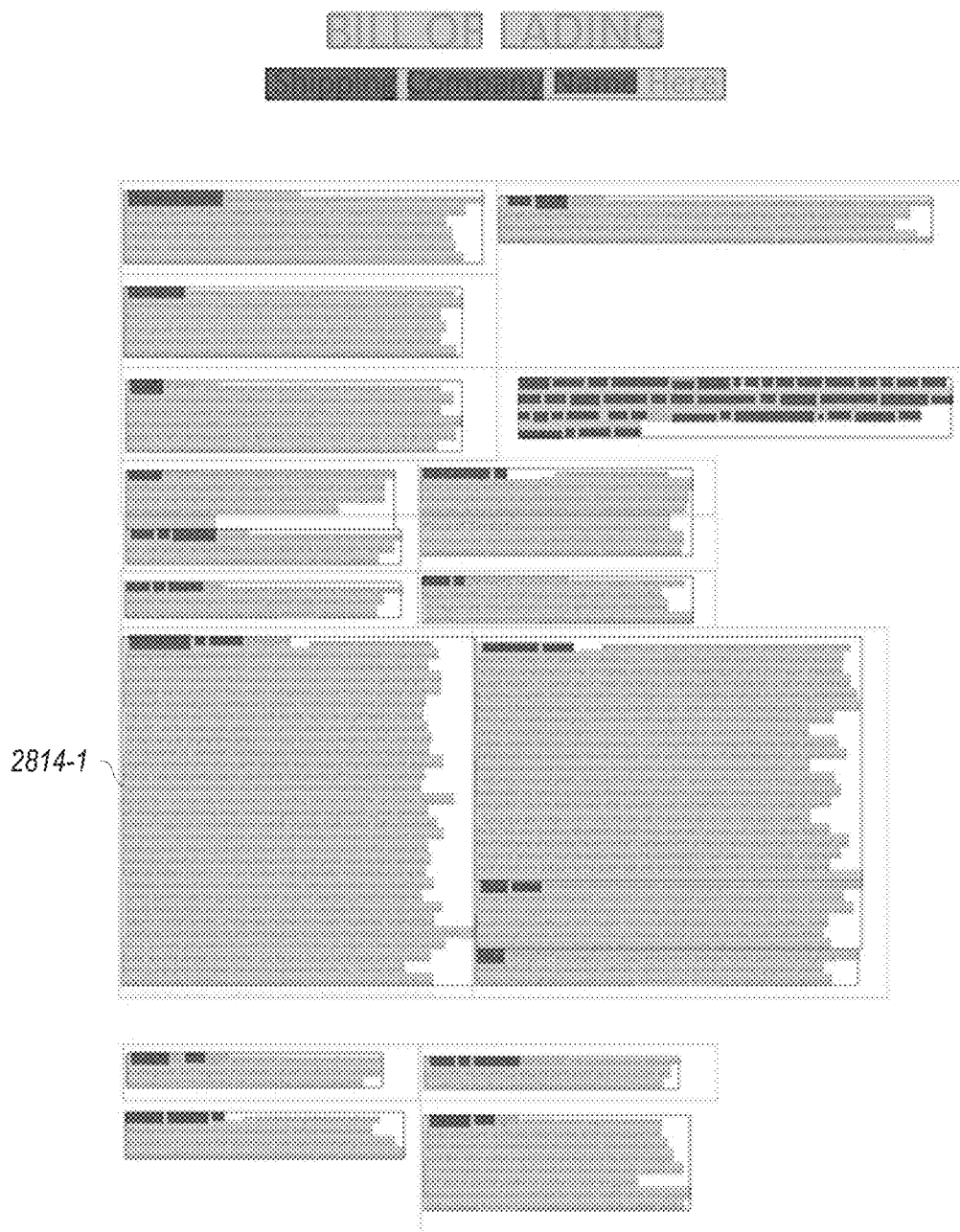

Referring to step 6 in conjunction with FIG. 28E, each text block without any metadata may be combined with the closest metadata-containing text block that appears to the north or west. Accordingly, text block 2812-1 may be combined with text block 2810-1 to create text block 2814-1. In many embodiments, the combining may be subject to a threshold distance determined based on historical analysis. In many such embodiments, the thresholding is utilized to prevent linking a text block with another text block that is unrelated. Accordingly, in some embodiments a text block may result with no metadata. In some such embodiments, a text block with no metadata may trigger an exception for manual review. After step 6, each of the final text blocks shown in FIG. 28E may include metadata and the data corresponding to the metadata. Referring to step 7, the final text blocks may be consolidated into a contextually-structured format that retains the association between text and metadata elements, resulting in a machine-facilitated annotation of the document image that can be stored in the template database in a corresponding template dataset. Incoming document images can then be matched to template corresponding to the machine annotated form as described above. In various embodiments, the machine-facilitated annotation can be manually reviewed and/or revised when as time permits, clusters are found, or metadata probabilities are low.

Figure 29B:
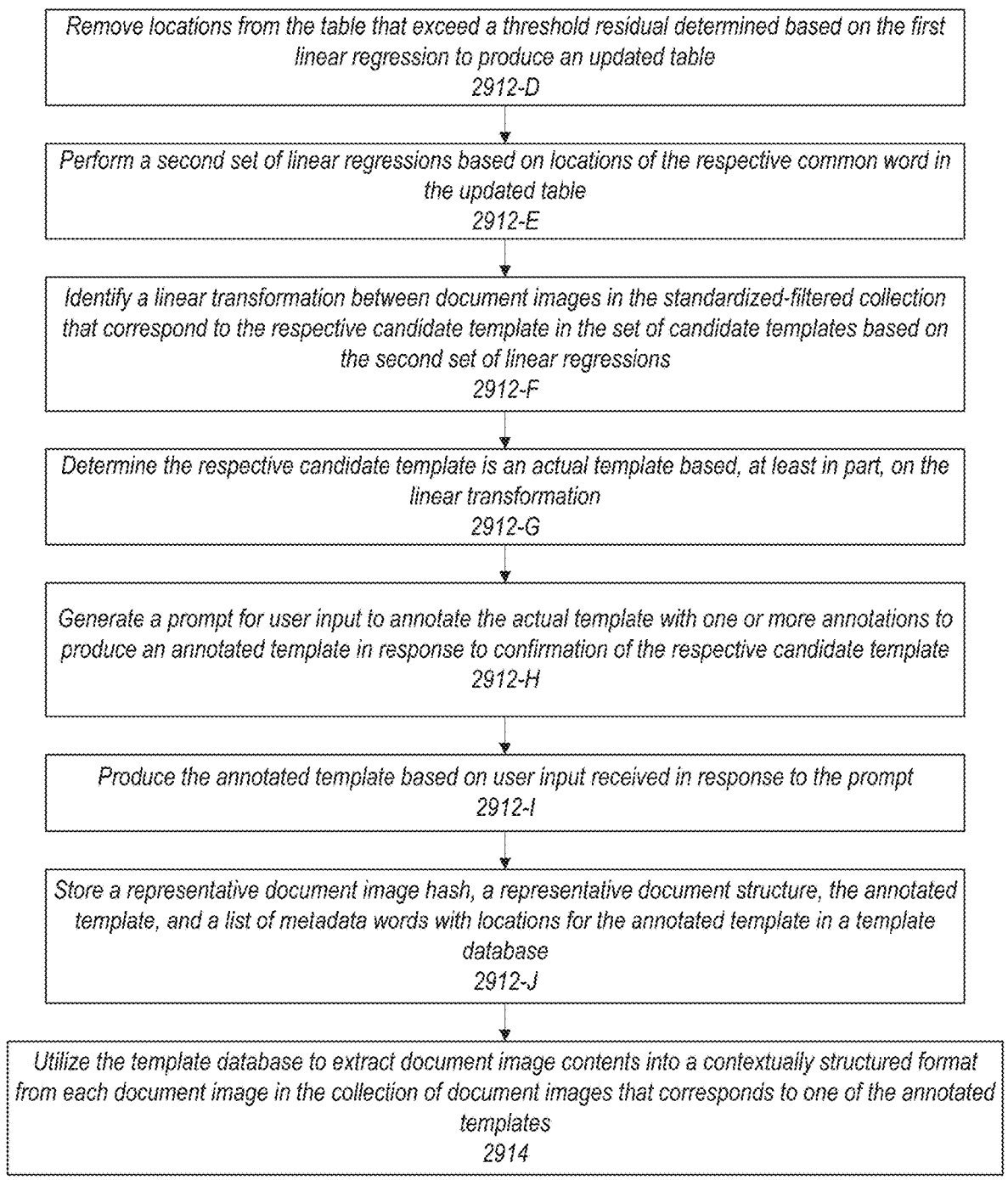

FIGS. 29A and 29B illustrates an embodiment of a logic flow 2900. The logic flow 2900 may be representative of some or all of the operations executed by one or more embodiments described herein. More specifically, the logic flow 2900 may illustrate operations performed by one or more components of a CSDS disclosed hereby (e.g., CSDS 1302, 1402, 1602, 2002). In one or more embodiments, these operations may be performed in conjunction with extracting document image contents into a contextually structured format. Embodiments are not limited in this context.

In the illustrated embodiment shown in FIGS. 29A and 29B, the logic flow 2900 may begin at block 2302. Block 2902 includes identifying semi-structured data generated by optical character recognition. The semi-structured data comprises a set of word tokens for each document image in a standardized-filtered collection of document images. In various embodiments, one or more components of data contextualizer 1806, such as data bundler 1832, may implement block 2902.

Block 2904 includes removing the set of word tokens from each document image in the standardized-filtered collection of document images to produce a collection of document structures that corresponds to the standardized filtered collection of document images. In some embodiments, one or more components of data adjuster 1604 and/or data contextualizer 1806, such as data arbiter 1630 or data bundler 1832, may implement block 2904.

Block 2906 includes hashing each document structure in the collection of document structures to produce a collection of image hashes. In many embodiments, one or more components of data contextualizer 1806, such as data bundler 1832, may implement block 2906.

Block 2908 includes computing a hamming distance between each pair of image hashes in the collection of image hashes. "In several embodiments, one or more components of data contextualizer 1806, such as data bundler 1832, may implement block 2908.

Block 2910 includes clustering the document structures based on the hamming distances to determine a set of candidate templates from the collection of document structures, wherein each candidate template in the set of templates corresponds to a different cluster of document structures" In multiple embodiments, one or more components of data contextualizer 1606, such as template manager 1636, may implement block 2910.

Block 2912 provides that for each candidate template in the set of candidate templates blocks 2912-A through 2912-J are performed. In many embodiments, blocks 2912-A through 2912-J may be implemented, at least in part, by template manager 1636. In many such embodiments, one or more of blocks 2912-A through 2912-J, or aspects thereof, may be implemented by other components of an CSDS disclosed hereby. For example, data interpreter 1608 may perform one or more aspects of block 2912-H.

Block 2912-A includes identifying one or more occurrences for each common word in a set of common words in each document image in the standardized-filtered collection that corresponds to a respective candidate template in the set of candidate templates based on corresponding word tokens.

Block 2912-B includes creating a table for the set of common words, the table comprising locations of the one or more occurrences for each common word in the set of common words for each document image in the standardized-filtered collection that corresponds to the respective candidate template in the set of candidate templates. Block 2912-C includes performing a first set of linear regressions based on locations of the set of common words in the table, wherein performance of the first set of linear regressions determines a residual for each of the locations in the table. Block 2912-D includes removing locations from the table that exceed a threshold residual determined based on the first linear regression to produce an updated table. Block 2912-E includes performing a second set of linear regressions based on locations of the respective common word in the updated table. Block 2912-F includes identifying a linear transformation between document images in the standardized-filtered collection that correspond to the respective candidate template in the set of candidate templates based on the second set of linear. Block 2912-G includes determining the respective candidate template is an actual template based, at least in part, on the linear transformation. Block 2912-H includes generating a prompt for user input to annotate the actual template with one or more annotations to produce an annotated template in response to confirmation of the respective candidate template. Block 2912-I includes producing the annotated template based on user input received in response to the prompt. Block 2912-J includes storing a representative document image hash, a representative document structure, the annotated template, and a list of metadata words with locations for the annotated template in a template database.

Block 2914 includes utilizing the template database to extract document image contents into a contextually structured format from each document image in the collection of document images that corresponds to one of the annotated templates. In various embodiments, one or more components of data contextualizer 1306 or data interpreter 1608 may"

FIGS. 30A and 30B illustrates an embodiment of a logic flow 3000. The logic flow 3000 may be representative of some or all of the operations executed by one or more embodiments described herein. More specifically, the logic flow 3000 may illustrate operations performed by one or more components of a CSDS disclosed hereby (e.g., CSDS 1302, 1402, 1602, 2002, or data contextualizer 1806). In one or more embodiments, these operations may be performed in conjunction with extracting document image contents into a contextually structured format. Embodiments are not limited in this context.

In the illustrated embodiment shown in FIGS. 29A and 29B, the logic flow 3000 may begin at block 2302. Block 3002 includes identifying semi-structured data generated by optical character recognition (OCR), the semi-structured data comprising a set of word tokens for a document image, wherein each word token comprises a word identified in the document image and a location of the word identified in the document image. In some embodiments, one or more components of data contextualizer 1806, such as textual metadata identifier 1840, may implement block 3002.

Block 3004 includes performing a frequency analysis of each word token in the set of word tokens, each frequency analysis to determine a total frequency of a respective word and a count of document images in which the respective word appears based on one or more of a template database and a metadata database, wherein the template database comprises a set of annotated templates for converting an incoming document image into contextually structured data, and wherein the metadata database comprises metadata words and text analytic scoring weights generated based on the template database. In many embodiments, one or more components of data contextualizer 1806, such as textual metadata identifier 1840, may implement block 3004.

Block 3006 includes identifying a set of proximate words for each word token in the set of word tokens, wherein each proximate word in a respective set of proximate words includes words in the document image that are within a proximity threshold of a respective word token. In various embodiments, one or more components of data contextualizer 1806, such as textual metadata identifier 1840, may implement block 3006.

Block 3008 includes providing the frequency analysis and metrics corresponding to the set of proximate words for each word token in the set of word tokens to a binary classification model to produce a set of metadata words for the document image. In several embodiments, one or more components of data contextualizer 1806, such as textual metadata identifier 1840, may implement block 3008.

Block 3010 includes linking words below a threshold distance in the document image together to produce a set of text blocks, each text block including at least one data word associable with at least one metadata word in the set of metadata words for the document image. In multiple embodiments, one or more components of data contextualizer 1806, such as textual metadata identifier 1840, may implement block 3010.

Block 3012 includes dividing a first text block in the set of text blocks into second and third text blocks based on the set of metadata words for the document image. In various embodiments, one or more components of data contextualizer 1806, such as textual metadata identifier 1840, may implement block 3012.

Block 3014 includes dividing the third text block into fourth and fifth text blocks based on local minima and maxima of column wise pixel intensity. In some embodiments, one or more components of data contextualizer 1806, such as pixel manager 1868, may implement block 3014.

Block 3016 includes determining the fifth text block fails to include any metadata word from the set of metadata words. In many embodiments, one or more components of data contextualizer 1806, such as textual metadata identifier 1840, may implement block 3016.

Block 3018 includes combining the fifth text block with a sixth text block based on the determination the fifth text block fails to include any metadata word from the set of metadata words. In several embodiments, one or more components of data contextualizer 1806, such as textual metadata identifier 1840, may implement block 3018.

Block 3020 includes generating a machine-facilitated annotation of the document image based on remaining text blocks and the set of metadata words, wherein each of the remaining text blocks having at least one metadata word and at least one data word, the at least one metadata word is associated with the at least one data word. In multiple embodiments, one or more components of data contextualizer 1806, such as template manager 1836, may implement block 3002.

In many embodiments, one or more portions of the processing or logic flows described herein, including the components of which each is composed, may be selected to be operative on whatever type of processor or processors that are selected to implement one or more components described herein. For instance, these may include any of a wide variety of commercially available processors. Further, one or more of these processors may include multiple processors, a multi-threaded processor, a multi-core processor (whether the multiple cores coexist on the same or separate dies), and/or a multiprocessor architecture of some other variety by which multiple physically separate processors are linked.

In various embodiments, one or more processors and/or devices used to implement portions of the processing or logic flows described herein may be selected to efficiently perform one or more operations described herein. In some embodiments, one or more operations described herein may be performed at least partially in parallel. By way of example, processors may incorporate a single-instruction multiple-data (SIMD) architecture, may incorporate multiple processing pipelines, and/or may incorporate the ability to support multiple simultaneous threads of execution per processing pipeline.

In some embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processing or logic circuitry. Where one or more device drivers are included, those device drivers may provide support for any of a variety of other components, whether hardware or software components, described herein.

In various embodiments, one or more components of STS 1302, 1402, 1502 may utilize or include storage and/or memory (e.g., test digest 1530). In various such embodiments, the storage and/or memory may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in one or more embodiments, storage and/or memory of one or more of the node may be implemented with a redundant array of independent discs (RAID) of a RAID level selected to provide fault tolerance to prevent loss of one or more of these datasets and/or to provide increased speed in accessing one or more of these datasets.

In various embodiments, one or more of the interfaces described herein may each utilize or include any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. Various embodiments may include or utilize one or more displays to present information. In various such embodiments, each of the displays may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

Some embodiments may include one or more network interfaces that employ any of a wide variety of communications technologies enabling these devices to be coupled to one or more other devices. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, Universal Serial Bus (USB), Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.15, 802.16, 802.20 (commonly referred to as "Mobile Broadband Wireless Access"); Near-Field-Communication (NFC); Bluetooth®; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc. However, in a specific embodiment, a network interface may be implemented with multiple copper-based or fiber-optic based network interface ports to provide redundant and/or parallel pathways in exchanging data.

In various embodiments, the processing, memory, and/or storage resources of one or more components described herein may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission, and/or distribution via network interface that is bound to existing API architectures or protocols.

Some systems may use an open-source framework for storing and analyzing data in a distributed computing environment, such as Hadoop®. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
   identify semi-structured data generated by optical character recognition, the semi-structured data comprising a set of word tokens for each document image in a standardized-filtered collection of document images;
   remove the set of word tokens from each document image in the standardized-filtered collection of document images to produce a collection of document structures that corresponds to the standardized-filtered collection of document images;
   hash each document structure in the collection of document structures to produce a collection of image hashes;
   compute a hamming distance between each pair of image hashes in the collection of image hashes;
   cluster the document structures based on the hamming distances to determine a set of candidate templates from the collection of document structures, wherein each candidate template in the set of templates corresponds to a different cluster of document structures;
   for each candidate template in the set of candidate templates:
      identify one or more occurrences for each common word in a set of common words in each document image in the standardized-filtered collection that corresponds to a respective candidate template in the set of candidate templates based on corresponding word tokens,
      create a table for the set of common words, the table comprising locations of the one or more occurrences for each common word in the set of common words for each document image in the standardized-filtered collection that corresponds to the respective candidate template in the set of candidate templates, perform a first set of linear regressions based on locations of the set of common words in the table, wherein performance of the first set of linear regressions determines a residual for each of the locations in the table, remove locations from the table that exceed a threshold residual determined based on the first linear regression to produce an updated table, perform a second set of linear regressions based on locations of the respective common word in the updated table, identify a linear transformation between document images in the standardized-filtered collection that correspond to the respective candidate template in the set of candidate templates based on the second set of linear regressions, determine the respective candidate template is an actual template based, at least in part, on the linear transformation, generate a prompt for user input to annotate the actual template with one or more annotations to produce an annotated template in response to confirmation of the respective candidate template, produce the annotated template based on user input received in response to the prompt, and store a representative document image hash, a representative document structure, the annotated template, and a list of metadata words with locations for the annotated template in a template database; and utilize the template database to extract document image contents into a contextually structured format from each document image in the collection of document images that corresponds to one of the annotated templates.

2. The apparatus of claim 1, wherein the table is created with at least two occurrences of each common word from each document image in the standardized-filtered collection that corresponds to a respective candidate template in the set of candidate templates.

3. The apparatus of claim 2, wherein the two occurrences of the respective common word are the first occurrence and the last occurrence of the respective common word in each document image in the standardized-filtered collection that corresponds to a respective candidate template in the set of candidate templates.

4. The apparatus of claim 1, wherein the processor is caused to perform operations comprising generate a blended image for the respective candidate template based on each document image that corresponds to the respective candidate template.

5. The apparatus of claim 4, wherein the processor is caused to perform operations comprising generate a prompt for user input to determine the respective candidate template is an actual template.

6. The apparatus of claim 4, wherein the processor is caused to perform operations comprising:

utilize the blended image to confirm the respective candidate template; and generate a pixel mask based on the blended image.

7. The apparatus of claim 6, wherein the pixel mask comprises a three-dimensional pixel mask with a first dimension that corresponds to data, a second dimension that corresponds to metadata, and a third dimension that corresponds to document structure.

8. The apparatus of claim 1, wherein the processor is caused to perform operations to produce the standardized-filtered collection of document images comprising:

remove one or more document images in a collection of document images based on a set of document image requirements to produce a filtered collection of document images, wherein the set of document image requirements includes a minimum image quality for each document image in the filtered collection; and standardize each document image in the filtered collection of document images based on a set of document image standards to produce the standardized-filtered collection of document images, wherein the set of document image standards includes a standard image size.

9. The apparatus of claim 1, wherein the first set of linear regressions comprises a first x-axis linear regression and a first y-axis linear regression and the second set of linear regressions comprise a second x-axis linear regression and a second y-axis linear regression.

10. The apparatus of claim 1, wherein the contextually structured format distinguishes data words in a document image from metadata words in the document image and correlates each data word in the document image with at least one annotation in the document.

11. A computer-implemented method, comprising:

identifying semi-structured data generated by optical character recognition, the semi-structured data comprising a set of word tokens for each document image in a standardized-filtered collection of document images;

removing the set of word tokens from each document image in the standardized-filtered collection of document images to produce a collection of document structures that corresponds to the standardized-filtered collection of document images;

hashing each document structure in the collection of document structures to produce a collection of image hashes;

computing a hamming distance between each pair of image hashes in the collection of image hashes;

clustering the document structures based on the hamming distances to determine a set of candidate templates from the collection of document structures, wherein each candidate template in the set of templates corresponds to a different cluster of document structures;

for each candidate template in the set of candidate templates:

identifying one or more occurrences for each common word in a set of common words in each document image in the standardized-filtered collection that corresponds to a respective candidate template in the set of candidate templates based on corresponding word tokens, creating a table for the set of common words, the table comprising locations of the one or more occurrences for each common word in the set of common words for each document image in the standardized-filtered collection that corresponds to the respective candidate template in the set of candidate templates, performing a first set of linear regressions based on locations of the set of common words in the table, wherein performance of the first set of linear regressions determines a residual for each of the locations in the table, removing locations from the table that exceed a threshold residual determined based on the first linear regression to produce an updated table, performing a second set of linear regressions based on locations of the respective common word in the updated table, identifying a linear transformation between document images in the standardized-filtered collection that correspond to the respective candidate template in the set of candidate templates based on the second set of linear regressions, determining the respective candidate template is an actual template based, at least in part, on the linear transformation, generating a prompt for user input to annotate the actual template with one or more annotations to produce an annotated template in response to confirmation of the respective candidate template, producing the annotated template based on user input received in response to the prompt, and storing a representative document image hash, a representative document structure, the annotated template, and a list of metadata words with locations for the annotated template in a template database; and utilizing the template database to extract document image contents into a contextually structured format from each document image in the collection of document images that corresponds to one of the annotated templates.

12. The computer-implemented method of claim 11, wherein the table is created with at least two occurrences of each common word from each document image in the standardized-filtered collection that corresponds to a respective candidate template in the set of candidate templates.

13. The computer-implemented method of claim 12, wherein the two occurrences of the respective common word are the first occurrence and the last occurrence of the respective common word in each document image in the standardized-filtered collection that corresponds to a respective candidate template in the set of candidate templates.

14. The computer-implemented method of claim 11, comprising generating a blended image for the respective candidate template based on each document image that corresponds to the respective candidate template.

15. The computer-implemented method of claim 14, comprising generating a prompt for user input to determine the respective candidate template is an actual template.

16. The computer-implemented method of claim 14, comprising:
utilizing the blended image to confirm the respective candidate template; and
generating a pixel mask based on the blended image.

17. The computer-implemented method of claim 16, wherein the pixel mask comprises a three-dimensional pixel mask with a first dimension that corresponds to data, a second dimension that corresponds to metadata, and a third dimension that corresponds to document structure.

18. The computer-implemented method of claim 11, wherein producing the standardized-filtered collection of document images comprises:
removing one or more document images in a collection of document images based on a set of document image requirements to produce a filtered collection of document images, wherein the set of document image requirements includes a minimum image quality for each document image in the filtered collection; and
standardizing each document image in the filtered collection of document images based on a set of document image standards to produce the standardized-filtered collection of document images, wherein the set of document image standards includes a standard image size.

19. The computer-implemented method of claim 11, wherein the first set of linear regressions comprises a first x-axis linear regression and a first y-axis linear regression and the second set of linear regressions comprise a second x-axis linear regression and a second y-axis linear regression.

20. The computer-implemented method of claim 11, wherein the contextually structured format distinguishes data words in a document image from metadata words in the document image and correlates each data word in the document image with at least one annotation in the document.

21. A computer-program product tangibly embodied in a non-transitory machine-readable storage medium, the computer-program product including instructions operable to cause a processor to perform operations comprising:
identify semi-structured data generated by optical character recognition, the semi-structured data comprising a set of word tokens for each document image in a standardized-filtered collection of document images;
remove the set of word tokens from each document image in the standardized-filtered collection of document images to produce a collection of document structures that corresponds to the standardized-filtered collection of document images;
hash each document structure in the collection of document structures to produce a collection of image hashes;
compute a hamming distance between each pair of image hashes in the collection of image hashes;
cluster the document structures based on the hamming distances to determine a set of candidate templates from the collection of document structures, wherein each candidate template in the set of templates corresponds to a different cluster of document structures;
for each candidate template in the set of candidate templates:
identify one or more occurrences for each common word in a set of common words in each document image in the standardized-filtered collection that corresponds to a respective candidate template in the set of candidate templates based on corresponding word tokens,
create a table for the set of common words, the table comprising locations of the one or more occurrences for each common word in the set of common words for each document image in the standardized-filtered collection that corresponds to the respective candidate template in the set of candidate templates,
perform a first set of linear regressions based on locations of the set of common words in the table, wherein performance of the first set of linear regressions determines a residual for each of the locations in the table,
remove locations from the table that exceed a threshold residual determined based on the first linear regression to produce an updated table,
perform a second set of linear regressions based on locations of the respective common word in the updated table,
identify a linear transformation between document images in the standardized-filtered collection that correspond to the respective candidate template in the set of candidate templates based on the second set of linear regressions, determine the respective candidate template is an actual template based, at least in part, on the linear transformation, generate a prompt for user input to annotate the actual template with one or more annotations to produce an annotated template in response to confirmation of the respective candidate template, produce the annotated template based on user input received in response to the prompt, and store a representative document image hash, a representative document structure, the annotated template, and a list of metadata words with locations for the annotated template in a template database; and utilize the template database to extract document image contents into a contextually structured format from each document image in the collection of document images that corresponds to one of the annotated templates.

22. The computer-program product of claim 21, wherein the table is created with at least two occurrences of each common word from each document image in the standardized-filtered collection that corresponds to a respective candidate template in the set of candidate templates.

23. The computer-program product of claim 22, wherein the two occurrences of the respective common word are the first occurrence and the last occurrence of the respective common word in each document image in the standardized-filtered collection that corresponds to a respective candidate template in the set of candidate templates.

24. The computer-program product of claim 21, including instructions operable to cause the processor to perform operations comprising generate a blended image for the respective candidate template based on each document image that corresponds to the respective candidate template.

25. The computer-program product of claim 24, including instructions operable to cause the processor to perform operations comprising generate a prompt for user input to determine the respective candidate template is an actual template.

26. The computer-program product of claim 24, including instructions operable to cause the processor to perform operations comprising:
utilize the blended image to confirm the respective candidate template; and
generate a pixel mask based on the blended image.

27. The computer-program product of claim 26, wherein the pixel mask comprises a three-dimensional pixel mask with a first dimension that corresponds to data, a second dimension that corresponds to metadata, and a third dimension that corresponds to document structure.

28. The computer-program product of claim 21, including instructions operable to cause the processor to perform operations to produce the standardized-filtered collection of document images comprising:
remove one or more document images in a collection of document images based on a set of document image requirements to produce a filtered collection of document images, wherein the set of document image requirements includes a minimum image quality for each document image in the filtered collection; and
standardize each document image in the filtered collection of document images based on a set of document image standards to produce the standardized-filtered collection of document images, wherein the set of document image standards includes a standard image size.

29. The computer-program product of claim 21, wherein the first set of linear regressions comprises a first x-axis linear regression and a first y-axis linear regression and the second set of linear regressions comprise a second x-axis linear regression and a second y-axis linear regression.

30. The computer-program product of claim 21, wherein the contextually structured format distinguishes data words in a document image from metadata words in the document image and correlates each data word in the document image with at least one annotation in the document.

* * * * *

UNITED STATES PATENT AND TRADEMARK OFFICE
CERTIFICATE OF CORRECTION

| | | |
|---|---|---|
| PATENT NO. | : 11,049,235 B2 | |
| APPLICATION NO. | : 17/083568 | |
| DATED | : June 29, 2021 | |
| INVENTOR(S) | : Wheaton et al. | |

It is certified that error appears in the above-identified patent and that said Letters Patent is hereby corrected as shown below:

On the Title Page

On page 2, replace the mention of "provisional application No. 62/922,941, filed on Sep. 9, 2019" with "provisional application No. 62/992,941, filed on March 21, 2020".

Signed and Sealed this
Fourth Day of July, 2023

Katherine Kelly Vidal
*Director of the United States Patent and Trademark Office*